US012747030B2

(12) United States Patent
Beach et al.

(10) Patent No.: US 12,747,030 B2
(45) Date of Patent: Sep. 29, 2026

(54) SUPPORT PIN ASSEMBLY, SUPPORT SYSTEM, AND METHOD FOR THE SAME

(71) Applicant: The Boeing Company, Arlington, VA (US)

(72) Inventors: Brent A. Beach, Chesterfield, MO (US); Colleen A. Oberlee, Saint Charles, MO (US); Timothy L. Smith, Brighton, IL (US); David M. Petka, Madison, AL (US)

(73) Assignee: The Boeing Company, Arlington, VA (US)

( * ) Notice: Subject to any disclaimer, the term of this patent is extended or adjusted under 35 U.S.C. 154(b) by 385 days.

(21) Appl. No.: 18/446,322

(22) Filed: Aug. 8, 2023

(65) Prior Publication Data

US 2025/0050458 A1 Feb. 13, 2025

(51) Int. Cl.

| | |
|---|---|
| ***B64D 45/00*** | (2006.01) |
| ***B23Q 1/44*** | (2006.01) |
| ***B64C 25/02*** | (2006.01) |
| ***B64C 25/10*** | (2006.01) |
| ***B64C 25/12*** | (2006.01) |
| ***B64F 5/10*** | (2017.01) |

(52) U.S. Cl.

CPC .............. *B64D 45/00* (2013.01); *B64C 25/02* (2013.01); *B64C 25/10* (2013.01); *B23Q 1/44* (2013.01); *B64C 2025/125* (2013.01); *B64D 45/0005* (2013.01); *B64F 5/10* (2017.01)

(58) Field of Classification Search

CPC .... B23Q 1/44; B23Q 1/25; B23Q 1/00; B64F 5/10; B64F 5/00; F16C 11/045; F16C 11/00; B16C 11/04; B64D 45/0005; B64D 45/00; B64C 25/02; B64C 25/00

USPC ........................................ 29/897.2, 897, 592

See application file for complete search history.

(56) References Cited

U.S. PATENT DOCUMENTS

| | | | | |
|---|---|---|---|---|
| 6,530,544 B2 * | 3/2003 | Milliere | B64C 13/24 | 403/150 |
| 2005/0116105 A1 * | 6/2005 | Munk | B64F 5/10 | 244/123.8 |
| 2014/0033909 A1 * | 2/2014 | Murphy | F15B 15/22 | 91/27 |
| 2015/0191242 A1 * | 7/2015 | Maclean | B64C 9/02 | 244/99.3 |
| 2016/0222994 A1 * | 8/2016 | Murphy | F15B 15/22 | |
| 2021/0245865 A1 * | 8/2021 | Alvizures | B64C 9/02 | |
| 2022/0185449 A1 * | 6/2022 | Glassmoyer | B64C 9/16 | |

* cited by examiner

*Primary Examiner* — Lawrence Averick

(57) ABSTRACT

There is provided a support pin assembly for full size determinant assembly of an aircraft structure. The support pin assembly includes a clevis having a clevis body with a first clevis lug and a second clevis lug, the clevis configured for mounting to an assembly jig. The support pin assembly further includes a first bushing disposed within the first clevis lug, a second bushing disposed within the second clevis lug, and a pin slideably disposed within the first bushing and the second bushing. The pin includes a shoulder portion with a pin groove, and a part support portion configured to fit through a hole in a part of the aircraft structure. The support pin assembly further includes a sleeve bushing slideably disposed over the part support portion, a retainer element coupled to the part support portion, and a gauge assembly configured for coupling to the pin groove.

20 Claims, 31 Drawing Sheets

SUPPORT PIN ASSEMBLY, SUPPORT SYSTEM, AND METHOD FOR THE SAME

CROSS-REFERENCE TO RELATED APPLICATION

This nonprovisional patent application is related to contemporaneously filed U.S. nonprovisional patent application Ser. No. 18/446,270, titled SUPPORT PIN ASSEMBLY, SUPPORT SYSTEM, AND METHOD FOR THE SAME, filed on Aug. 8, 2023, now U.S. Pat. No. 12,337,995 B2, issued on Jun. 24, 2025, the contents of which are hereby incorporated by reference in their entirety. By mention in this CROSS-REFERENCE TO RELATED APPLICATION section, the application is not admitted to be prior art with respect to this application.

FIELD

The disclosure relates generally to assemblies, systems, and methods for full size determinant assembly, and more particularly, to support pin assemblies, support systems, and methods for the same, to enable full size determinant assembly of aircraft structures for aircraft.

BACKGROUND

Full size determinant assembly is a precision assembly or manufacturing method or process that uses alignment features, such as holes, to index component parts and assemblies relative to each other, and that eliminates or minimizes the use of hard tooling by replacing it with self-locating detail parts that determine the configuration of the assembly by their own dimensions and certain coordinating features incorporated into the design of the parts. Full size determinant assembly uses automated machines to drill clean, precise, full-size holes in advance of assembling the structure, and such holes then line up easily for insertion of fasteners without the need to take it apart. Full size determinant assembly is increasingly used to assemble and manufacture aircraft structures, such as fuselage and wings.

Known methods and systems used to enable full size determinant assembly of aircraft structures, such as fuselage and wings, or other engineering parts, use assembly jigs, fixtures, and pins to position and support parts or frame sections of such aircraft structures or other engineering parts, including inserting pins through holes or slots in the parts or frame sections held by the assembly jig and/or fixtures. Further, such known methods and systems used to enable full size determinant assembly of an aircraft structure, such as a fuselage, include drilling holes at an assembly jig, or holding a single fuselage part, e.g., a fuselage bulkhead, and building in fuselage modules in one direction and then splicing the fuselage modules together. However, this may result in over constraining a full size determinate assembly build up without allowing the full size determinate assembly build up to move or float, and this may further result in possible hole misalignments within the assembly jig. For example, when the pins are rotated in the holes or slots, there is a possibility that the pins may get locked in the assembly jig or fixture or that the pins may bind and become immovable. Such known methods and systems do not allow for pin adjustment or pin float and do not allow for pin release in the event of pin binding or assembly jig lock. This may result in further removal of the jig assembly or fixture and possible damage to the holes of the frame section. Thus, full size determinant assembly may not be achieved due to over-constraining, build-up, and possible pin binding.

It would be desirable to solve the problem of assembly jig lock and pin binding to accurately position and support aircraft structures, such as parts and frame sections of fuselage, to enable full size determinant assembly. Further, it would be desirable to build a full aircraft fuselage in a single assembly jig with full size determinate assembly.

Accordingly, there is a need in the art for an improved support pin assembly, support system, and method for supporting an aircraft structure for full size determinant assembly that do not over constrain a full size determinate assembly build up, that allow a full size determinate assembly build up to move or float by providing a means for pin adjustment or pin float, that provide a means to avoid possible hole misalignments within the assembly jig, that provide a means for pin release in the event of pin binding, and that provide other advantages over known systems and methods.

SUMMARY

Example implementations of the present disclosure provide a support pin assembly, support system, and method for supporting an aircraft structure for full size determinant assembly. As discussed in the below detailed description, versions of the support pin assembly, support system, and method may provide significant advantages over known systems and methods.

In a version of the disclosure, there is provided a support pin assembly for full size determinant assembly of an aircraft structure. The support pin assembly comprises a clevis having a clevis body with a first clevis lug and a second clevis lug. The clevis is configured for mounting to an assembly jig. The support pin assembly further comprises a first bushing disposed within the first clevis lug, and a second bushing disposed within the second clevis lug.

The support pin assembly further comprises a pin slideably disposed within the first bushing and within the second bushing. The pin comprises a head end and a tail end. The pin further comprises a shoulder portion at least partially disposed within the first bushing. The shoulder portion has a first end, a second end, and a pin groove formed circumferentially on an exterior portion of the shoulder portion. The pin further comprises a part support portion extending from the first shoulder portion, and being at least partially disposed within the second bushing and configured to fit through a hole in a part of the aircraft structure.

The support pin assembly further comprises a sleeve bushing slideably disposed over the part support portion and having a sleeve bushing first end configured to engage and clamp a portion of the part against the second end of the shoulder portion.

The support pin assembly further comprises a retainer element coupled to the part support portion and retaining the sleeve bushing to the part support portion. The retainer element is configured to cause the sleeve bushing to clamp the portion of the part against the second end of the shoulder portion.

The support pin assembly further comprises a gauge assembly having a pin groove engagement portion configured for coupling to the pin groove on the shoulder portion. The support pin assembly allows for a lateral movement of the pin and the part of the aircraft structure, to enable the full size determinant assembly.

In another version of the disclosure, there is provided a support system for full size determinant assembly of an aircraft structure. The support system comprises an assembly jig. The support system further comprises at least one part of the aircraft structure for the full size determinant assembly. The at least one part is positioned on, and supported by, the assembly jig.

The support system further comprises one or more support pin assemblies coupled to the assembly jig and to the at least one part. Each support pin assembly comprises a clevis coupled to the assembly jig. The clevis has a clevis body with a first clevis lug and a second clevis lug. Each support pin assembly further comprises a first bushing disposed within the first clevis lug, and a second bushing disposed within the second clevis lug.

Each support pin assembly further comprises a pin slideably disposed within the first bushing and within the second bushing. The pin comprises a head end and a tail end. The pin further comprises a shoulder portion at least partially disposed within the first bushing. The shoulder portion has a first end, a second end, and a pin groove formed circumferentially on an exterior portion of the shoulder portion. The pin further comprises a part support portion extending from the shoulder portion, and being at least partially disposed within the second bushing and inserted through a hole in the at least one part of the aircraft structure.

Each support pin assembly further comprises a sleeve bushing slideably disposed over the part support portion and having a sleeve bushing first end engaging and clamping a portion of the at least one part against the second end of the shoulder portion. Each support pin assembly further comprises a retainer element coupled to the part support portion and retaining the sleeve bushing to the part support portion. The retainer element causing the sleeve bushing to clamp the portion of the at least one part against the second end of the shoulder portion.

Each support pin assembly further comprises a gauge assembly having a pin groove engagement portion coupled to the pin groove of the pin. Each of the one or more support pin assemblies allows for a lateral movement of the pin and the at least one part of the aircraft structure, to enable the full size determinant assembly.

In another version of the disclosure, there is provided a method of supporting an aircraft structure for full size determinant assembly. The method comprises coupling one or more support pin assemblies to an assembly jig.

Each support pin assembly comprises a clevis coupled to the assembly jig. The clevis has a clevis body with a first clevis lug and a second clevis lug. Each support pin assembly further comprises a first bushing disposed within the first clevis lug, and a second bushing disposed within the second clevis lug.

Each support pin assembly further comprises a pin slideably disposed within the first bushing and within the second bushing. The pin comprises a head end and a tail end. The pin further comprises a shoulder portion at least partially disposed within the first bushing. The shoulder portion has a first end, a second end, and a pin groove formed circumferentially on an exterior portion of the shoulder portion. The pin further comprises a part support portion extending from the shoulder portion, and being at least partially disposed within the second bushing.

Each support pin assembly further comprises a sleeve bushing slideably disposed over the part support portion. Each support pin assembly further comprises a retainer element coupled to the part support portion. The retainer element retains the sleeve bushing to the part support portion. Each support pin assembly further comprises a gauge assembly having a pin groove engagement portion coupled to the pin groove on the shoulder portion.

The method further comprises positioning and supporting on the assembly jig at least one part of the aircraft structure for the full size determinant assembly. The method further comprises inserting through a hole in the at least one part, the part support portion of the pin of a selected support pin assembly of the one or more support pin assemblies.

The method further comprises clamping a portion of the at least one part against the second end of the shoulder portion of the pin of the selected support pin assembly, by using the retainer element to urge the sleeve bushing to clamp the portion of the at least one part between the second end and the sleeve bushing. The method further comprises using the gauge assembly of the selected support pin assembly to position and to laterally move the pin and the at least one part of the aircraft structure, to enable the full size determinant assembly.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

Figure 1:
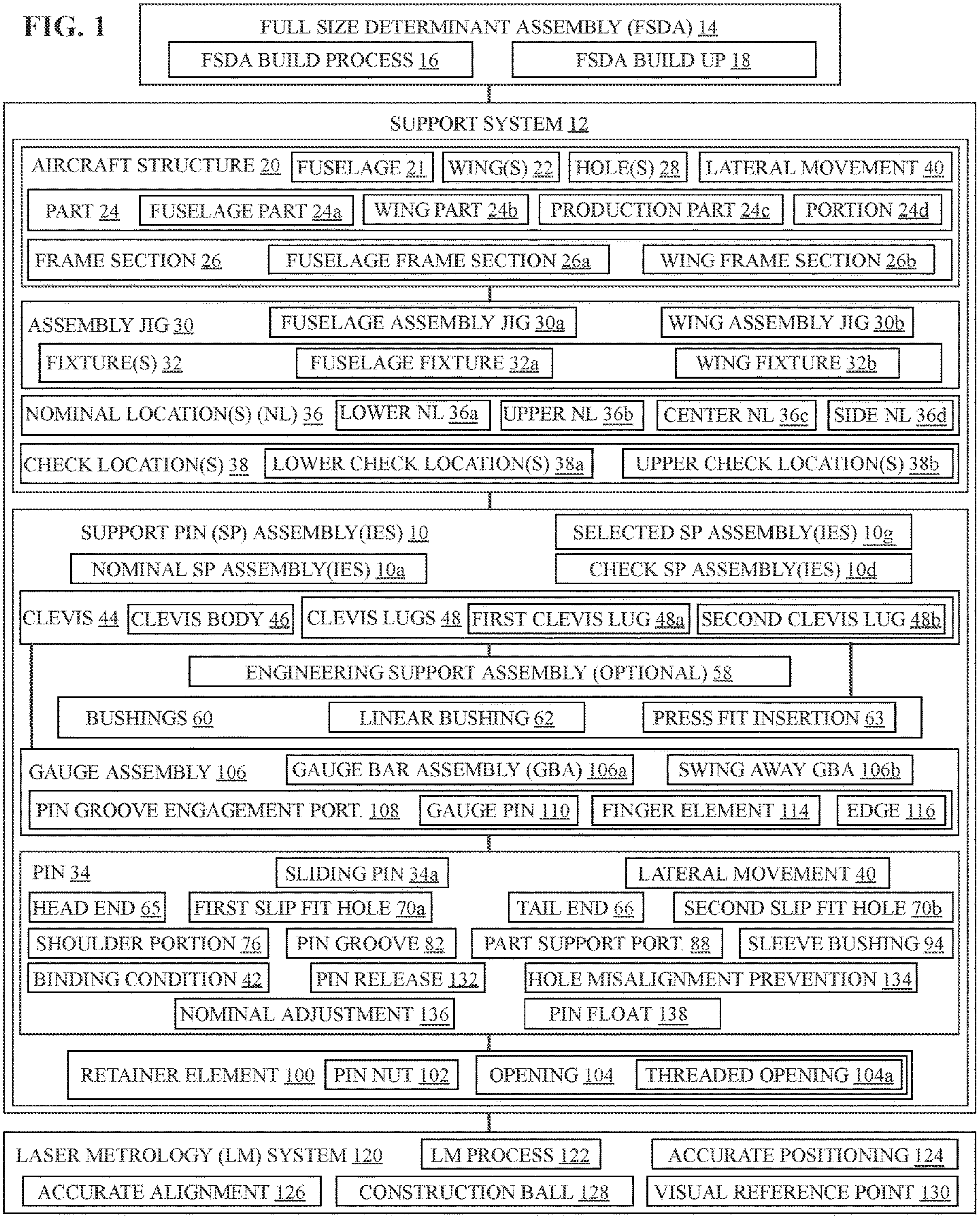
FIG. 1 is an illustration of a block diagram of an exemplary version of a support pin assembly of the disclosure that is part of an exemplary support system of the disclosure for full size determinant assembly.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary version of a support pin assembly 10, such as a support sliding pin assembly, of the disclosure, that is part of an exemplary support system 12 of the disclosure for full size determinant assembly (FSDA) 14, including a full size determinant assembly (FSDA) build process 16 and a full size determinant assembly (FSDA) build up 18, of an aircraft structure 20, such as a fuselage 21, a wing 22, or another suitable aircraft structure. As used herein, "full size determinant assembly" means a precision assembly or manufacturing method or process that uses alignment features, such as holes produced to their final size at a detail part level, as opposed to match drilling holes during an assembly operation, to index component parts and assemblies relative to each other, and that eliminates or minimizes the use of hard tooling by replacing it with self-locating detail parts that determine the configuration of the assembly by their own dimensions and certain coordinating features incorporated into the design of the parts.

The blocks in FIG. 1 represent elements, and lines connecting the various blocks do not imply any particular dependency of the elements. Furthermore, the connecting lines shown in the various figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the support pin assembly 10 and the support system 12 in FIG. 1 are not meant to imply physical or architectural limitations to the manner in which an illustrative example may be implemented. Other components in addition to, or in place of, the ones illustrated may be used. Some components may be unnecessary.

The one or more support pin assemblies 10 are designed to pin in place and support a part 24 (see FIG. 1). As shown in FIG. 1, the part 24 may comprise a fuselage part 24*a*, a wing part 24*b*, or another type of production part 24*c*, of the aircraft structure 20, while having the ability to slide or be nominally adjusted for the full size determinant assembly build process 16. As shown in FIG. 1, in one version, the part 24, such as the production part 24*c*, of the aircraft structure 20 comprises a frame section (FS) 26 of the aircraft structure 20. The part 24, such as the production part 24*c*, has one or more holes 28 through the part 24 configured for coupling with one or more of the support pin assemblies 10. The frame section 26 may comprise a fuselage frame section (FS) 26*a* (see FIG. 1), for example, a bulkhead frame section, a keel frame section, or another suitable fuselage frame section. The frame section 26 may further comprise a wing frame section (FS) 26*b* (see FIG. 1), for example, a rib frame section, a spar frame section, or another suitable wing frame section. In other versions, the part 24, such as the production part 24*c*, comprises other suitable aircraft parts for aircraft structures 20.

The support system 12 further comprises an assembly jig (AJ) 30 (see FIG. 1). The assembly jig 30 may comprise a fuselage assembly jig (AJ) 30*a* (see FIG. 1), for example a forward fuselage assembly jig, an aft fuselage assembly jig, or another suitable fuselage assembly jig. The assembly jig 30 may further comprise a wing assembly jig (AJ) 30*b* (see FIG. 1), for example, an inner wing assembly jig, an outer wing assembly jig, or another suitable wing assembly jig. In other versions, the assembly jig 30 comprises other suitable types of aircraft structure assembly jigs. As used herein. "assembly jig" means an assembly that determines both a location of the assembly and a position of assembly features, such as holes, in a manufacturing process, such as full size determinant assembly. The assembly jig 30 may also be referred to as a tool or a full tool.

As shown in FIG. 1, the support system 12 further comprises one or more fixtures 32, or fixture assemblies. The assembly jig 30 comprises the one or more fixtures 32, or fixture assemblies, that make up the full assembly jig 30. The fixture 32 may comprise a fuselage fixture 32*a* (see FIG. 1), for example, a forward fuselage fixture, an aft fuselage fixture, or another suitable fuselage fixture or fixture assembly. The fixture 32 may further comprise a wing fixture 32*b* (see FIG. 1), for example, an inner wing fixture, an outer wing fixture, or another suitable wing fixture. In other versions, the fixture 32 comprises other suitable types of aircraft structure fixture devices or assemblies. The part 24, such as the production part 24*c*, of the aircraft structure 20 for the full size determinant assembly 14 is positioned on, and supported by, the one or more fixtures 32 or fixture assemblies that make up the assembly jig 30. As used herein, a "fixture" or a "fixture assembly" means a support structure or apparatus that is part of an assembly jig, to hold, support, and locate an assembly in a manufacturing process, such as full size determinant assembly, but the fixture does not determine a position of assembly features, such as holes.

As shown in FIG. 1, the support system 12 further comprises one or more support pin assemblies 10, such as one or more support sliding pin assemblies, each having a pin 34 (see FIG. 1), such as a sliding pin 34*a* (see FIG. 1), or a floating pin. The one or more support pin assemblies 10 comprise one or more nominal support pin (SP) assemblies 10*a* (see FIG. 1) each having the pin 34, such as the sliding pin 34*a*, positioned at a nominal location 36 (see FIG. 1) through the hole 28 in the part 24. As shown in FIG. 1, the nominal support pin assembly 10*a* may comprise a lower nominal support pin assembly 10*b* (see also FIGS. 2A, 12A) having the pin 34, such as the sliding pin 34*a*, positioned or located at a lower nominal location 36*a*, or may comprise an upper nominal support pin assembly 10*c* (see also FIG. 3A) having the pin 34, such as the sliding pin 34*a*, positioned or located at an upper nominal location 36*b*, or may comprise another nominal support pin assembly 10*a*. As shown in FIG. 1, the nominal support pin assembly 10*a* may have the pin 34, such as the sliding pin 34*a*, further located at a center nominal location 36*c* on the part 24 or a side nominal location 36*d* on the part 24. The nominal support pin assembly 10*a* may be positioned or located at another suitable nominal location 36 on the part 24.

As further shown in FIG. 1, the one or more support pin assemblies 10 may comprise a check support pin assembly 10*d* having the pin 34, such as the sliding pin 34*a*, positioned at a check location 38 on the part 24 of the aircraft structure 20. As shown in FIG. 1, the check support pin assembly 10*d* may comprise a lower check support pin assembly 10*e* (see also FIG. 4A) having the pin 34, such as the sliding pin 34*a*, positioned or located at a lower check location 38*a*, or may comprise an upper check support pin assembly 10*f* (see also FIG. 5A) having the pin 34, such as the sliding pin 34*a*, positioned or located at an upper check location 38*b*. The check support pin assembly 10*d* may be positioned or located at another suitable check location 38 on the part 24 of the aircraft structure 20.

Each of the one or more support pin assemblies 10 allows for a lateral movement 40 (see FIG. 1) of the pin 34, such as the sliding pin 34*a*, and the part 24 of the aircraft structure 20, to enable the full size determinant assembly 14, and to avoid a binding condition 42 of the pin 34. As used herein, a "binding condition" means an immovable condition where a pin is not able to move and cannot be removed from an assembly jig.

Figure 2A:
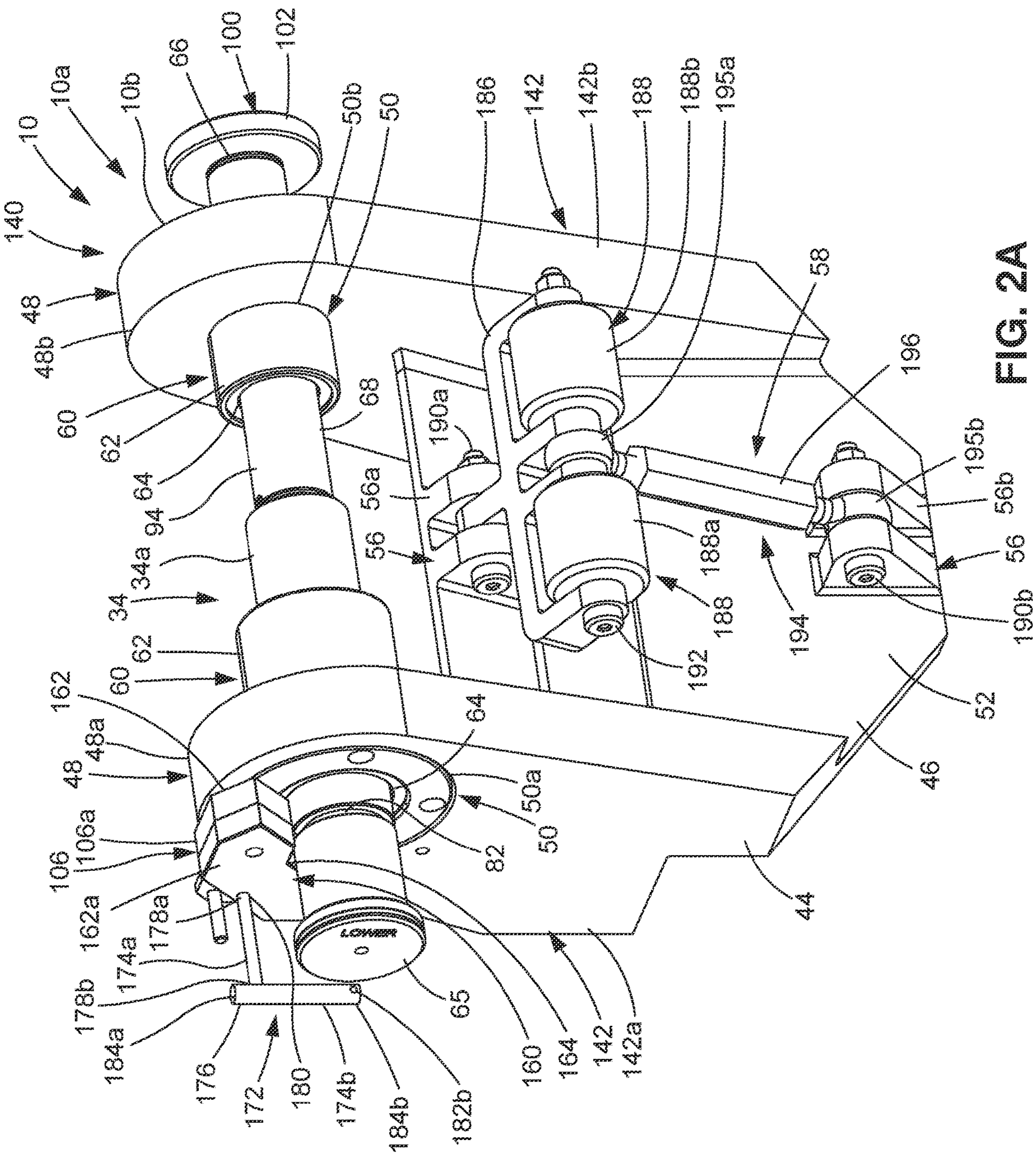
FIG. 2A is an illustration of a front perspective view of an exemplary version of a support pin assembly, in the form of a lower nominal support pin assembly, of the disclosure, in an assembled configuration.
Figure 8B:
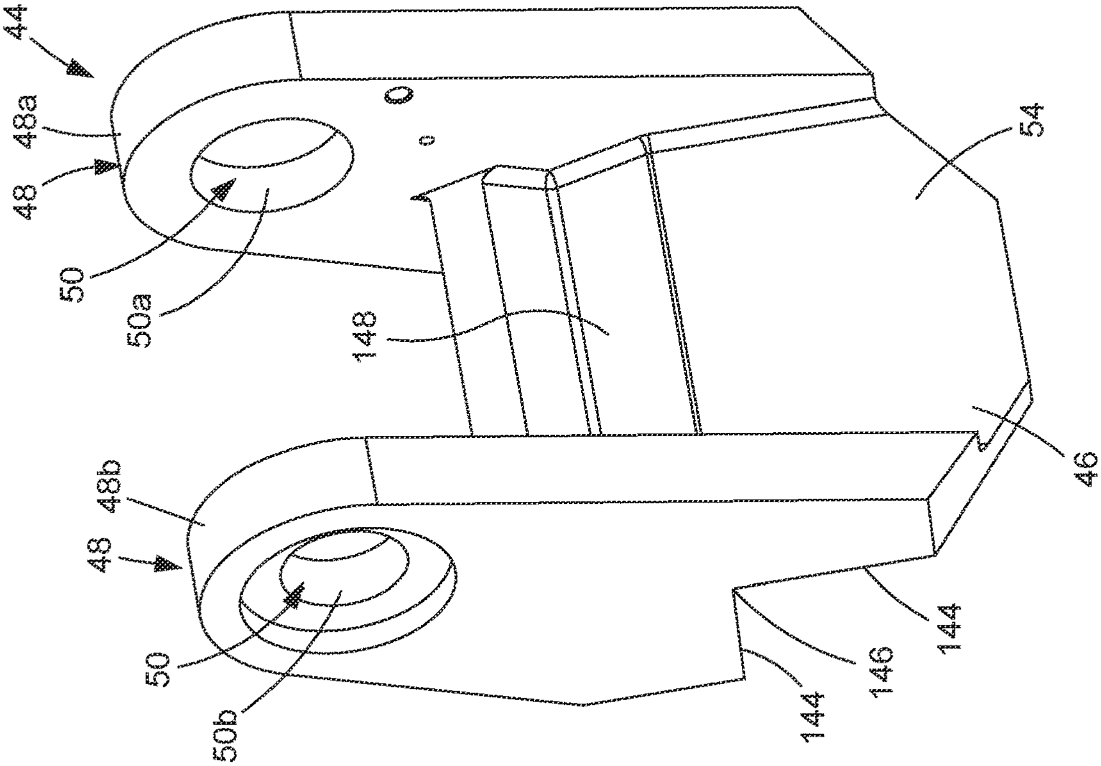
FIG. 8B is an illustration of a back perspective view of the clevis of FIG. 8A.
Figure 8A:
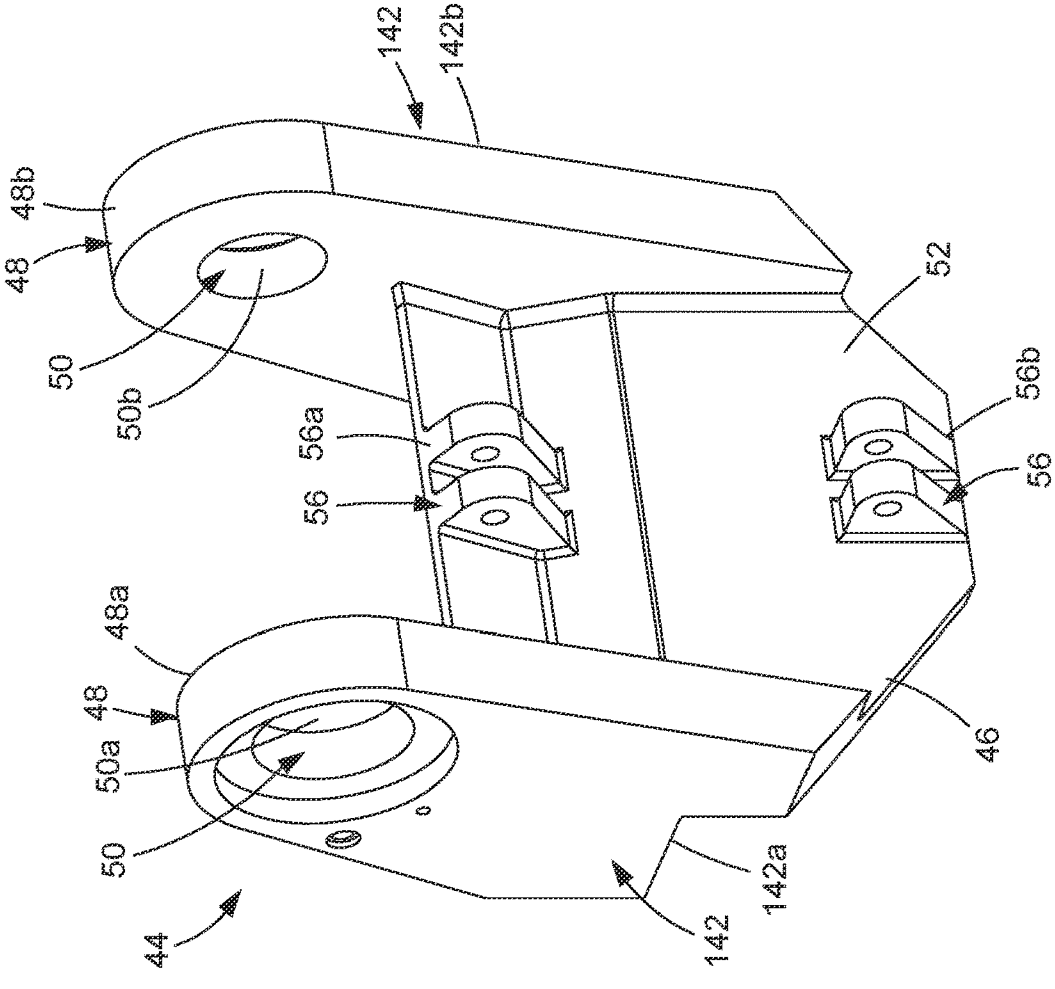
FIG. 8A is an illustration of a front perspective view of an exemplary version of a clevis used in an exemplary version of a support pin assembly of the disclosure.

As shown in FIG. 1, the support pin assembly 10 comprises a clevis 44 (see also FIG. 8A) having a clevis body 46 with clevis lugs 48, such as a first clevis lug 48*a* (see FIG. 8A) and a second clevis lug 48*b* (see FIG. 8A). The clevis 44 is configured for coupling, or mounting, to the assembly jig 30. As shown in FIG. 8A, the clevis lugs 48 each have an opening 50. As shown in FIG. 8A, the first clevis lug 48*a* has a first clevis lug opening 50*a*, and the second clevis lug 48*b* has a second clevis lug opening 50*b*. The clevis 44 further has a first side 52 (see FIG. 8A) and a second side 54 (see FIG. 8B). As shown in FIGS. 2A, 8A, the first side 52 of the clevis 44 has attachment brackets 56, including upper attachment brackets 56*a* and lower attachment brackets 56*b*. Preferably, the clevis 44 is a one-piece, unitary, monolithic configuration. However, the clevis 44 may be made of two or more pieces or parts coupled, or attached, together with a suitable attachment means. A size of the clevis 44 may be scaled up or down depending on the usage and size of the assembly jig 30. For example, for an assembly jig 30 that is small, the clevis 44 may be sized down to a couple inches, and for an assembly jig 30 that is large, the clevis 44 may be sized up to several feet or more. In one version, the clevis 44 is made of a metal material including steel, stainless steel, aluminum, aluminum alloy, or another suitable metal material. In other versions, the clevis 44 may be made of nylon, polyoxymethylene (POM) a high-performance acetal homopolymer resin that is durable, stiff, and stable, wood, or another suitable material. The clevis 44 is discussed below in further detail with respect to FIGS. 2A, 8A-8B.

As shown in FIG. 1, the support pin assembly 10 may optionally comprise an engineering support assembly 58 (see also FIG. 2A) coupled to the attachment brackets 56, including the upper attachment brackets 56*a* and the lower attachment brackets 56*b* of the clevis 44. Once the part 24 is nominally located with the pin 34, instead of having all the weight carried on the pin 34, the engineering support assembly 58 may be used to assist in carrying some of the load of the part 24 being supported on the assembly jig 30. The engineering support assembly 58 is discussed below in further detail with respect to FIG. 2A.

Figure 7:
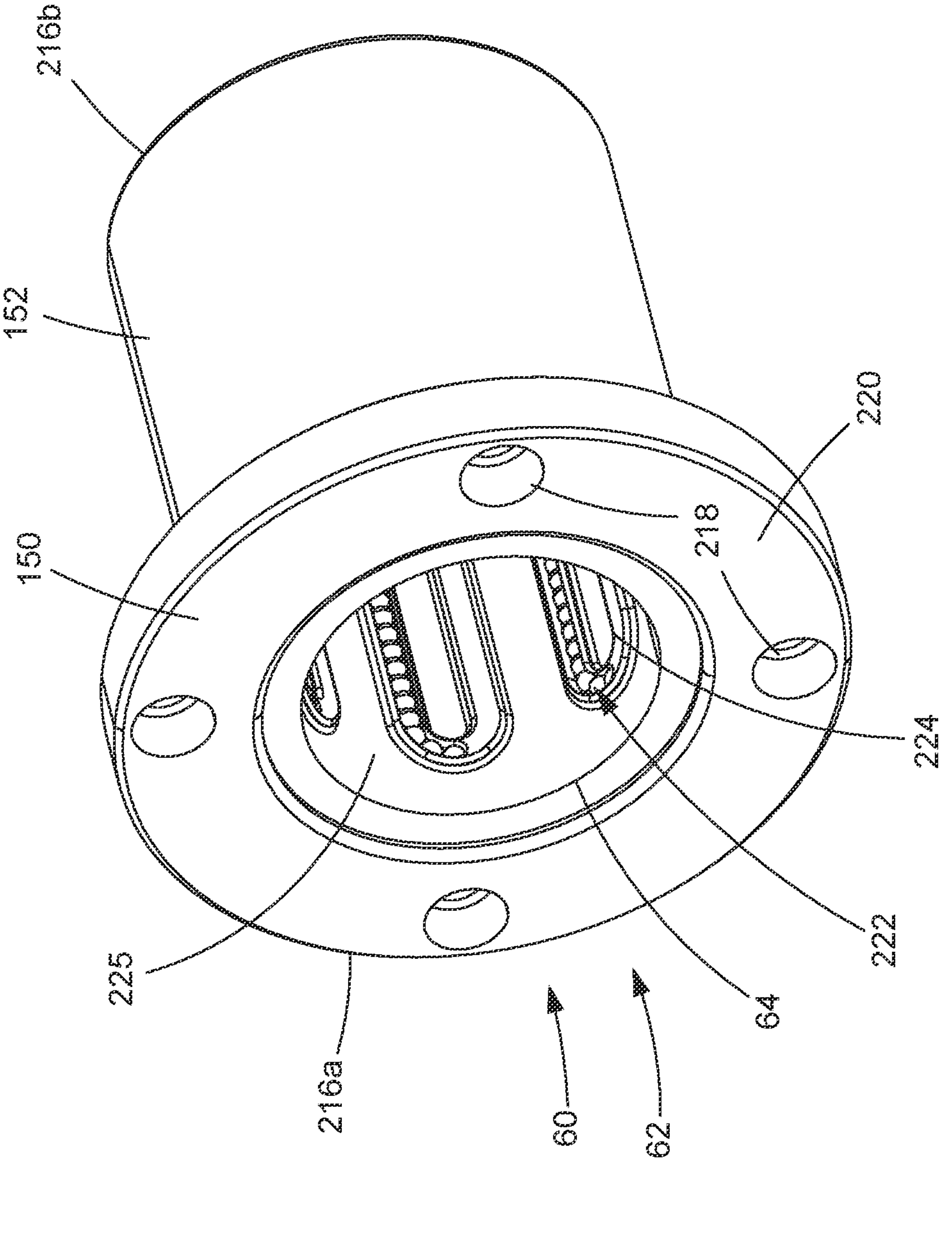
FIG. 7 is an illustration of a perspective view of an exemplary version of a bushing, in the form of a linear bushing, used in an exemplary version of a support pin assembly of the disclosure.

As shown in FIG. 1, the support pin assembly 10 further comprises bushings 60 (see also FIG. 7), such as in the form of linear bushings 62 (see also FIG. 7). As shown in FIG. 2G, the bushings 60, such as the linear bushings 62, include a first bushing 60*a*, such as a first linear bushing 62*a*, disposed within the first clevis lug 48*a*, and a second bushing 60*b*, such as a second linear bushing 62*b*, disposed within the second clevis lug 48*b*. The bushings 60, such as the linear bushings 62, each comprises a through opening 64 (see FIGS. 2G, 7). Each bushing 60, such as each linear bushing 62, is preferably press fit within, and horizontally aligned within, the openings 50 of the clevis lugs 48 in a press fit insertion 63 (see FIG. 1).

In one version, each bushing 60 is formed of a metal material including steel, stainless steel, aluminum, aluminum alloy, or another suitable metal material. In other versions, the bushing 60 may be made of nylon, polyoxymethylene (POM) a high-performance acetal homopolymer resin that is durable, stiff, and stable, wood, or another suitable material. The bushings 60, such as the linear bushings 62, are discussed below in further detail with respect to FIGS. 2G, 7.

As shown in FIGS. 1, 2A, 2G, the support pin assembly 10 further comprises the pin 34, such as the sliding pin 34*a*, slideably disposed within the through openings 64 of the bushings 60, such as the linear bushings 62, including the first bushing 60*a*, such as the first linear bushing 62*a*, disposed within the first clevis lug 48*a*, and the second bushing 60*b*, such as the second linear bushing 62*b*, disposed within the second clevis lug 48*b*. Thus, the pin 34 is slidably disposed within the first bushing 60*a* and the first clevis lug 48*a*, and is slidably disposed within the second bushing 60*b* and the second clevis lug 48*b*.

As shown in FIGS. 1, 2G, the pin 34 comprises a head end 65, a tail end 66, and a body 68, such as a cylindrical body, formed between the head end 65 and the tail end 66. As shown in FIG. 1, the tail end 66 is preferably a threaded tail end 66*a*. As shown in FIGS. 1, 2G, the head end 65 has a slip fit hole 70, such as a first slip fit hole 70*a*, formed in the head end 65, and the tail end 66 has a slip fit hole 70, such as a second slip fit hole 70*b*, formed in the tail end 66. In one version, the head end 65 (see FIGS. 2C, 4D) may be marked with a LOWER indicator 71*a* (see FIGS. 2C, 4D) to indicate the pin 34 configured to be located at a hole 28 (see FIGS. 12A, 12C, 2E) in a frame section 26 (see FIGS. 12A, 12C, 12E) of a part 24 (see FIGS. 12A, 12C, 12E) at a nominal location 36 (see FIGS. 1, 12A, 12C, 12E), such as a lower nominal location 36*a* (see FIGS. 1, 12A, 12C, 12E). In another version, the head end 65 (see FIGS. 3A, 3D, 5B, 5C, 6A) may be marked with an UPPER indicator 71*b* (see FIGS. 3A, 3D, 5B, 5C, 6A) to indicate the pin 34 configured to be located at a hole 28 (see FIG. 12A) in a frame section 26 (see FIG. 12A) of a part 24 (see FIG. 12A) at a nominal location 36 (see FIGS. 1, 12A), such as an upper nominal location 36*b* (see FIGS. 1, 12A). As shown in FIG. 2G, the pin 34 has an exterior 72 and an interior 74. The pin 34 has a length 75 (see FIG. 6A) that is sufficiently long to slide through the bushings 60, such as the linear bushings 62, and is sized for sufficiently carrying the loads of the parts 24, such as the fuselage part 24*a*, the wing part 24*b*, or another suitable production part 24*c* for the full size determinate assembly 14.

The pin 34, such as the body 68 of the pin 34, further comprises a shoulder portion 76 (see FIGS. 1, 2G) at least partially disposed within the first bushing 60*a* (see FIG. 2G), such as the first linear bushing 62*a* (see FIG. 2G). The shoulder portion 76 has a first end 78 (see FIG. 2G), a second end 80 (see FIG. 2G), and a pin groove 82 (see FIG. 2G) formed circumferentially on an exterior portion 72*a* of the shoulder portion 76 of the pin 34. The shoulder portion 76 has a cylindrical shape 84*a* (see FIG. 6A) and has an outer diameter 86*a* (see FIG. 6A). The pin 34 may also be in the form of a shoulder bolt.

Figure 6A:
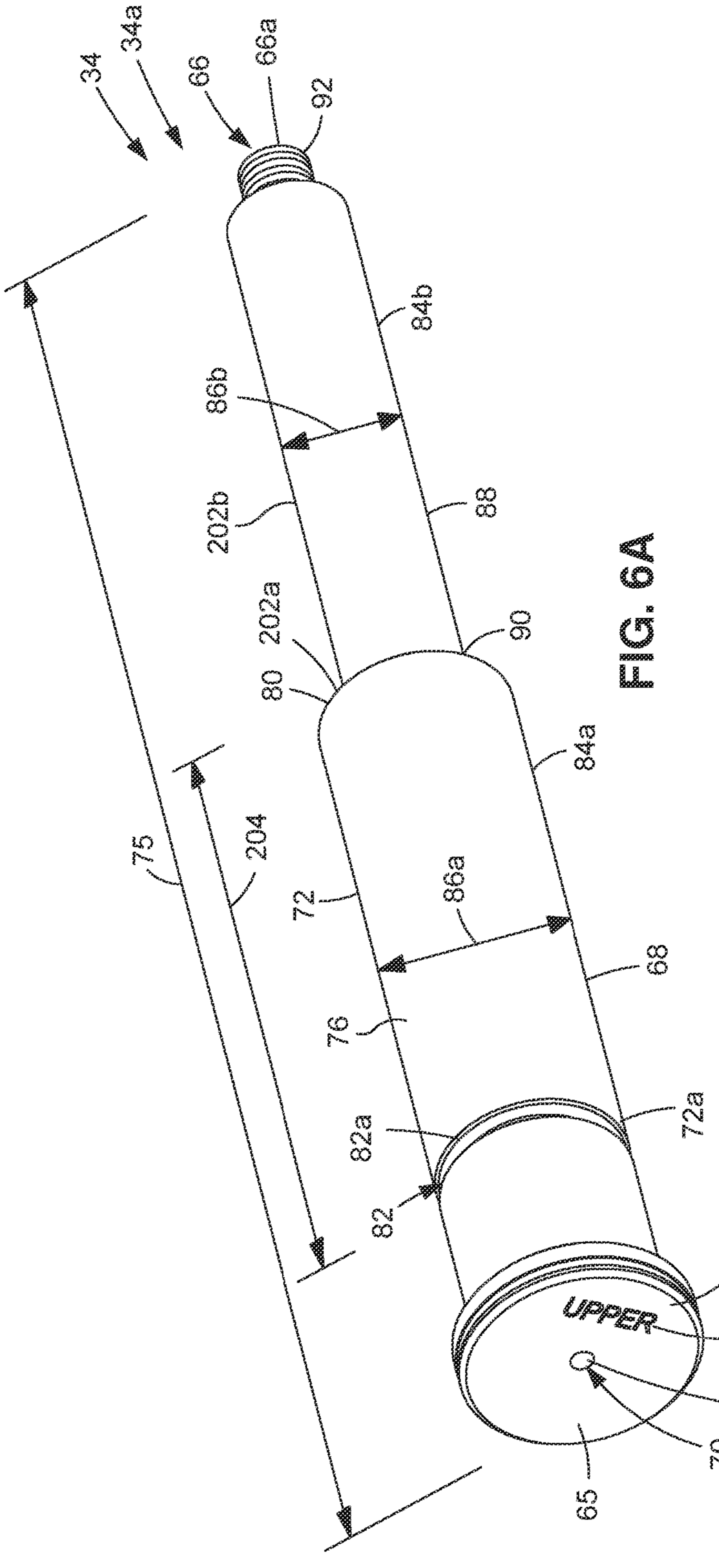
FIG. 6A is an illustration of a perspective view of an exemplary version of a pin used in an exemplary version of a support pin assembly of the disclosure.

The pin 34, such as the body 68 of the pin 34, further comprises a part support portion 88 (see FIGS. 1, 2G, 6A) extending from the second end 80 of the shoulder portion 76, and being at least partially disposed within the second bushing 60*b* (see FIG. 2G), such as the second linear bushing 62*b* (see FIG. 2G), and configured to fit through a hole 28 in a part 24 of the aircraft structure 20. As shown in FIG. 2G, the part support portion 88 has a first end 90 and a second end 92, and the part support portion 88 is at least partially disposed within the second bushing 60*b*, such as the second linear bushing 62*b*, and is configured to fit through and be inserted through the hole 28 in the part 24 of the aircraft structure 20. The part support portion 88 has a cylindrical shape 84*b* (see FIG. 6A) and has an outer diameter 86*b* (see FIG. 6A). As shown in FIG. 6A, the outer diameter 86*a* of the shoulder portion 76 is greater in length than a length of the outer diameter 86*b* of the part support portion 88, and the outer diameter 86*b* of the part support portion 88 is smaller in length than the length of the outer diameter 86*a* of the shoulder portion 76.

A size of the pin 34 may be scaled up or down depending on the usage and size of the assembly jig 30. For example, for an assembly jig 30 that is small, the pin 34 may be sized down to a couple inches, and for an assembly jig 30 that is large, the pin 34 may be sized up to several feet or more. In one version, the pin 34 is formed of a metal material including steel, stainless steel, aluminum, aluminum alloy, or another suitable metal material. In other versions, the pin 34 may be made of nylon, polyoxymethylene (POM) a high-performance acetal homopolymer resin that is durable, stiff, and stable, wood, another suitable material. The pin 34 is discussed below in further detail with respect to FIGS. 2G, 6A.

As shown in FIGS. 1, 2G, 6B-6C, the support pin assembly 10 further comprises a sleeve bushing 94 slideably disposed over an exterior portion 72*b* (see FIG. 2G) of the part support portion 88 of the pin 34. The sleeve bushing 94 has a sleeve bushing first end 96 (see FIGS. 2G, 6B-6C) and a sleeve bushing second end 98 (see FIGS. 2G, 6B-6C). The sleeve bushing first end 96 (see FIG. 2G) is configured to engage and clamp a portion 24*d* (see FIGS. 1, 12E) of the part 24 (see FIGS. 1, 12E) against the second end 80 (see FIGS. 2G, 12E) of the shoulder portion 76 (see FIGS. 1, 2G, 12E).

In one version, the sleeve bushing 94 is formed of a metal material including steel, stainless steel, aluminum, aluminum alloy, or another suitable metal material. In other versions, the sleeve bushing 94 may be made of nylon, polyoxymethylene (POM) a high-performance acetal homopolymer resin that is durable, stiff, and stable, wood, or another suitable material. The sleeve bushing 94 is discussed below in further detail with respect to FIGS. 6B-6C.

Figure 9:
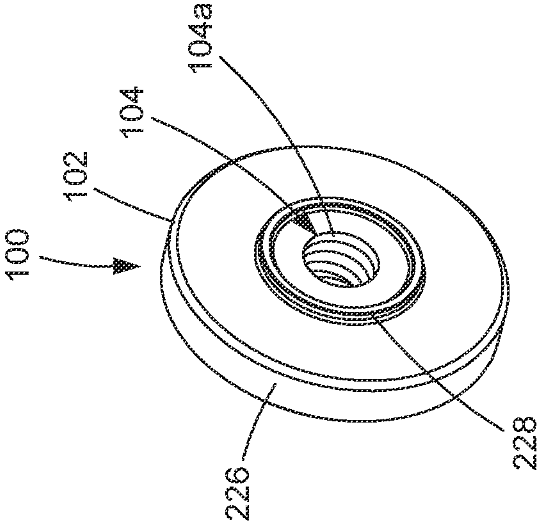
FIG. 9 is an illustration of a perspective view of an exemplary version of a retainer element used in an exemplary version of a support pin assembly of the disclosure.

As shown in FIGS. 1, 2G, 9, the support pin assembly 10 further comprises a retainer element 100, such as in the form of a pin nut 102 (see FIGS. 1, 9), coupled to the second end 92 (see FIG. 2G) of the part support portion 88 (see FIG. 2G) of the pin 34 (see FIG. 2G). The retainer element 100 retains the sleeve bushing 94 to the part support portion 88. The retainer element 100, such as the pin nut 102, has an opening 104 (see FIGS. 1, 2G, 9), such as a threaded opening 104*a* (see FIGS. 1, 2G, 9). As shown in FIG. 2G, the threaded opening 104*a* of the retainer element 100, such as the pin nut 102, is threadably coupled to the threaded tail end 66*a* of the pin 34. The retainer element 100 is configured to cause the sleeve bushing 94 to clamp the portion 24*d* (see FIG. 12E) of the part 24 against the second end 80 of the shoulder portion 76. In one version, the retainer element 100 is formed of a metal material including steel, stainless steel, aluminum, aluminum alloy, or another suitable metal material. In other versions, the retainer element 100 may be made of nylon, polyoxymethylene (POM) a high-performance acetal homopolymer resin that is durable, stiff, and stable, wood, or another suitable material.

Figure 10:
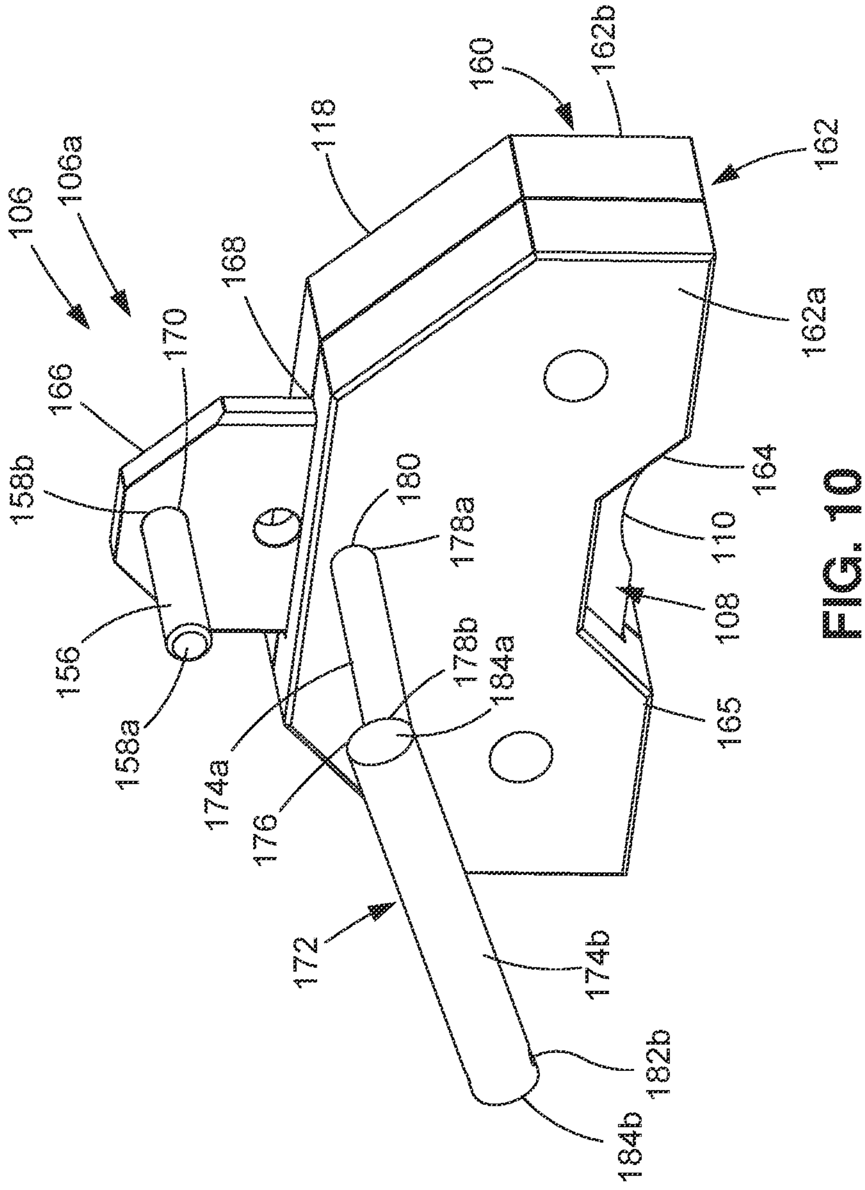
FIG. 10 is an illustration of a perspective view of an exemplary version of a gauge assembly, in the form of a gauge bar assembly, used in an exemplary version of a support pin assembly of the disclosure.
Figure 11:
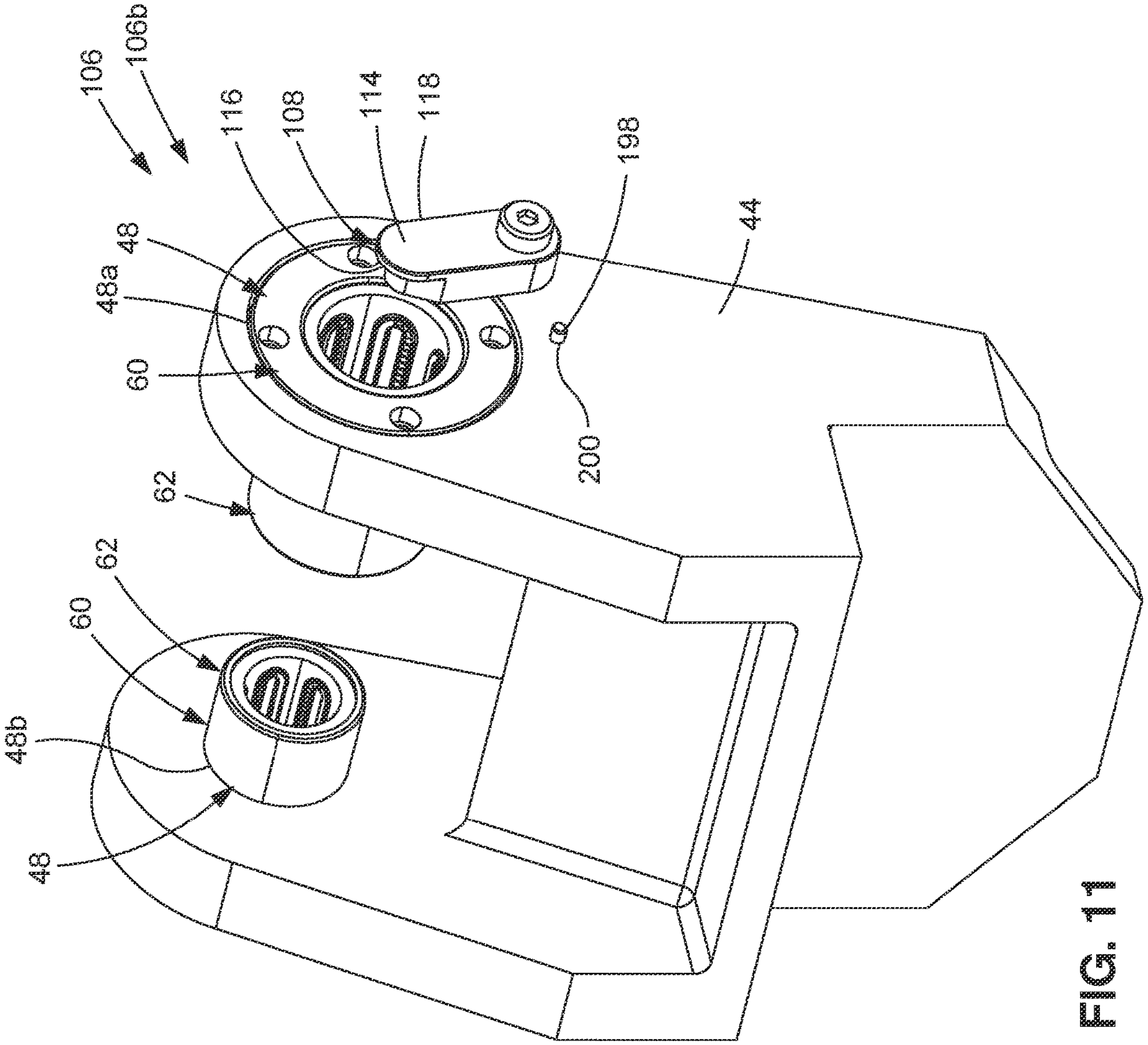
FIG. 11 is an illustration of a perspective view of an exemplary version of a gauge assembly, in the form of a swing away gauge bar assembly, used in an exemplary version of a support pin assembly of the disclosure, and showing linear bushings and a clevis.

As shown in FIGS. 1, 10, 11, the support pin assembly 10 further comprises a gauge assembly 106 having a pin groove engagement portion 108 configured for coupling to, and coupled to, the pin groove 82 (see FIG. 2G) formed on the shoulder portion 76 (see FIG. 2G). As shown in FIG. 1, the gauge assembly 106 may be in the form of a gauge bar assembly 106*a* or a swing away gauge bar assembly 106*b*. The pin groove engagement portion 108 of the gauge bar assembly 106*a* comprises a gauge pin 110 (see FIGS. 1, 10) to locate into the pin groove 82 of the pin 34. The gauge pin 110 is configured for a slip fit removal 112 (see FIG. 1). The pin groove engagement portion 108 of the swing away gauge bar assembly 106*b* comprises a finger element 114 (see FIGS. 1, 11) having an edge 116 (see FIGS. 1, 11) to slide into, or couple to, the pin groove 82 (see FIG. 2G) of the pin 34 (see FIG. 2G). The gauge assembly 106 functions as a lateral movement pin locating gauge assembly 118 (see FIGS. 10, 11). The gauge assembly 106 having the pin groove engagement portion 108 is configured to releasably engage the pin groove 82 of the pin 34, to position the pin 34 at a nominal location 36, and to release from the pin groove 82, to allow the pin 34 to laterally move. The support pin assembly 10 allows the part 24 (see FIGS. 1, 12E) to float, such as float forward and aft, or float in another suitable direction, to allow for full size determinant assembly build up 18 (see FIG. 1), when the gauge assembly 106 (see FIGS. 1, 2A) is not engaged in the pin groove 82 (see FIG. 2A). When the gauge assembly 106 is engaged, the part 24 and the pin 34 cannot float, and are “hard set” to the nominal location 36 (see FIG. 1). The gauge assembly 106 allows the pin 34 to laterally move a distance within the first bushing 60*a* and within the second bushing 60*b* in a range of, for example, 0.5 inch to 2.0 inches. However, based on the design requirements, the pin 34 may laterally move a distance of less than 0.5 inch but greater than 0 (zero) inch, or the pin 34 may laterally move a distance of greater than 2.0 inches.

A size of the gauge assembly 106 may be scaled up or down depending on the usage and size of the assembly jig 30. For example, for an assembly jig 30 that is small, the gauge assembly 106 may be sized down to a couple inches, and for an assembly jig 30 that is large, the gauge assembly 106 may be sized up to several feet or more. In one version, the gauge assembly 106 is made of a metal material including steel, stainless steel, aluminum, aluminum alloy, or another suitable metal material. In other versions, the gauge assembly 106 may be made of nylon, polyoxymethylene (POM) a high-performance acetal homopolymer resin that is durable, stiff, and stable, wood, or another suitable material. The gauge bar assembly 106*a* is discussed below in further detail with respect to FIG. 10, and the swing away gauge bar assembly 106*b* is discussed below in further detail with respect to FIG. 11.

As further shown in FIG. 1, the support system 12 with the one or more support pin assemblies 10 coupled to the assembly jig 30 may be used with a laser metrology (LM) system 120 to perform a laser metrology (LM) process 122, to locate the hole 28 and to confirm an accurate positioning 124 and an accurate alignment 126 of the pin 34 with respect to the hole 28 in the part 24 of the aircraft structure 20. The first slip fit hole 70*a* (see FIGS. 1, 2G) in the head end 65 (see FIGS. 1, 2G) of the pin 34, and/or the second slip fit hole 70*b* (see FIGS. 1, 2G) in the tail end 66 (see FIGS. 1, 2G) of the pin 34 may each be configured to receive a construction ball 128 (see FIG. 1), also referred to as a tooling ball, that creates a visual reference point 130 (see FIG. 1) for the laser metrology system 120 performing the laser metrology process 122, to locate the hole 28 and to confirm the accurate positioning 124 (see FIG. 1) and the accurate alignment 126 (see FIG. 1) of the pin 34 with respect to the hole 28 in the part 24 of the aircraft structure 20. The construction ball 128 comprises a smooth, round metal ball attached to a cylindrical shaft or stem, and the construction ball 128 creates the visual reference point 130 to refer to when performing the laser metrology process 122. As used herein, "laser metrology" means a system and process using optical laser technology scanning to measure, analyze, and optimize structures, such as aircraft structures, for inspection and quality control during manufacturing of aircraft structures and parts, where the laser metrology determines the location of holes in a part for an aircraft structure and/or confirms that a pin is positioned and aligned accurately.

The support system 12 with the one or more support pin assemblies 10 allows for building an aircraft structure 20 (see FIGS. 1, 12A), such as a fuselage 21 (see FIGS. 1, 12A), for example, a full aircraft fuselage, in a single assembly jig 30 with full size determinate assembly 14 (see FIG. 1). Further, the support system 12 with the one or more support pin assemblies 10 does not over constrain the full size determinate assembly build up 18 (see FIG. 1), and allows the full size determinate assembly build up 18 to move or to float by providing a means for a nominal adjustment 136 (see FIG. 1) of the pin 34 (see FIG. 1), or a pin float 138 (see FIG. 1), with the lateral movement 40 (see FIG. 1) of the pin 34. The support system 12 with the one or more support pin assemblies 10 allows for the full size determinate assembly build up 18 to float forward and aft for the full size determinate assembly build process 16 (see FIG. 1). The support system 12 with the one or more support pin assemblies 10 not only allows the pin 34 and the part 24 to float forward and aft but also allows for locating the pin 34 at the nominal location 36 (see FIG. 1) for assembly checks.

As discussed above, the gauge assembly 106 with the pin groove engagement portion 108 is configured to releasably engage, and engages, the pin groove 82 of the pin 34, to position the pin 34 at the nominal location 36 (see FIG. 1), and to release from the pin groove 82, to allow the pin 34 to laterally move. The pin 34 (see FIGS. 1, 12E) and the part 24 (see FIGS. 1, 12E) float, such as float forward and aft as one unit, to avoid any issue of a binding condition 42 (see FIG. 1) of the pin 34 within the hole 28 of the part 24. The clevis 44 (see FIGS. 1, 2A, 12E) is "fixed" in place but the pin 34 (see FIGS. 1, 2A, 12E) and the part 24 are free to float as a single entity through the bushings 60 (see FIGS. 1, 2A, 12E). The gauge assembly 106 (see FIGS. 1, 2A) and the pin groove 82 (see FIGS. 1, 2A) in the pin 34 (see FIGS. 1, 2A) "check" to see if the pin 34 and the part 24 are in the nominal location 36 (see FIGS. 1, 12A) for the forward-aft direction. With the gauge assembly 106 disengaged, the pin 34 and the part 24 are free to float to allow for the full size determinant assembly build process 16 (see FIG. 1). The pin 34 is configured to be released or moved by rotating the pin 34 via the gauge assembly 106. Thus, the support pin assembly 10 and the support system 12 allow for the nominal adjustment 136 (see FIG. 1) of the pin 34 or the pin float 138 (see FIG. 1) of the pin 34, and allow for a pin release 132 (see FIG. 1) and lateral movement 40 (see FIG. 1). The nominal adjustment 136 (see FIG. 1) and the pin float 138 (see FIG. 1) allow the pin 34 to slide laterally, forward and aft, to allow adjustment movement of the part 24 that is being supported during full size determinant assembly 14.

In addition, the support system 12 with the one or more support pin assemblies 10 allows for the ability to move the part 24 or parts 24 of the aircraft structure 20, such as the fuselage 21 or the wing 22, in frame sections 26, such as large frame sections, such as the fuselage frame section 26*a* or the wing frame section 26*b*, with minimal force being applied.

Moreover, the one or more support pin assemblies 10 and the support system 12 provide a means to avoid or prevent possible misalignments of the holes 28 within the part 24 coupled to the assembly jig 30. As shown in FIG. 1, the support system 12 and the one or more support pin assemblies 10 of the support system 12 allow for hole misalignment prevention 134.

The one or more support pin assemblies 10 and the support system 12 with the support pin assembly 10, allow for the build up of the fuselage assembly jig 30*a* without jig lock or pin binding issues. Thus, the support pin assembly 10, such as the support sliding pin assembly, provides for nominal adjustment 136 (see FIG. 1) of the pin 34 and pin float 138 (see FIG. 1) of the pin 34. In addition, the support pin assembly 10, such as the support sliding pin assembly, is a custom pin design that can be used in a variety of full size determinant assembly build ups 18 (see FIG. 1) and that accurately positions and supports the part 24, such as the fuselage part 24*a*, for full size determinant assembly 14 (see FIG. 1).

Figure 2B:
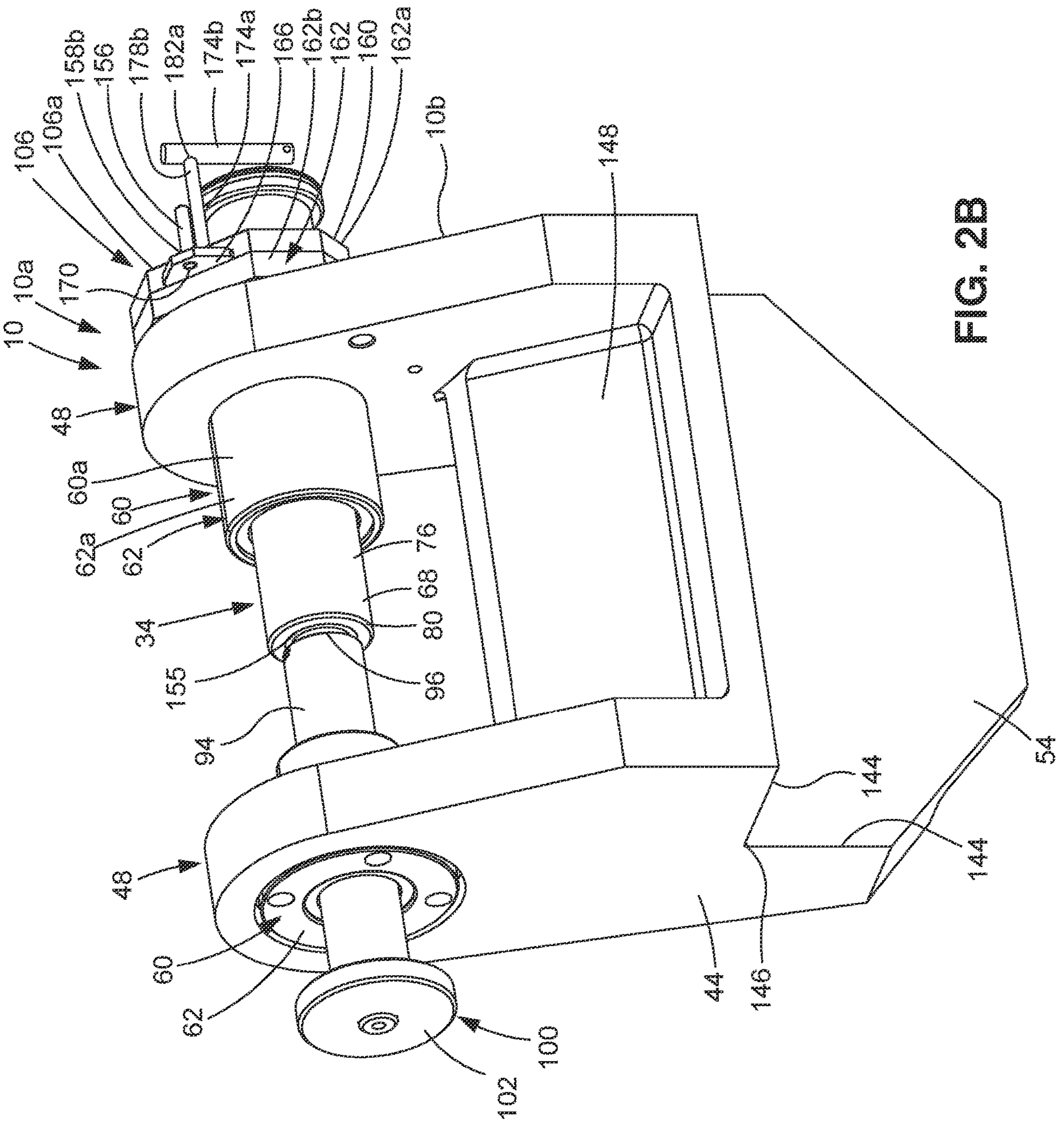
FIG. 2B is an illustration of a back perspective view of the support pin assembly of FIG. 2A.
Figure 2D:
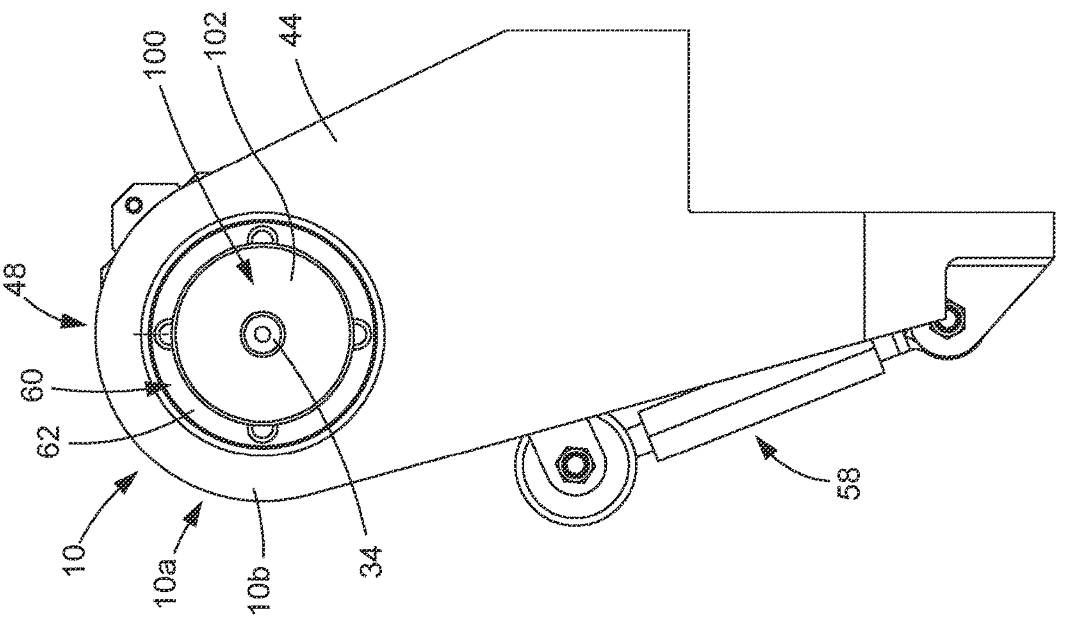
FIG. 2D is an illustration of a left side view of the support pin assembly of FIG. 2A.
Figure 2C:
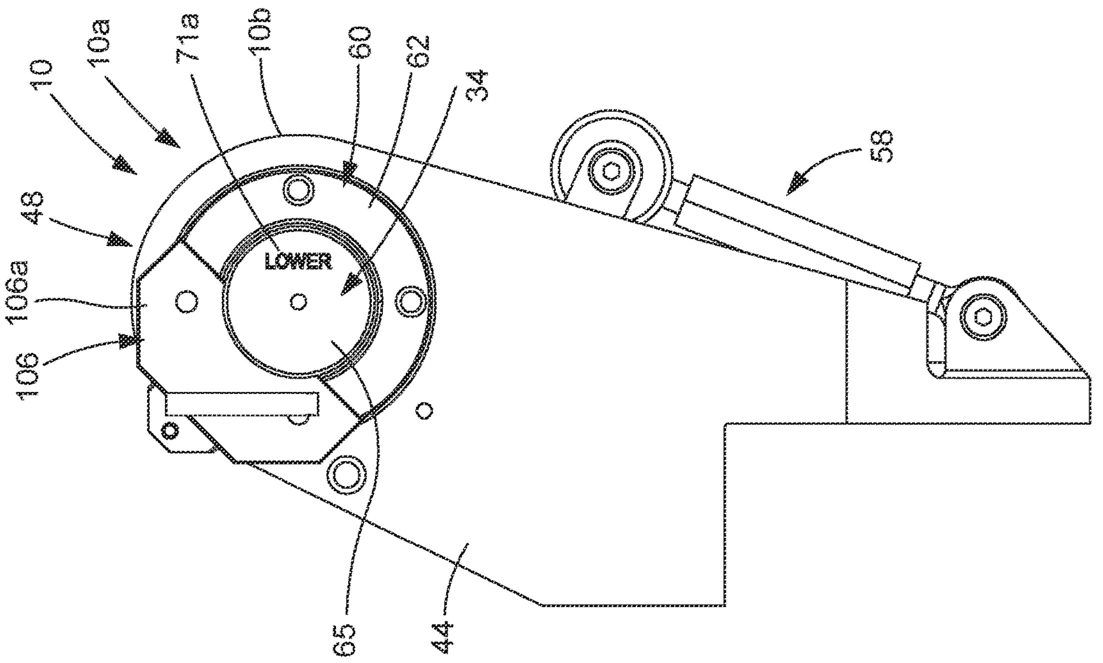
FIG. 2C is an illustration of a right side view of the support pin assembly of FIG. 2A.
Figure 2E:
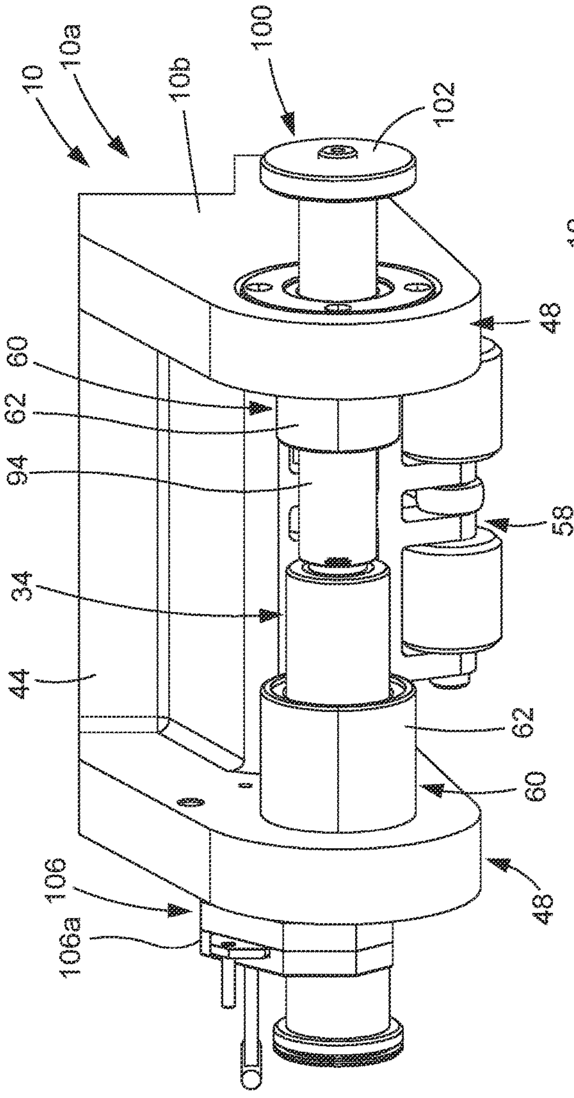
FIG. 2E is an illustration of a top view of the support pin assembly of FIG. 2A.
Figure 2F:
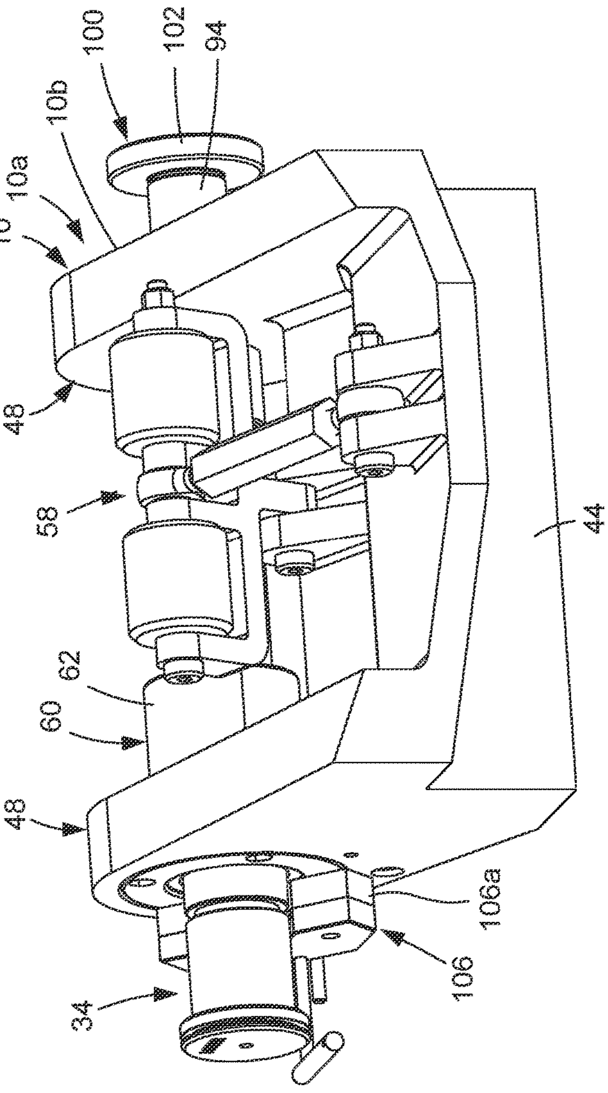
FIG. 2F is an illustration of a bottom view of the support pin assembly of FIG. 2A.
Figure 2G:
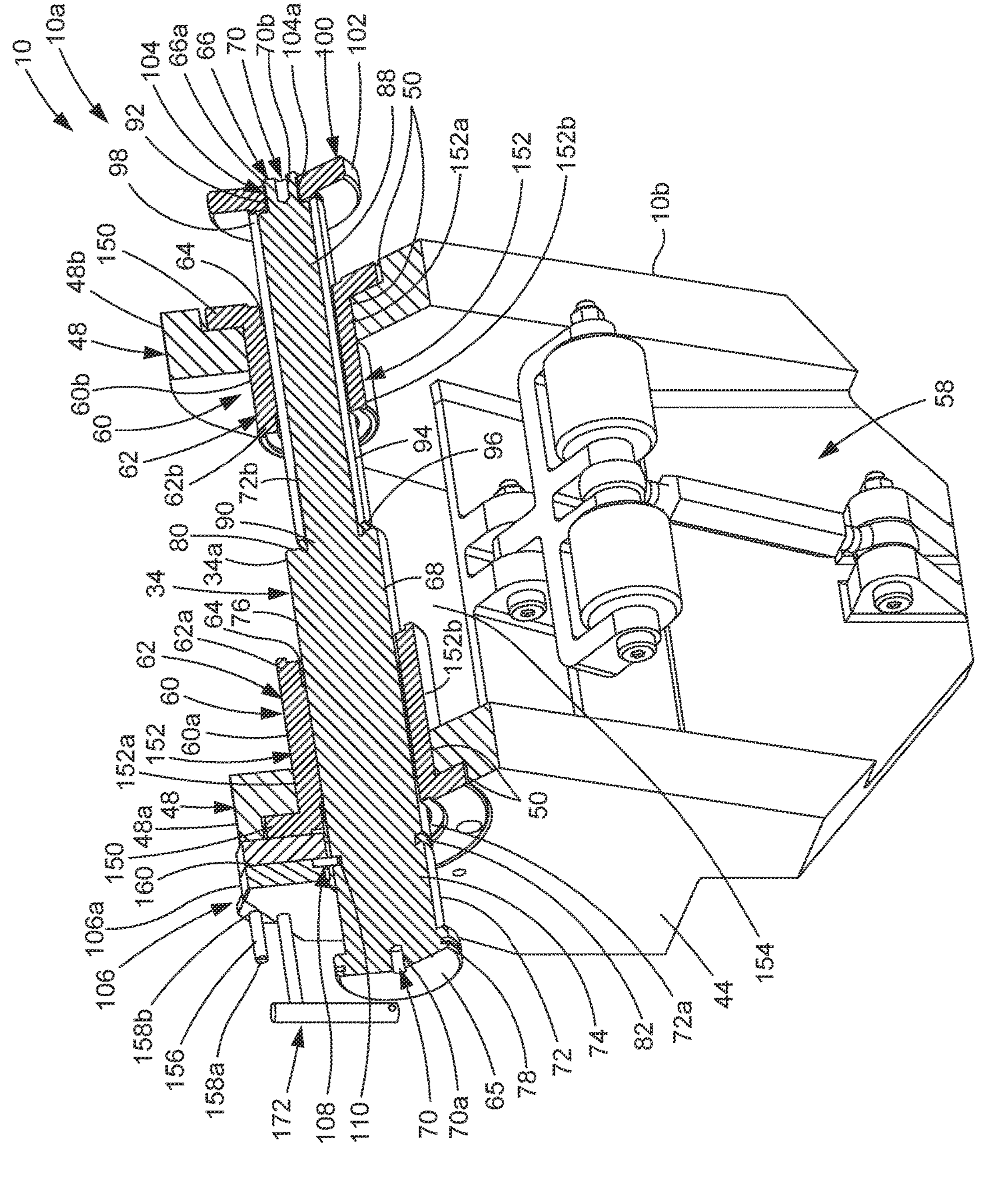
FIG. 2G is an illustration of a partial cross-sectional view of the support pin assembly of FIG. 2A.

Now referring to FIGS. 2A-2G, FIGS. 2A-2G show various views of an exemplary version of a support pin assembly 10, such as a nominal support pin assembly 10*a*, in the form of a lower nominal support pin assembly 10*b*, of the disclosure. FIG. 2A is an illustration of a front perspective view of the exemplary version of the support pin assembly 10, such as the nominal support pin assembly 10*a*, in the form of the lower nominal support pin assembly 10*b*, of the disclosure, in an assembled configuration 140. FIG. 2B is an illustration of a back perspective view of the support pin assembly 10, such as the nominal support pin assembly 10*a*, in the form of the lower nominal support pin assembly 10*b*, of FIG. 2A. FIG. 2C is an illustration of a right side view of the support pin assembly 10, such as the nominal support pin assembly 10*a*, in the form of the lower nominal support pin assembly 10*b*, of FIG. 2A. FIG. 2D is an illustration of a left side view of the support pin assembly 10, such as the nominal support pin assembly 10*a*, in the form of the lower nominal support pin assembly 10*b*, of FIG. 2A. FIG. 2E is an illustration of a top view of the support pin assembly 10, such as a nominal support pin assembly 10*a*, in the form of the lower nominal support pin assembly 10*b*, of FIG. 2A. FIG. 2F is an illustration of a bottom view of the support pin assembly 10, such as a nominal support pin assembly 10*a*, in the form of the lower nominal support pin assembly 10*b*, of FIG. 2A. FIG. 2G is an illustration of a partial cross-sectional view of the support pin assembly 10, such as the nominal support pin assembly 10*a*, in the form of the lower nominal support pin assembly 10*b*, of FIG. 2A.

Figure 12A:
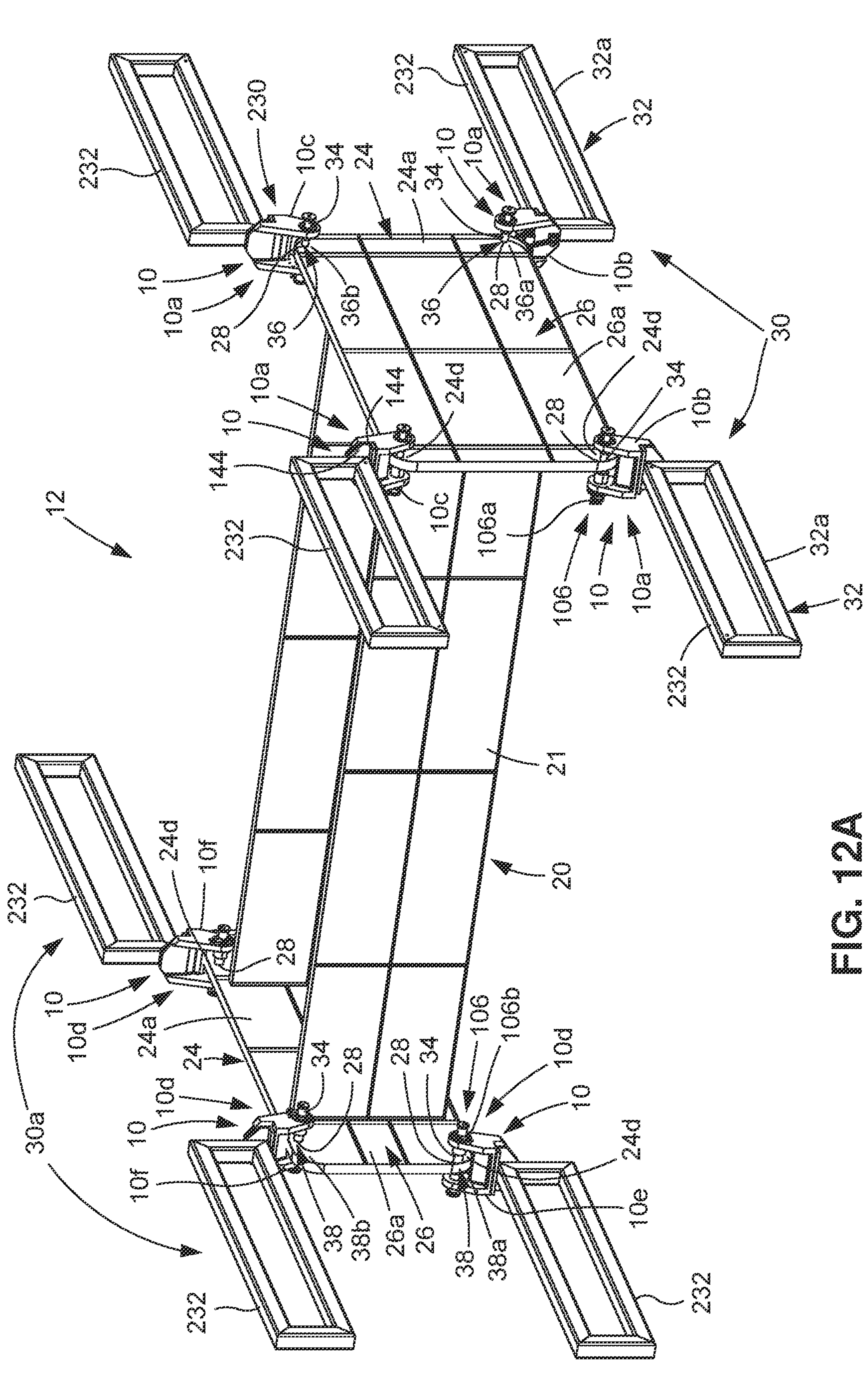
FIG. 12A is an illustration of a front perspective view of an exemplary version of a support system of the disclosure, showing exemplary versions of support pin assemblies coupled to an assembly jig and coupled to parts of an aircraft structure.
Figure 12B:
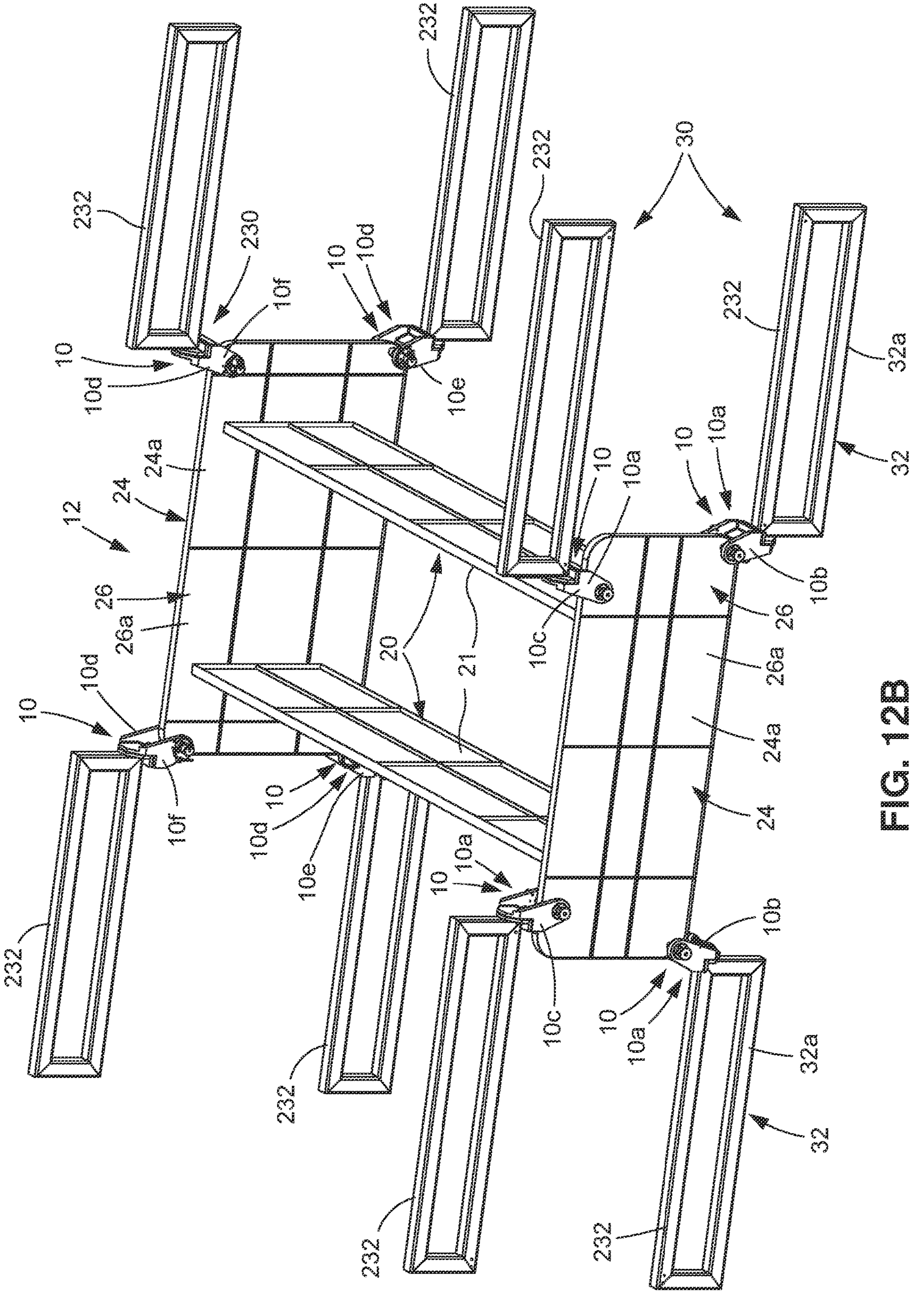
FIG. 12B is an illustration of a left side perspective view of the support system of FIG. 12A.
Figure 12C:
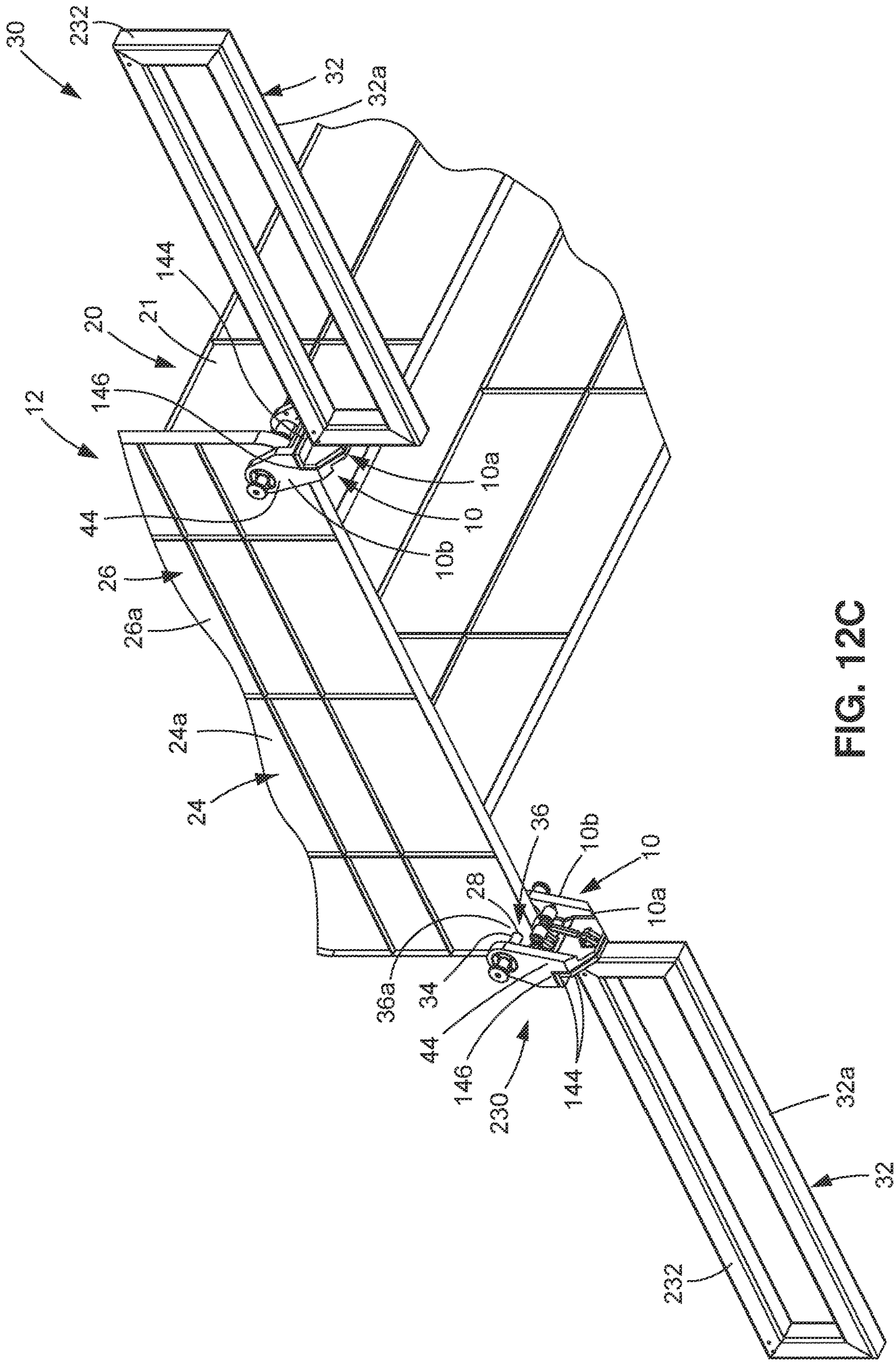
FIG. 12C is an illustration of an enlarged bottom perspective partial view of the support system of FIG. 12A, showing two support pin assemblies in the form of lower nominal support pin assemblies, coupled to the assembly jig and coupled to a part of an aircraft structure.
Figure 12D:
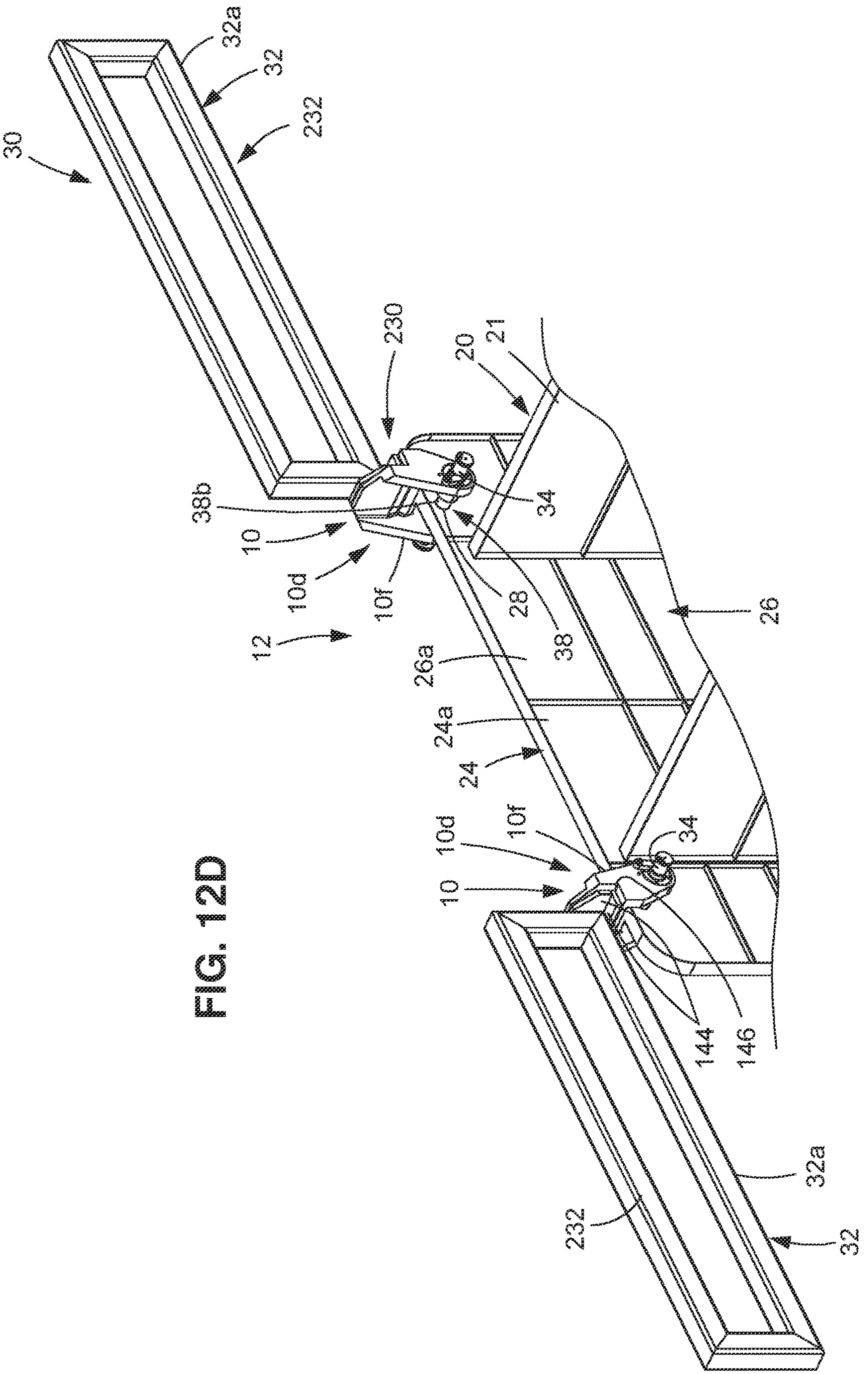
FIG. 12D is an illustration of an enlarged top perspective partial view of the support system of FIG. 12A, showing two support pin assemblies in the form of upper check support pin assemblies, coupled to the assembly jig and coupled to a part of an aircraft structure.
Figure 12E:
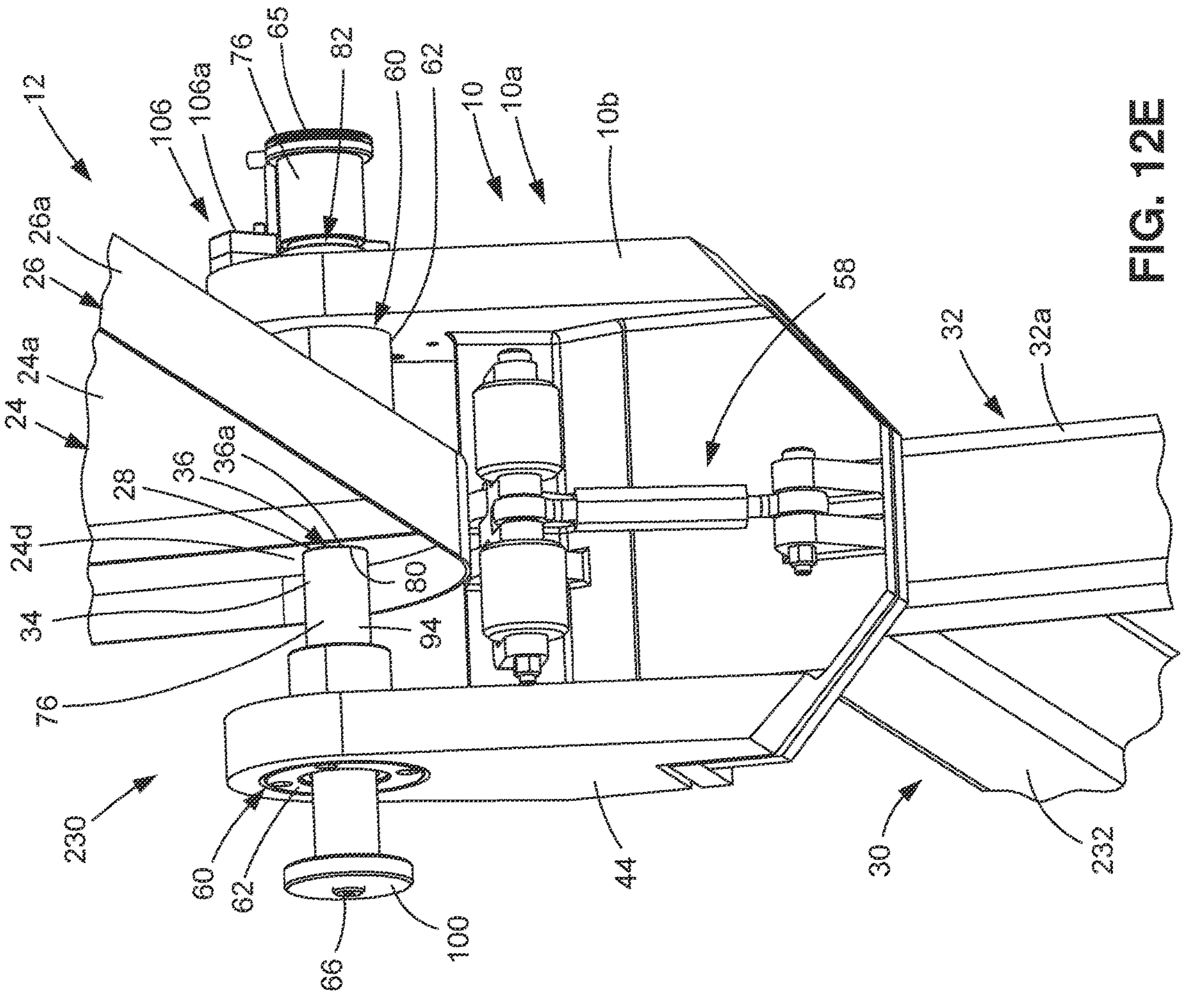
FIG. 12E is an illustration of an enlarged front perspective view of a lower nominal support pin assembly of FIG. 12A.

The support pin assembly 10, such as the nominal support pin assembly 10*a*, in the form of the lower nominal support pin assembly 10*b*, is configured to be coupled or mounted to the assembly jig 30 (see FIGS. 1, 12A), and the pin 34 (see FIGS. 2A-2G) is configured to be located at a hole 28 (see FIG. 12E) in a part 24 (see FIG. 12E) at a nominal location 36 (see FIGS. 1, 12E), such as a lower nominal location 36*a* (see FIGS. 1, 12E). As shown in FIGS. 2A-2G, the support pin assembly 10, such as the nominal support pin assembly 10*a*, in the form of the lower nominal support pin assembly 10*b*, comprises the pin 34 inserted through the bushings 60, such as the linear bushings 62, which are press fit within the clevis lugs 48 of the clevis 44.

As shown in FIG. 2A, the clevis 44 has the clevis body 46 with the clevis lugs 48, such as the first clevis lug 48*a* with the opening 50, such as the first clevis lug opening 50*a*, and such as the second clevis lug 48*b* with the opening 50, such as the second clevis lug opening 50*b*. As shown in FIG. 2A, the clevis lugs 48 are positioned on opposing ends 142 of the clevis 44, such as a first end 142*a* and a second end 142*b*. As shown in FIG. 2A, the clevis 44 has the first side 52 with the attachment brackets 56, including the upper attachment brackets 56*a* and the lower attachment brackets 56*b*. As shown in FIG. 2B, the clevis 44 has the second side 54 with mounting surfaces 144 forming a right angle 146. The mounting surfaces 144 (see FIG. 12C) are configured for mounting to the fixture 32 (see FIG. 12C) of the assembly jig 30 (see FIG. 12C). As shown in FIG. 2B, the second side 54 of the clevis 44 further has a recessed portion 148.

As shown in FIG. 2G, the bushings 60, such as the linear bushings 62, include the first bushing 60*a*, such as the first linear bushing 62*a*, disposed within the first clevis lug 48*a*, and the second bushing 60*b*, such as the second linear bushing 62*b*, disposed within the second clevis lug 48*b*. The bushings 60, such as the linear bushings 62, each comprises the through opening 64 (see FIG. 2G). Each bushing 60, such as each linear bushing 62, is preferably press fit within, and horizontally aligned within, the openings 50 of the clevis lugs 48 in the press fit insertion 63 (see FIG. 1). As shown in FIGS. 2G, 7, each bushing 60, such as each linear bushing 62, comprises a flange portion 150 integral with a cylindrical stem portion 152, and the through opening 64 formed through the center of the flange portion 150 and the cylindrical stem portion 152. As shown in FIG. 2G, the flange portion 150 and a first portion 152*a* of the cylindrical stem portion 152 of the bushings 60, such as the linear bushings 62, are disposed within, or press fit within, the openings 50 of the clevis lugs 48. As further shown in FIG. 2G, a second portion 152*b* of the cylindrical stem portion 152 of the bushings 60, such as the linear bushings 62, extend within an inner space 154 between clevis lugs 48.

As shown in FIGS. 2A, 2G, the pin 34, such as the sliding pin 34*a*, is slideably disposed within the through openings 64 of the bushings 60, such as the linear bushings 62. As shown in FIGS. 2A, 2G, the pin 34 comprises the head end 65, the tail end 66, and the body 68, such as the cylindrical body, formed between the head end 65 and the tail end 66. As shown in FIG. 2G, the tail end 66 is preferably the threaded tail end 66*a*. As shown in FIG. 2G, the head end 65 has the slip fit hole 70, such as the first slip fit hole 70*a*, formed in the head end 65, and the tail end 66 has the slip fit hole 70, such as the second slip fit hole 70*b*, formed in the tail end 66. As shown in FIG. 2G, the pin 34 has the exterior 72 and the interior 74.

As shown in FIGS. 2B, 2G, the pin 34, such as the body 68 of the pin 34, further comprises the shoulder portion 76 at least partially disposed within the first bushing 60*a*, such as the first linear bushing 62*a*, where the shoulder portion 76 has the first end 78 (see FIG. 2G), the second end 80, and the pin groove 82 (see FIG. 2G) formed circumferentially on the exterior portion 72*a* (see FIG. 2G) of the shoulder portion 76 of the pin 34. The shoulder portion 76 has the cylindrical shape 84*a* (see FIG. 6A) and has the outer diameter 86*a* (see FIG. 6A).

As shown in FIG. 2G, the pin 34, such as the body 68 of the pin 34, further comprises the part support portion 88 extending from the second end 80 of the shoulder portion 76, and being at least partially disposed within the second bushing 60*b*, such as the second linear bushing 62*b*, and configured to fit through a hole 28 (see FIG. 12E) in a part 24 (see FIG. 12E) of the aircraft structure 20 (see FIG. 12A). As shown in FIG. 2G, the part support portion 88 has the first end 90 and the second end 92, and the part support portion 88 is at least partially disposed within the second bushing 60*b*, such as the second linear bushing 62*b*, and is configured to fit through and be inserted through the hole 28 (see FIG. 12E) in the part 24 (see FIG. 12E) of the aircraft structure 20 (see FIG. 12A). The part support portion 88 has the cylindrical shape 84*b* (see FIG. 6A) and has the outer diameter 86*b* (see FIG. 6A).

As shown in FIGS. 2A-2B, 2E-2G, the support pin assembly 10, such as the lower nominal support pin assembly 10*b*, further comprises the sleeve bushing 94 slideably disposed over an exterior portion 72*b* (see FIG. 2G) of the part support portion 88 of the pin 34. As shown in FIG. 2G, the sleeve bushing 94 has the sleeve bushing first end 96 and the sleeve bushing second end 98. As shown in FIG. 2B, there is a gap 155 between the sleeve bushing first end 96 and the second end 80 of the shoulder portion 76, where the portion 24*d* (see FIG. 12E) of the part 24 (see FIG. 12E) is clamped.

As shown in FIGS. 2A-2B, 2D-2G, the support pin assembly 10, such as the lower nominal support pin assembly 10*b*, further comprises the retainer element 100, such as the pin nut 102. As shown in FIG. 2G, the opening 104, such as the threaded opening 104*a*, of the retainer element 100, such as the pin nut 102, is threadably coupled to the threaded tail end 66*a* of the pin 34.

As shown in FIGS. 2A-2C, 2E-2G, the support pin assembly 10, such as the lower nominal support pin assembly 10*b*, further comprises the gauge assembly 106 comprising the gauge bar assembly 106*a* with the pin groove engagement portion 108 (see FIG. 2G) coupled to the pin groove 82 (see FIG. 2G) formed on the shoulder portion 76 of the pin 34. As shown in FIG. 2G, the gauge assembly 106, such as the gauge bar assembly 106*a*, comprises the pin groove engagement portion 108 in the form of the gauge pin 110 to locate into the pin groove 82 of the pin 34. As shown in FIG. 2G, the gauge assembly 106, such as the gauge bar assembly 106*a*, further comprises a dowel pin handle 156 configured for removing the gauge pin 110 from and out of the pin groove 82. As shown in FIG. 2G, the dowel pin handle 156 has a first free end 158*a* and a second insertion end 158*b*.

As shown in FIGS. 2A, 2B, 2G, 10, the gauge assembly 106, such as the gauge bar assembly 106*a*, further comprises a riser block 160 coupled to the gauge pin 110 (see FIG. 2G) and coupled to the dowel pin handle 156, to facilitate locating the gauge pin 110 to the pin groove 82. As shown in FIGS. 2B, 10, the riser block 160 has a body 162 comprising a first body portion 162*a* attached to, or integral with, a second body portion 162*b*. The body 162 has a cut-out portion 164 (see FIGS. 2A, 10) formed in a bottom-most end 165 (see FIG. 10) of the body 162 through both the first body portion 162*a* and the second body portion 162*b*. The cut-out portion 164 is of a sufficient shape and size to fit over an exterior portion 72*a* (see FIG. 2G) of the shoulder portion 76 (see FIG. 2G) at the location of the pin groove 82 (see FIG. 2G). The gauge pin 110 (see FIG. 10) is attached within the cut-out portion 164 of the first body portion 162*a* of the body 162 of the riser block 160. The first body portion 162*a* of the body 162 further comprises a tab 166 (see FIGS. 2B, 10) extending from a top-most end 168 (see FIG. 10) of the first body portion 162*a* of the body 162. As shown in FIGS. 2B. 10, the tab 166 has a tab opening 170 designed to receive the second insertion end 158*b* of the dowel pin handle 156.

As shown in FIGS. 2A, 2G, 10, the gauge assembly 106, such as the gauge bar assembly 106*a*, further comprises an L-pin 172 to facilitate locating the gauge pin 110 and to confirm or verify that the gauge pin 110 is located or fitted in the pin groove 82. As shown in FIGS. 2A, 10, the L-pin 172 comprises a first cylindrical pin portion 174*a* coupled to a second cylindrical pin portion 174*b* to form an L-shaped configuration 176. As shown in FIGS. 2A, 10, the first cylindrical pin portion 174*a* has a first end 178*a* coupled to, and inserted in a riser block opening 180 on the first body portion 162*a* (see FIG. 10) of the riser block 160. As shown in FIGS. 2A-2B, the first cylindrical pin portion 174*a* has a second end 178*b* coupled to, and inserted in, a first hole 182*a* (see FIG. 2B) of the second cylindrical pin portion 174*b*. As shown in FIG. 2A, the second cylindrical pin portion 174*b* has a first end 184*a* and a second end 184*b*. As shown in FIG. 2A, the second cylindrical pin portion 174*b* has a second hole 182*b* near the second end 184*b*. The second hole 182*b* on the second cylindrical pin portion 174*b* of the L-pin 172 is configured for insertion of a cable or other attachment means to attach the L-pin 172 to the support pin assembly 10 so that the L-pin is not misplaced or lost. The L-pin 172 may be inserted or removed manually by a user.

As shown in FIGS. 2A, 2C-2G, the support pin assembly 10, such as the lower nominal support pin assembly 10*b*, further comprises the engineering support assembly 58. As shown in FIG. 2A, the engineering support assembly 58 comprises an attachment apparatus 186 attached to the attachment brackets 56, such as the upper attachment brackets 56*a*, on the clevis 44, via a pivot pin 190*a*, or another suitable pin element. As shown in FIG. 2A, the engineering support assembly 58 further comprises a pair of rollers 188, such as a first roller 188*a* and a second roller 188*b*, coupled to the attachment apparatus 186, via an axle pin 192, or another suitable pin element.

As shown in FIG. 2A, the engineering support assembly 58 further comprises a turnbuckle 194 having a first end 195*a* coupled, or attached, to the attachment apparatus 186, via the axle pin 192, and positioned between the pair of rollers 188. As shown in FIG. 2A, the turnbuckle 194 further has a second end 195*b* coupled, or attached, to the attachment brackets 56, such as the lower attachment brackets 56*b*, on the clevis 44, via a pivot pin 190*b*, or another suitable pin element. The first end 195*a* and the second end 195*b* of the turnbuckle 194 comprise eye-bolts, or another suitable looped attachment end. As shown in FIG. 2A, the turnbuckle 194 further comprises a tubular body 196 extending between the first end 195*a* and the second end 195*b*. The turnbuckle 194 may be extended to assist in carrying some of the load of the part 24 being supported on the assembly jig 30. For example, once the part 24 is nominally located with the pin 34, instead of having all the weight carried on the pin 34, the engineering support assembly 58 may be used to assist in carrying some of the load of the part 24 being supported on the assembly jig 30.

Figure 3A:
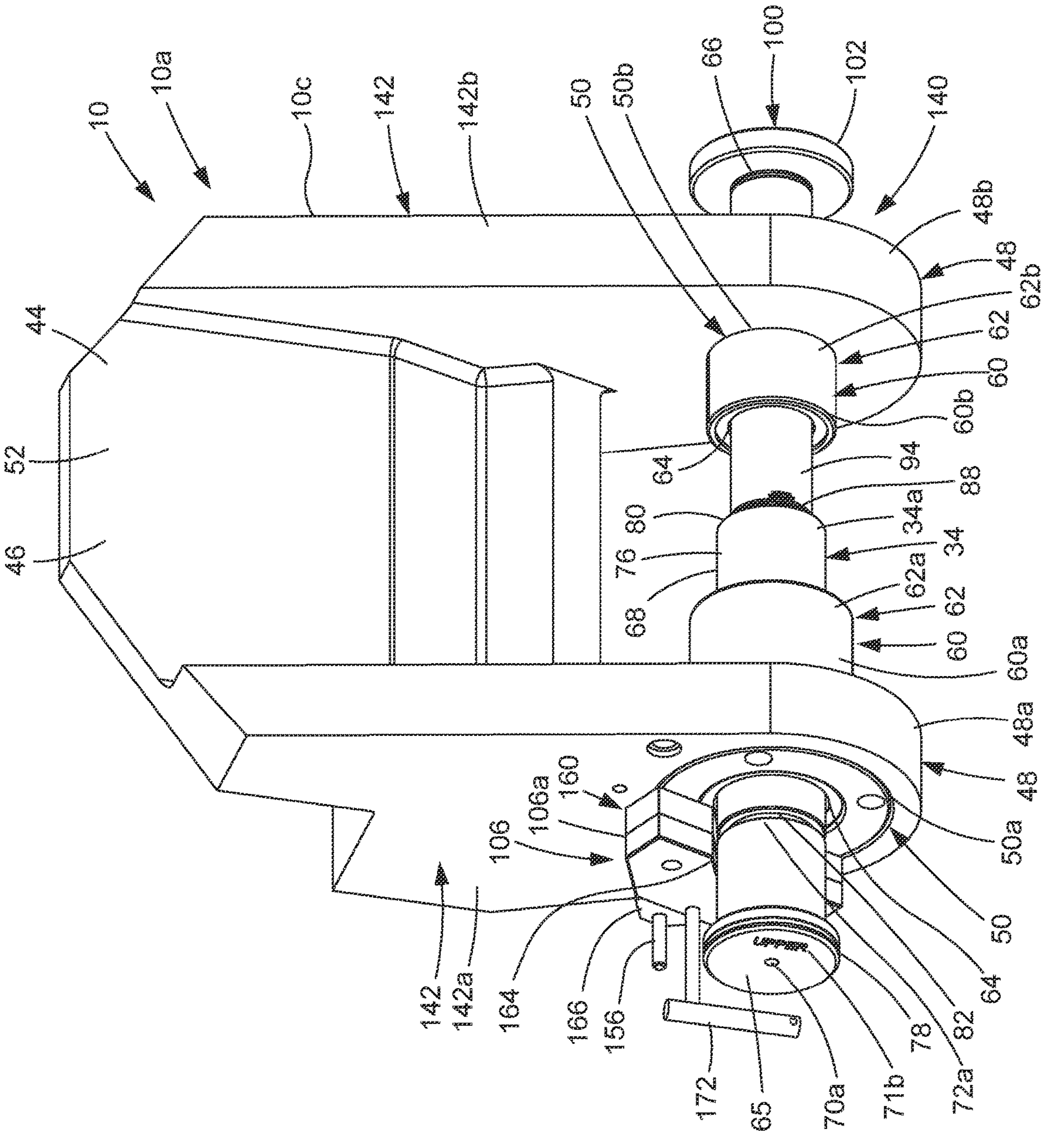
FIG. 3A is an illustration of a front perspective view of an exemplary version of a support pin assembly, in the form of an upper nominal support pin assembly, of the disclosure, in an assembled configuration.
Figure 3B:
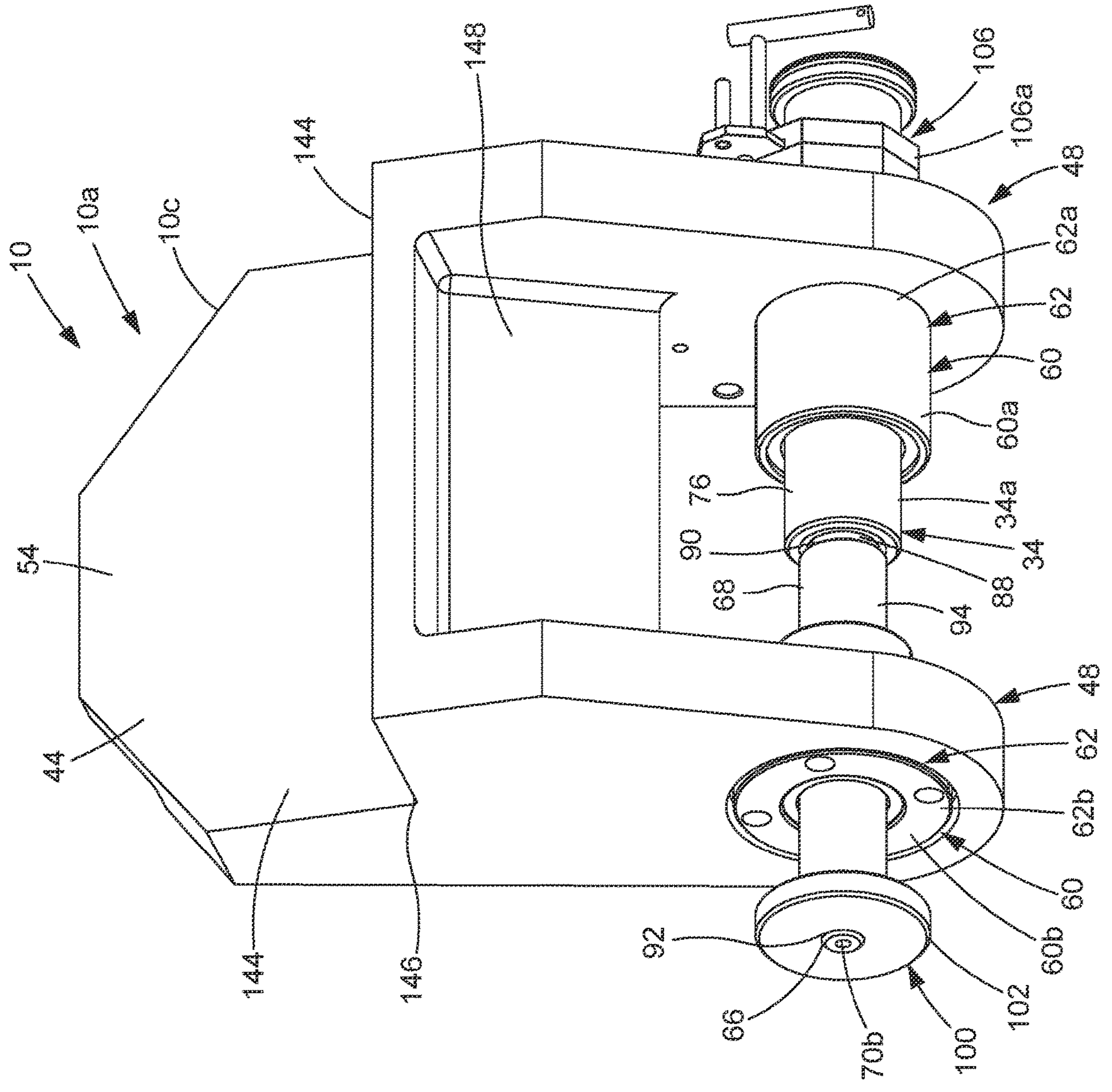
FIG. 3B is an illustration of a back perspective view of the support pin assembly of FIG. 3A.
Figure 3D:
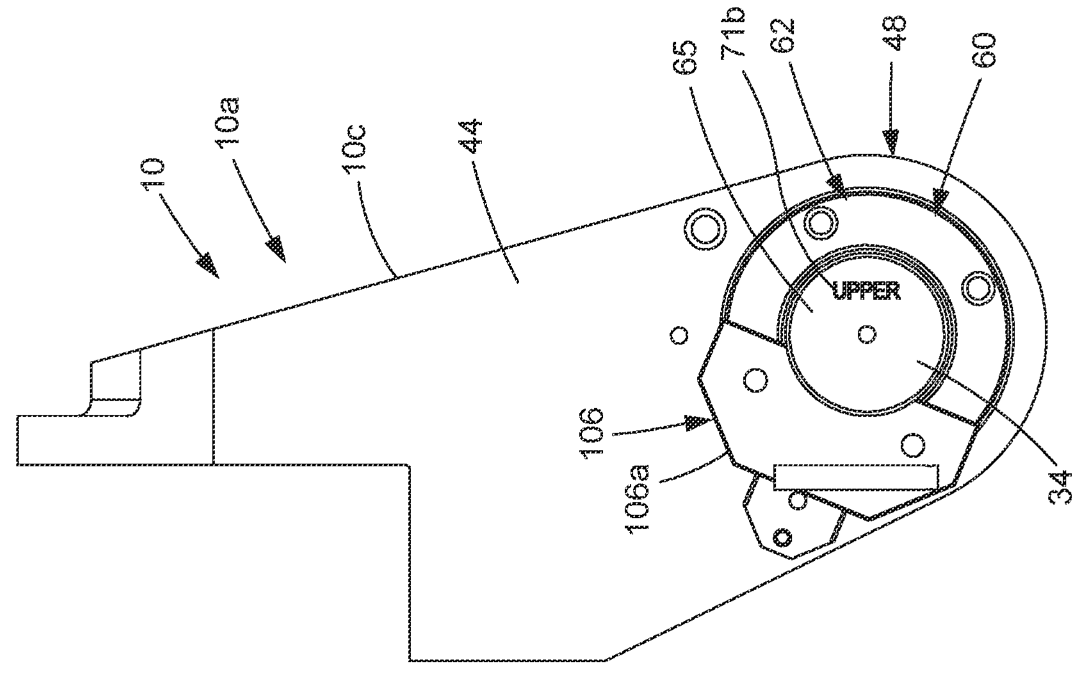
FIG. 3D is an illustration of a left side view of the support pin assembly of FIG. 3A.
Figure 3C:
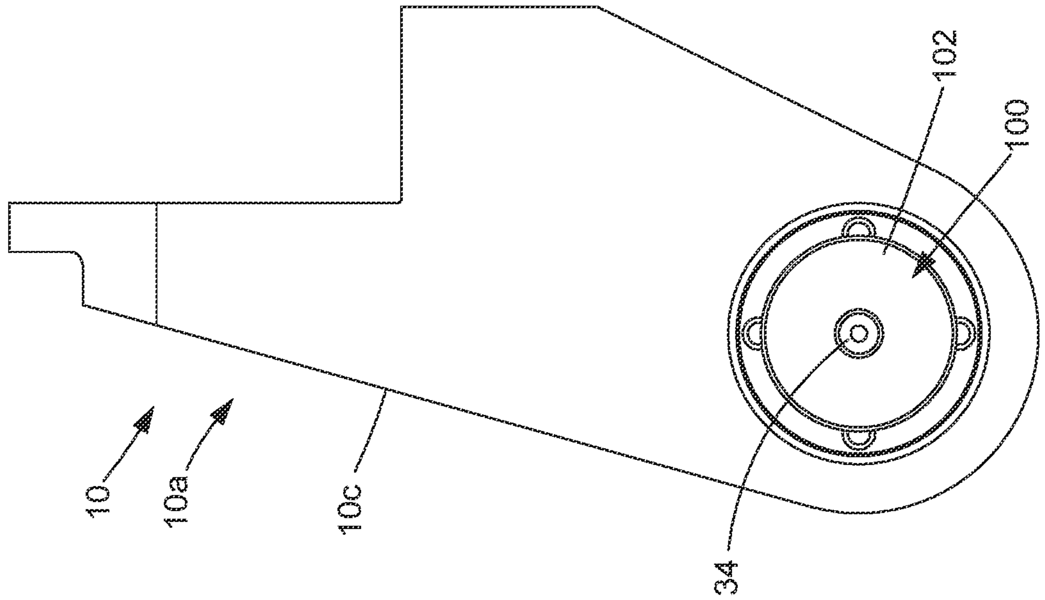
FIG. 3C is an illustration of a right side view of the support pin assembly of FIG. 3A.
Figure 3E:
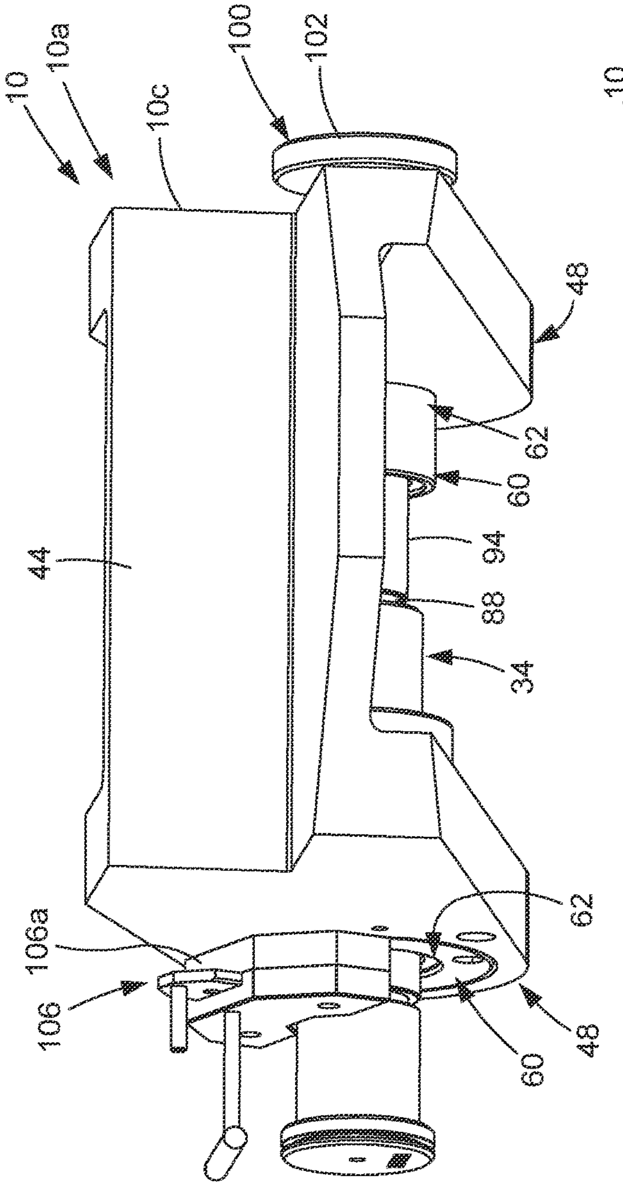
FIG. 3E is an illustration of a top view of the support pin assembly of FIG. 3A.
Figure 3F:
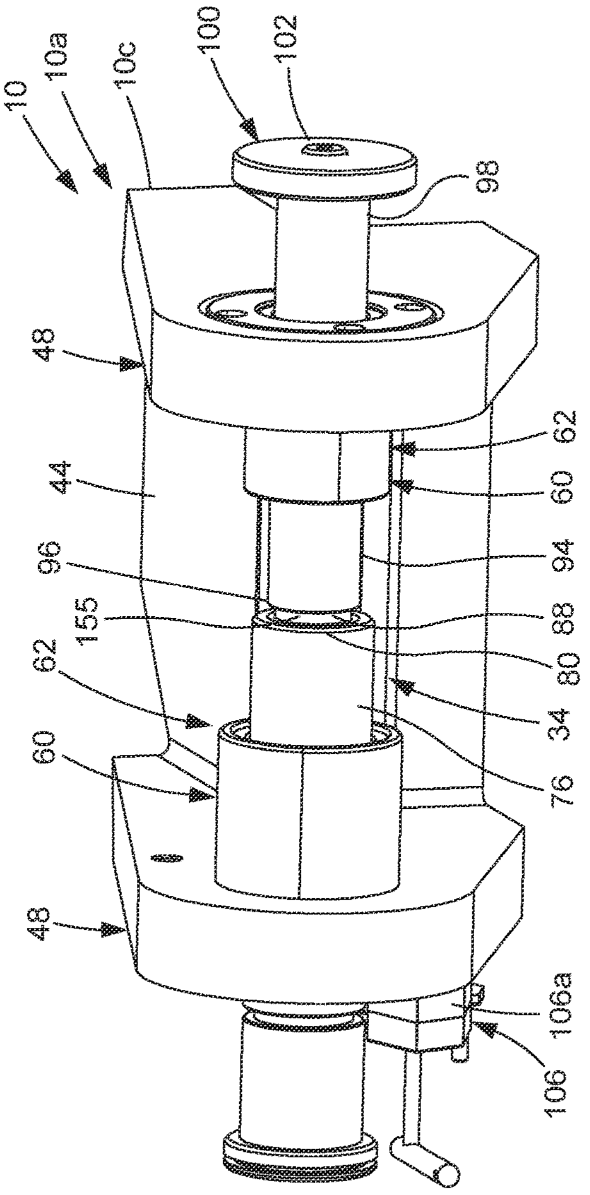
FIG. 3F is an illustration of a bottom view of the support pin assembly of FIG. 3A.

Now referring to FIGS. 3A-3F, FIGS. 3A-3F show various views of an exemplary version of a support pin assembly 10, such as the nominal support pin assembly 10*a* in the form of an upper nominal support pin assembly 10*c*, of the disclosure. FIG. 3A is an illustration of a front perspective view of the exemplary version of the support pin assembly 10, such as the nominal support pin assembly 10*a*, in the form of the upper nominal support pin assembly 10*c*, of the disclosure, in the assembled configuration 140. FIG. 3B is an illustration of a back perspective view of the support pin assembly 10, such as the nominal support pin assembly 10*a*, in the form of the upper nominal support pin assembly 10*c*, of FIG. 3A. FIG. 3C is an illustration of a right side view of the support pin assembly 10, such as the nominal support pin assembly 10*a*, in the form of the upper nominal support pin assembly 10*c*, of FIG. 3A. FIG. 3D is an illustration of a left side view of the support pin assembly 10, such as the nominal support pin assembly 10*a*, in the form of the upper nominal support pin assembly 10*c*, of FIG. 3A. FIG. 3E is an illustration of a top view of the support pin assembly 10, such as the nominal support pin assembly 10*a*, in the form of the upper nominal support pin assembly 10*c*, of FIG. 3A. FIG. 3F is an illustration of a bottom view of the support pin assembly 10, such as the nominal support pin assembly 10*a*, in the form of the upper nominal support pin assembly 10*c*, of FIG. 3A.

The support pin assembly 10, such as the upper nominal support pin assembly 10*c*, is configured to be coupled or mounted to the assembly jig 30 (see FIGS. 1, 12A), and the pin 34 (see FIGS. 3A-3F) is configured to be located at a hole 28 (see FIG. 12A) in a part 24 (see FIG. 12A) at a nominal location 36 (see FIGS. 1, 12A), such as an upper nominal location 36*b* (see FIGS. 1, 12A). As shown in FIGS. 3A-3B, 3D-3F, the support pin assembly 10, such as the upper nominal support pin assembly 10*c*, comprises the pin 34 inserted through the bushings 60, such as the linear bushings 62, which are press fit within the clevis lugs 48 of the clevis 44. In this version, the support pin assembly 10, such as the upper nominal support pin assembly 10*c*, does not include the engineering support assembly 58 (see FIG. 2A).

As shown in FIG. 3A, the clevis 44 has the clevis body 46 with the clevis lugs 48, such as the first clevis lug 48*a* with the opening 50, such as the first clevis lug opening 50*a*, and such as the second clevis lug 48*b* with the opening 50, such as the second clevis lug opening 50*b*. As shown in FIG. 3A, the clevis lugs 48 are positioned on opposing ends 142 of the clevis 44, such as the first end 142*a* and the second end 142*b*. As shown in FIG. 3A, the clevis 44 has the first side 52, which is on the other side of the second side 54 (see FIG. 3B). In this version, the clevis 44 does not include the attachment brackets 56 (see FIG. 2A). As shown in FIG. 3B, the clevis 44 has the second side 54 with the mounting surfaces 144 forming the right angle 146. The mounting surfaces 144 (see FIG. 12A) are configured for mounting to the fixture 32 (see FIG. 12A) of the assembly jig 30 (see FIG. 12A). As shown in FIG. 3B, the second side 54 of the clevis 44 further has a recessed portion 148.

As shown in FIGS. 3A-3B, the bushings 60, such as the linear bushings 62, include the first bushing 60*a*, such as the first linear bushing 62*a*, disposed within the first clevis lug 48*a* (see FIG. 3A), and the second bushing 60*b*, such as the second linear bushing 62*b*, disposed within the second clevis lug 48*b* (see FIG. 3A). The bushings 60, such as the linear bushings 62, each comprises the through opening 64 (see FIG. 3A). Each bushing 60, such as each linear bushing 62, is preferably press fit within, and horizontally aligned within, the openings 50 (see FIG. 3A), such as the first clevis lug opening 50*a* (see FIG. 3A) and the second clevis lug opening 50*b* (see FIG. 3A), of the clevis lugs 48 (see FIG. 3A) in the press fit insertion 63 (see FIG. 1). The bushings 60, such as the linear bushings 62, shown in FIGS. 3A-3B, 3D-3F, have the same structure as the bushings 60, such as the linear bushings 62, described above for FIGS. 2A-2G.

As shown in FIGS. 3A-3B, the pin 34, such as the sliding pin 34*a*, is slideably disposed within the through openings 64 (see FIG. 3A) of the bushings 60, such as the linear bushings 62. As shown in FIG. 3A, the pin 34 comprises the head end 65 with the first slip fit hole 70*a*, the tail end 66, and the body 68, such as the cylindrical body, formed between the head end 65 and the tail end 66. As shown in FIG. 3B, the tail end 66 has the second slip fit hole 70*b*, formed in the tail end 66.

As shown in FIGS. 3A-3B, the pin 34, such as the body 68 of the pin 34, further comprises the shoulder portion 76 at least partially disposed within the first bushing 60*a*, such as the first linear bushing 62*a*, where the shoulder portion 76 has the first end 78 (see FIG. 3A), the second end 80 (see FIG. 3A), and the pin groove 82 (see FIG. 3A) formed circumferentially on the exterior portion 72*a* (see FIG. 3A) of the shoulder portion 76 of the pin 34.

As shown in FIGS. 3A-3B, the pin 34, such as the body 68 of the pin 34, further comprises the part support portion 88 extending from the second end 80 (see FIG. 3A) of the shoulder portion 76, and being at least partially disposed within the second bushing 60*b*, such as the second linear bushing 62*b*, and configured to fit through a hole 28 (see FIG. 12A) in a frame section 26 (see FIG. 12A) of a part 24 (see FIG. 12A) of the aircraft structure 20 (see FIG. 12A). As shown in FIG. 3B, the part support portion 88 has the first end 90 and the second end 92, and the part support portion 88 is at least partially disposed within the second bushing 60*b*, such as the second linear bushing 62*b*, and is configured to fit through and be inserted through the hole 28 (see FIGS. 1, 12A) in the frame section 26 (see FIG. 12A) of the part 24 (see FIGS. 1, 12A) of the aircraft structure 20 (see FIGS. 1, 12A).

As shown in FIGS. 3A-3B, 3E-3F, the support pin assembly 10 further comprises the sleeve bushing 94 slideably disposed over the part support portion 88 of the pin 34. As shown in FIG. 3F, the sleeve bushing 94 has the sleeve bushing first end 96 and the sleeve bushing second end 98. FIG. 3F shows the gap 155 between the sleeve bushing first end 96 and the second end 80 of the shoulder portion 76, where the portion 24*d* (see FIG. 12A) of the frame section 26 (see FIG. 12A) of the part 24 (see FIG. 12A) is clamped by the upper nominal support pin assembly 10*c*.

As shown in FIGS. 3A-3C, 3E-3F, the support pin assembly 10, such as the upper nominal support pin assembly 10*c*, further comprises the retainer element 100, such as the pin nut 102. As shown in FIGS. 3A-3B, 3D-3F, the support pin assembly 10, such as the upper nominal support pin assembly 10*c*, further comprises the gauge assembly 106 comprising the gauge bar assembly 106*a*. As shown in FIG. 3A, the gauge assembly 106, such as the gauge bar assembly 106*a*, is coupled to the pin groove 82 formed on the shoulder portion 76 of the pin 34. FIG. 3A shows the dowel pin handle 156, the riser block 160 with the cut-out portion 164 and the tab 166, and shows the L-pin 172. The gauge bar assembly 106*a* shown in FIGS. 3A-B, 3D-3F has the same structure as the gauge bar assembly 106*a* described above for FIGS. 2A-2C, 2E-2G.

Figure 4A:
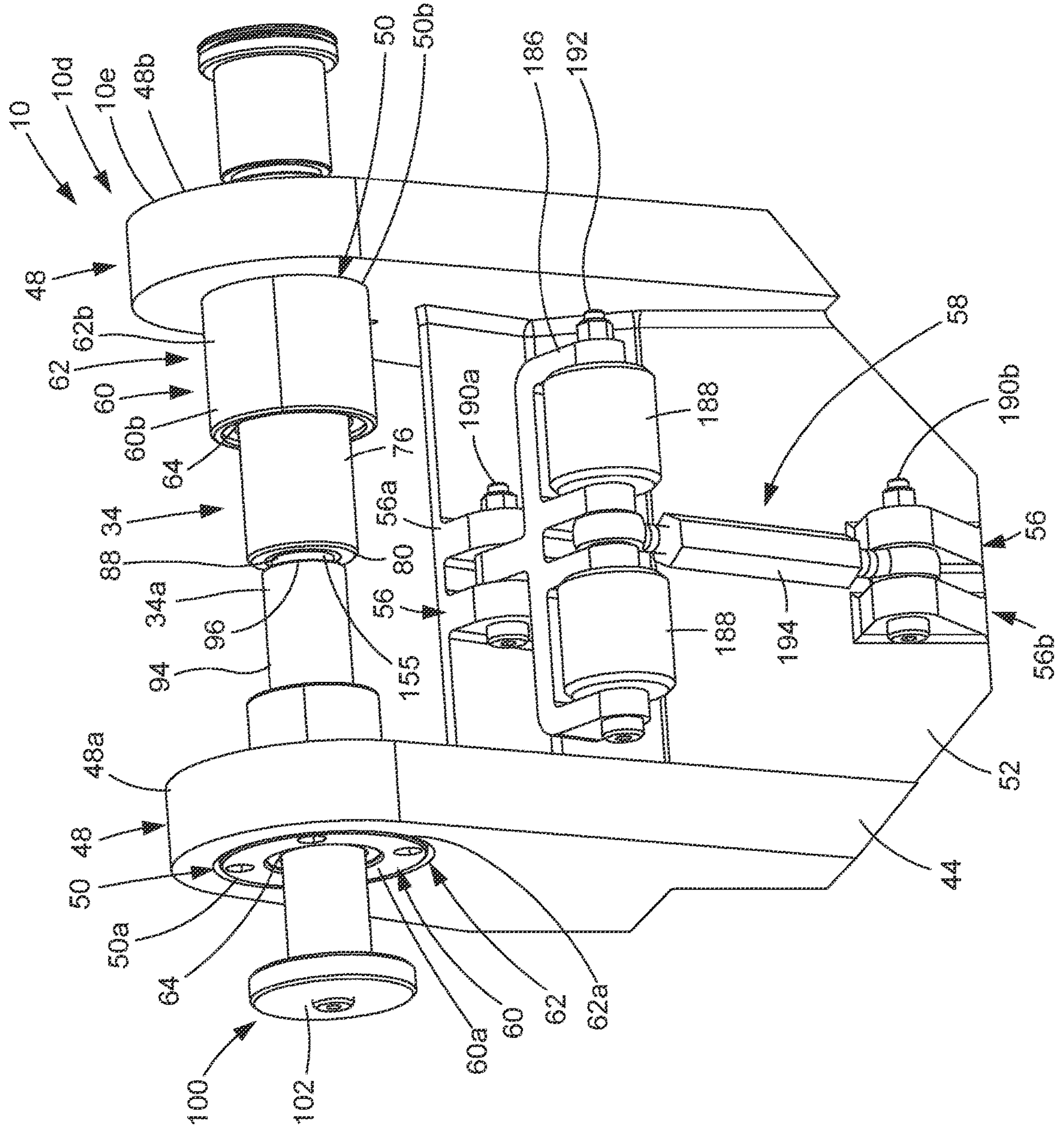
FIG. 4A is an illustration of a front perspective view of an exemplary version of a support pin assembly, in the form of a lower check support pin assembly, of the disclosure, in an assembled configuration.
Figure 4B:
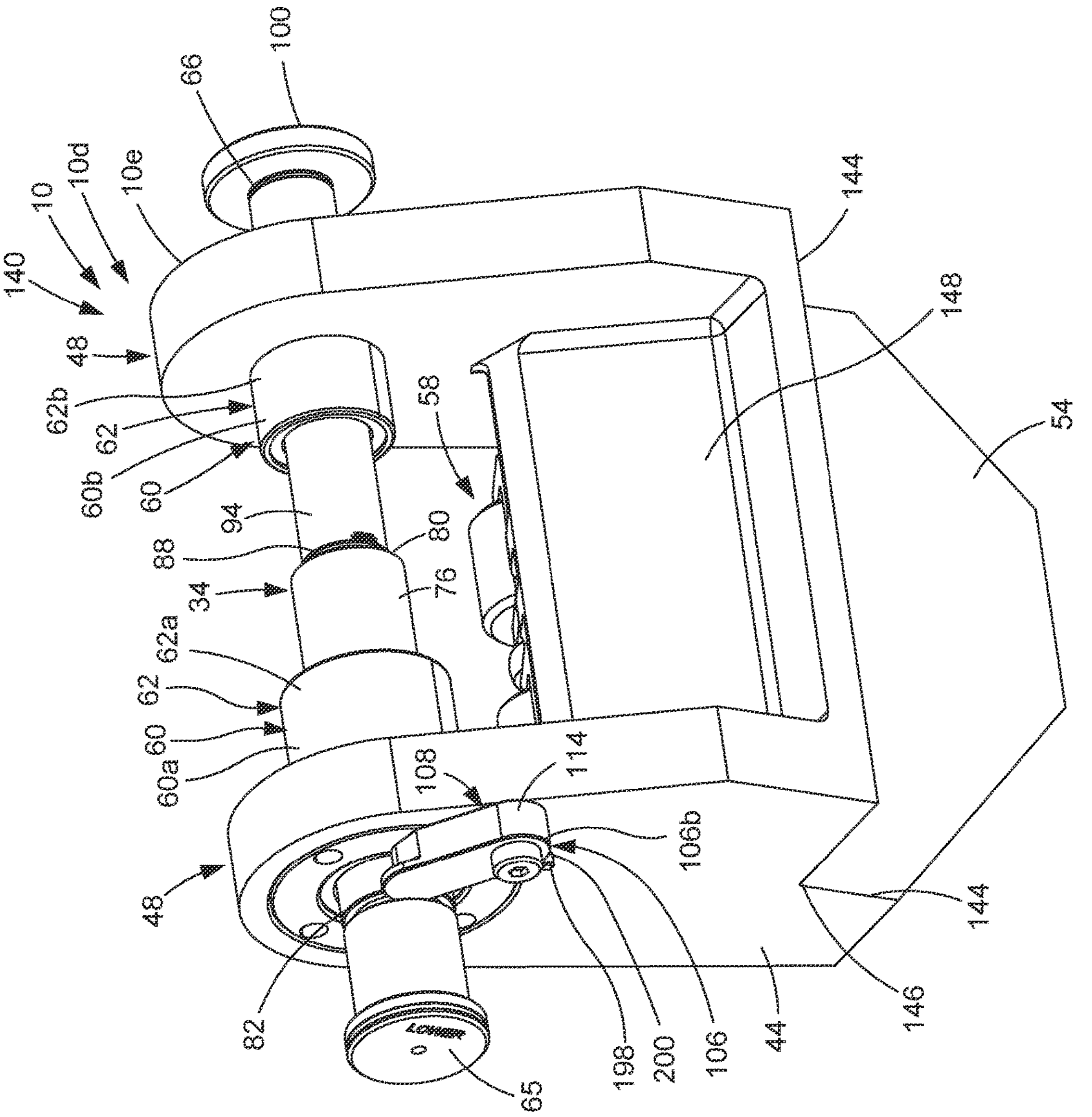
FIG. 4B is an illustration of a back perspective view of the support pin assembly of FIG. 4A.
Figure 4D:
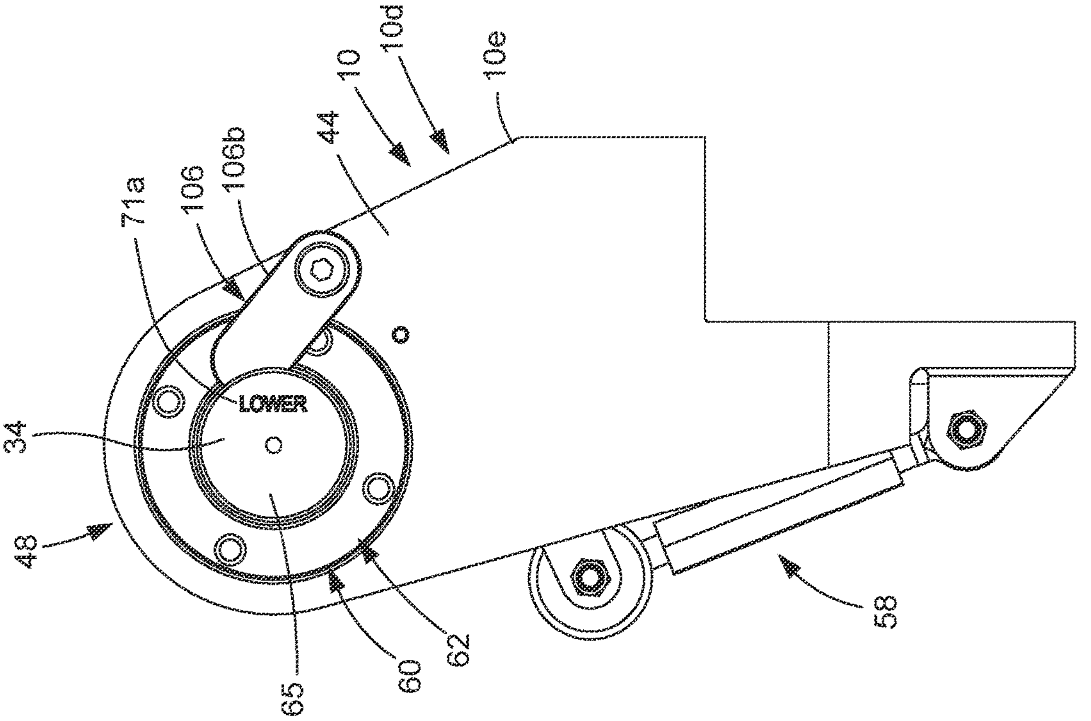
FIG. 4D is an illustration of a left side view of the support pin assembly of FIG. 4A.
Figure 4C:
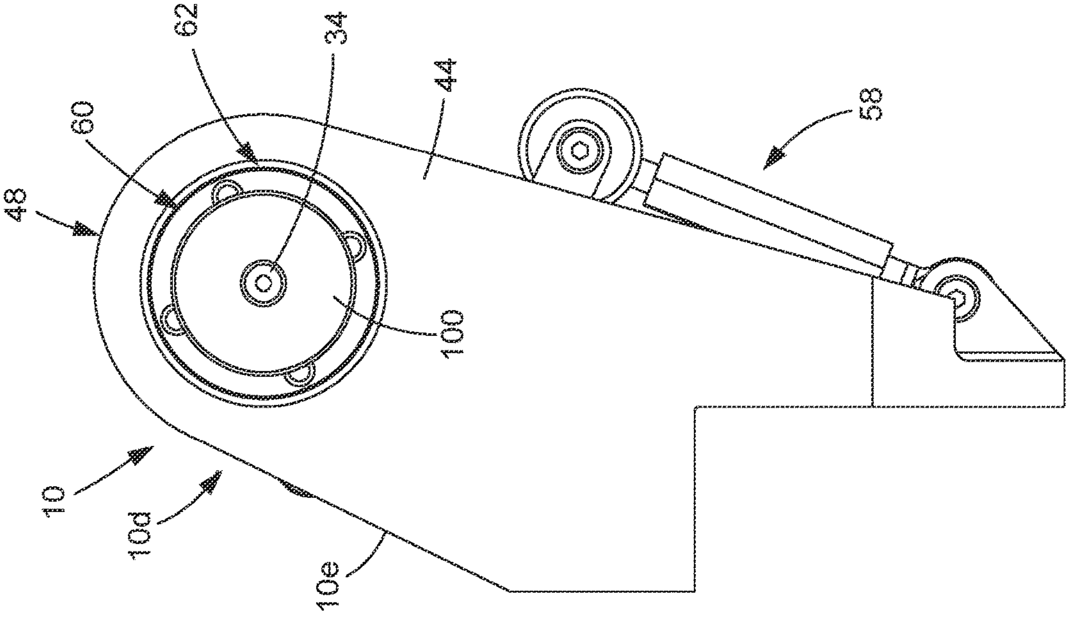
FIG. 4C is an illustration of a right side view of the support pin assembly of FIG. 4A.
Figure 4E:
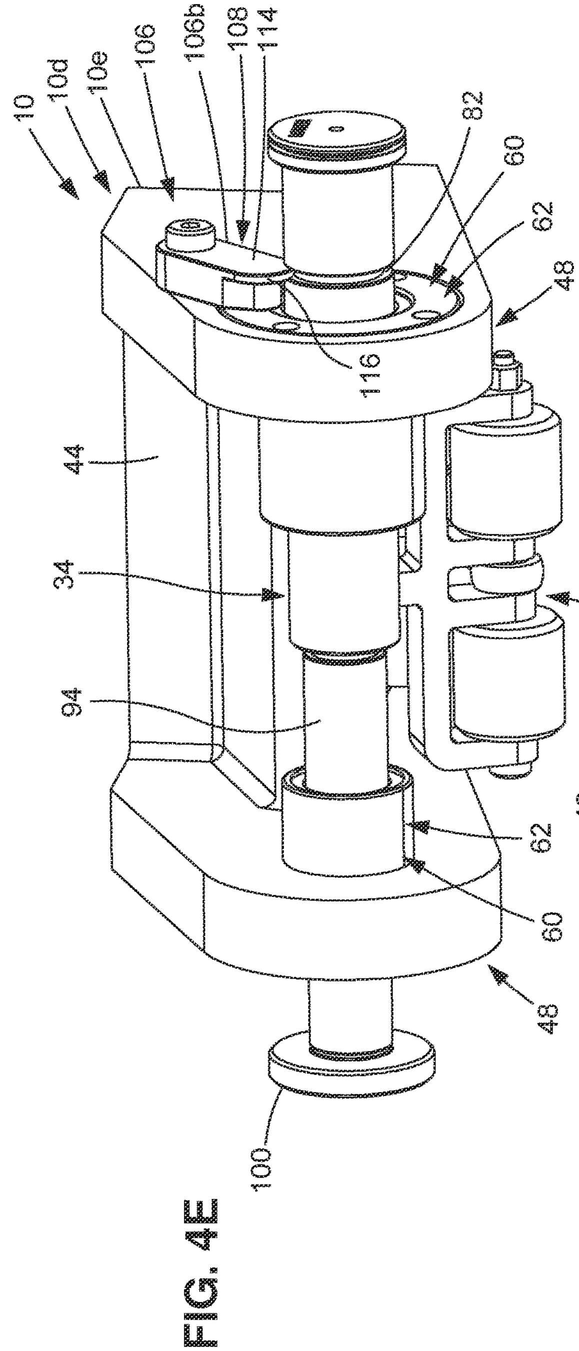
FIG. 4E is an illustration of a top view of the support pin assembly of FIG. 4A.
Figure 4F:
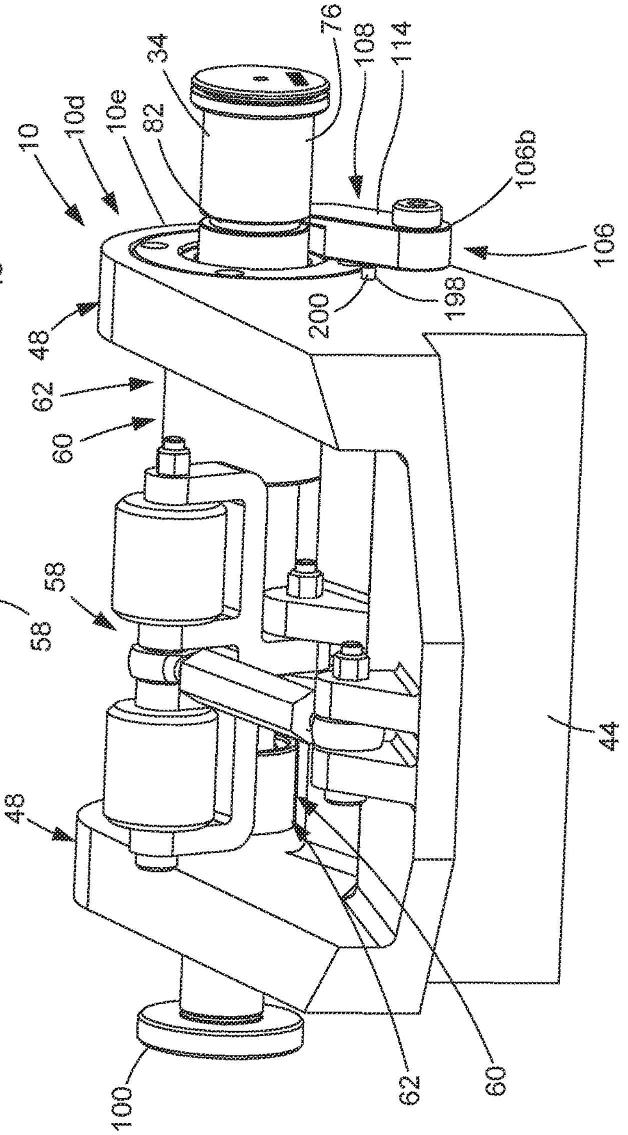
FIG. 4F is an illustration of a bottom view of the support pin assembly of FIG. 4A.

Now referring to FIGS. 4A-4F, FIGS. 4A-4F show various views of an exemplary version of a support pin assembly 10, such as a check support pin assembly 10*d*, in the form of a lower check support pin assembly 10*e*, of the disclosure. FIG. 4A is an illustration of a front perspective view of the exemplary version of the support pin assembly 10, such as the check support pin assembly 10*d*, in the form of the lower check support pin assembly 10*e*, of the disclosure, in the assembled configuration 140. FIG. 4B is an illustration of a back perspective view of the support pin assembly 10, such as a check support pin assembly 10*d*, in the form of the lower check support pin assembly 10*e*, of FIG. 4A. FIG. 4C is an illustration of a right side view of the support pin assembly 10, such as the lower check support pin assembly 10*e*, of FIG. 4A. FIG. 4D is an illustration of a left side view of the support pin assembly 10, such as the check support pin assembly 10*d*, in the form of the lower check support pin assembly 10*c*, of FIG. 4A. FIG. 4E is an illustration of a top view of the support pin assembly 10, such as the check support pin assembly 10*d*, in the form of the lower check support pin assembly 10*c*, of FIG. 4A. FIG. 4F is an illustration of a bottom view of the support pin assembly 10, such as the check support pin assembly 10*d*, in the form of the lower check support pin assembly 10*e*, of FIG. 4A.

The support pin assembly 10, such as the lower check support pin assembly 10*e*, is configured to be coupled or mounted to the assembly jig 30 (see FIGS. 1, 12A), and the pin 34 (see FIGS. 4A-4F) is configured to be located at a hole 28 (see FIG. 12A) in a frame section 26 (see FIG. 12A) of a part 24 (see FIG. 12A) at a check location 38 (see FIGS. 1, 12A), such as a lower check location 38*a* (see FIGS. 1, 12A). As shown in FIGS. 4A-4F, the support pin assembly 10, such as the lower check support pin assembly 10*e*, comprises the pin 34 inserted through the bushings 60, such as the linear bushings 62, which are press fit within the clevis lugs 48 of the clevis 44.

FIG. 4A shows the clevis 44 with the clevis lugs 48, such as the first clevis lug 48*a* with the opening 50, such as the first clevis lug opening 50*a*, and such as the second clevis lug 48*b* with the opening 50, such as the second clevis lug opening 50*b*. FIG. 4A shows the first side 52 with the attachment brackets 56, including the upper attachment brackets 56*a* and the lower attachment brackets 56*b*, and FIG. 4B shows the second side 54 with the mounting surfaces 144 forming the right angle 146, and shows the recessed portion 148. FIGS. 4A-4B further shows the bushings 60, such as the linear bushings 62, including the first bushing 60*a*, such as the first linear bushing 62*a*, disposed within the first clevis lug 48*a* (see FIG. 4A), and the second bushing 60*b*, such as the second linear bushing 62*b*, disposed within the second clevis lug 48*b* (see FIG. 4A). The clevis 44 and the bushings 60 shown in FIGS. 4A-4F have the same structure as the clevis 44 and the bushings 60 described above for FIGS. 2A-2G.

As shown in FIG. 4A, the pin 34, such as the sliding pin 34*a*, is slideably disposed within the through openings 64 of the bushings 60, such as the linear bushings 62. FIG. 4B shows the head end 65, the tail end 66, the shoulder portion 76 at least partially disposed within the first bushing 60*a*, the pin groove 82 formed circumferentially on the shoulder portion 76, and the part support portion 88 extending from the second end 80 of the shoulder portion 76, and being at least partially disposed within the second bushing 60*b*. The pin 34 shown in FIGS. 4A-4F has the same structure as the pin 34 described above for FIGS. 2A-2G.

FIG. 4A further shows the sleeve bushing 94 slideably disposed over the part support portion 88 of the pin 34. FIG. 4A shows the gap 155 between the sleeve bushing first end 96 and the second end 80 of the shoulder portion 76, where the portion 24*d* (see FIG. 12A) of the frame section 26 (see FIG. 12A) of the part 24 (see FIG. 12A) is clamped by the lower check support pin assembly 10*c*. FIGS. 4A-4C, 4E-4F further shows the retainer element 100, such as the pin nut 102 (see FIG. 4A). The sleeve bushing 94 and the retainer element 100 shown in FIGS. 4A-4B, 4E have the same structure as the sleeve bushing 94 and the retainer element 100 described above for FIGS. 2A-2B, 2D-2G.

As shown in FIGS. 4B, 4D-4F, the support pin assembly 10, such as the lower check support pin assembly 10*e*, further comprises the gauge assembly 106 comprising the swing away gauge bar assembly 106*b* with the pin groove engagement portion 108 (see FIGS. 4B, 4E-4F) coupled to the pin groove 82 (see FIGS. 4B, 4E-4F) formed on the shoulder portion 76 (see FIG. 4B) of the pin 34.

As shown in FIGS. 4B, 4E, 4F, the gauge assembly 106, such as the gauge bar assembly 106*a*, comprises the pin groove engagement portion 108 in the form of the finger element 114 having the edge 116 (see FIGS. 4E, 11) to slide into, or couple to, the pin groove 82 of the pin 34 to provide a check location 38 (see FIGS. 1, 12A), such as the lower check location 38*a* (see FIGS. 1, 12A), of the nominal location 36 (see FIG. 1). The finger element 114 (see FIG. 4F) is configured to rotate about the shoulder portion 76 (see FIG. 4F) of the pin 34 (see FIG. 4F). As shown in FIGS. 4B, 4F, the gauge assembly 106, such as the gauge bar assembly 106*a*, further comprises a rotation stop element 198 coupled to the clevis 44, to provide a stop 200 for the finger element 114, when the finger element 114 rotates about the shoulder portion 76 of the pin 34.

As shown in FIGS. 4A-4F, the support pin assembly 10, such as the check support pin assembly 10*d*, in the form of the lower check support pin assembly 10*e*, further comprises the engineering support assembly 58. FIG. 4A shows the attachment apparatus 186, the pair of rollers 188, the pivot pins 190*a*, 190*b*, the axle pin 192, and the turnbuckle 194 of the engineering support assembly 58. The engineering support assembly 58 of FIGS. 4A-4F has the same structure as the engineering support assembly 58 described above for FIGS. 2A, 2C-2G.

Figure 5A:
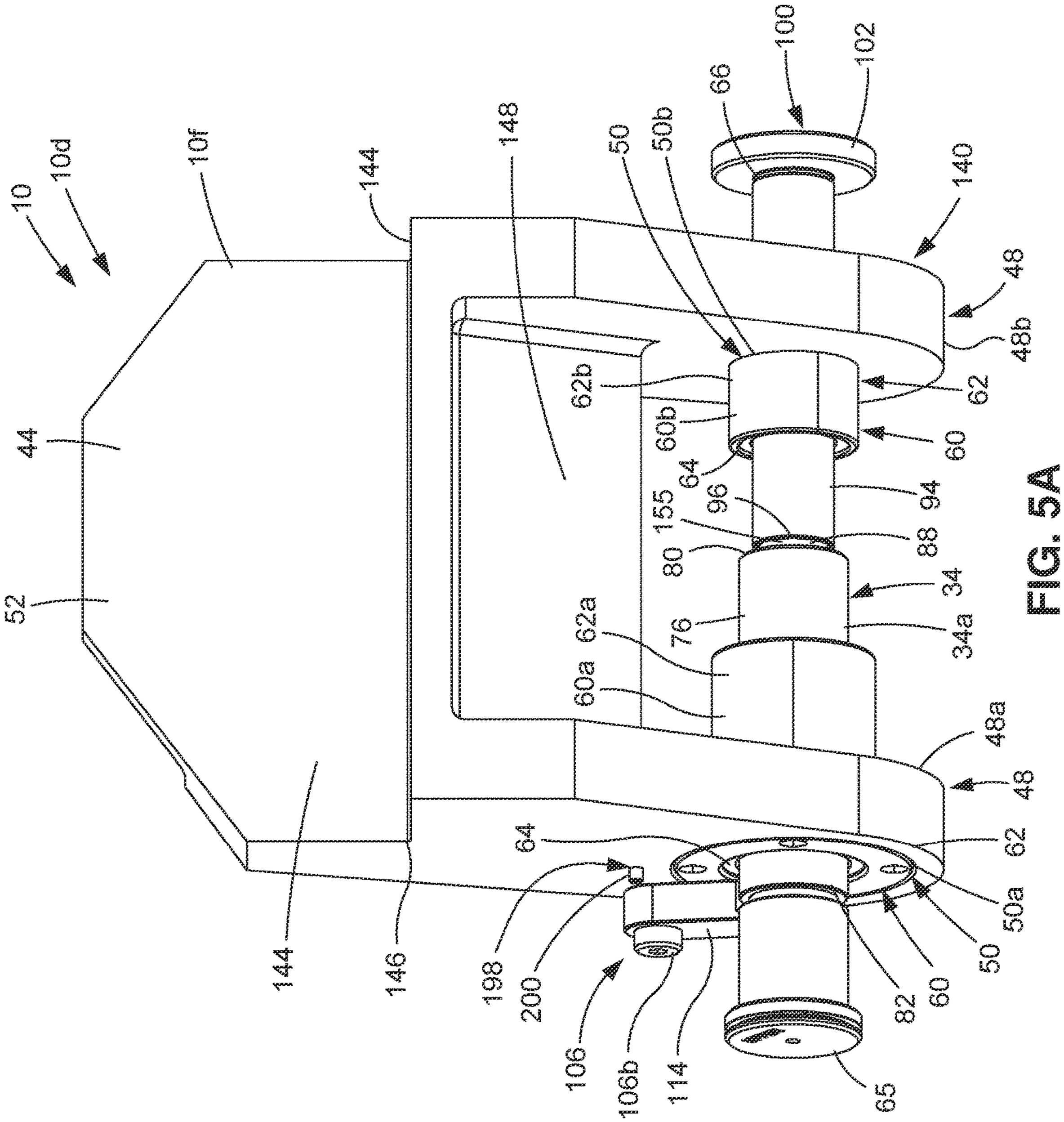
FIG. 5A is an illustration of a front perspective view of an exemplary version of a support pin assembly, in the form of an upper check support pin assembly, of the disclosure, in an assembled configuration.
Figure 5B:
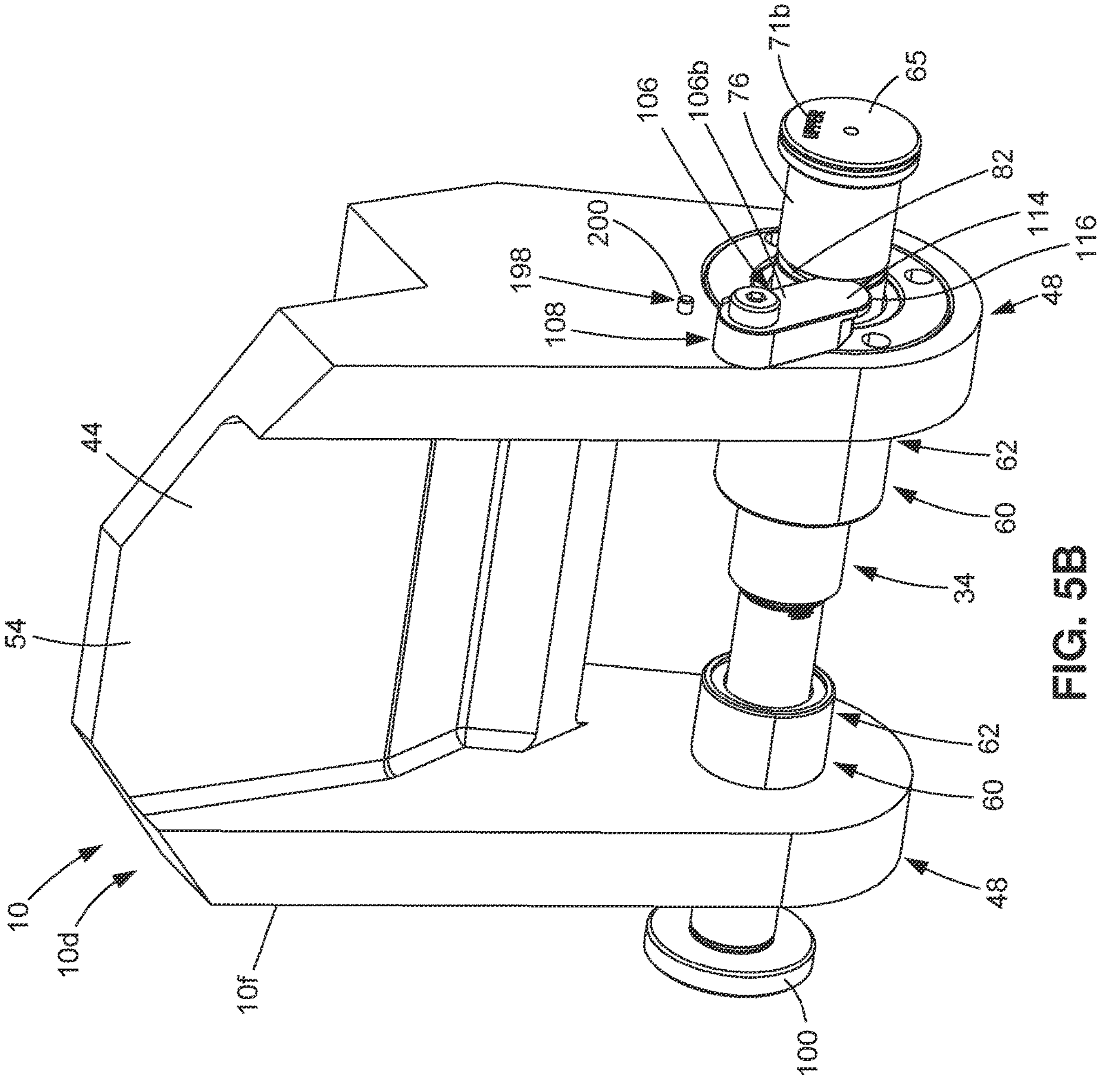
FIG. 5B is an illustration of a back perspective view of the support pin assembly of FIG. 5A.
Figure 5D:
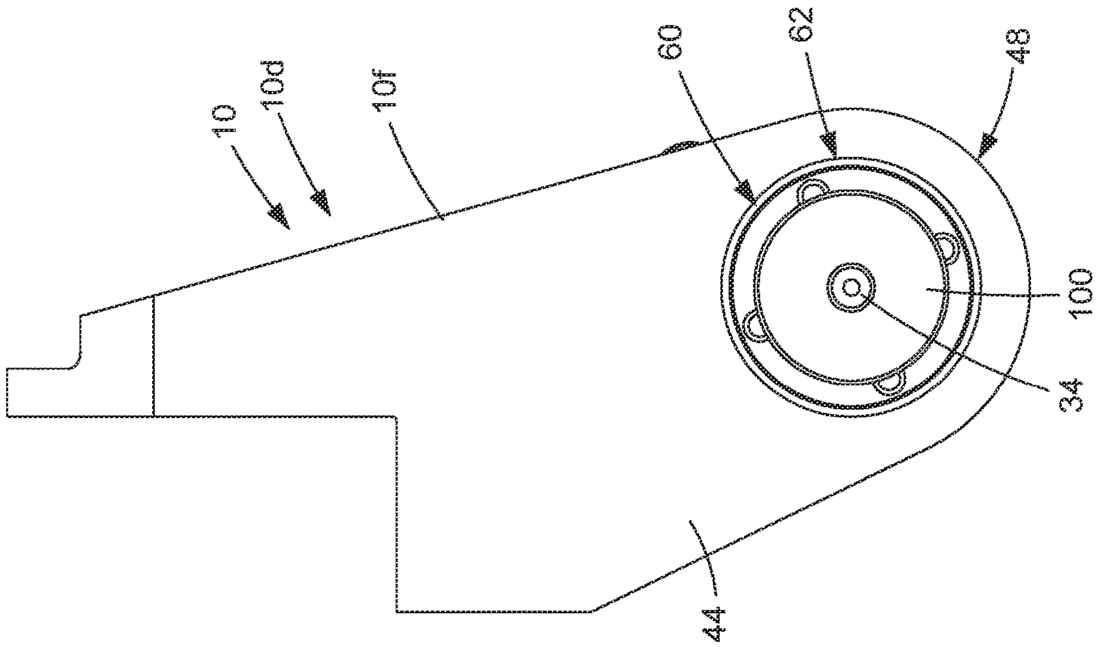
FIG. 5D is an illustration of a left side view of the support pin assembly of FIG. 5A.
Figure 5C:
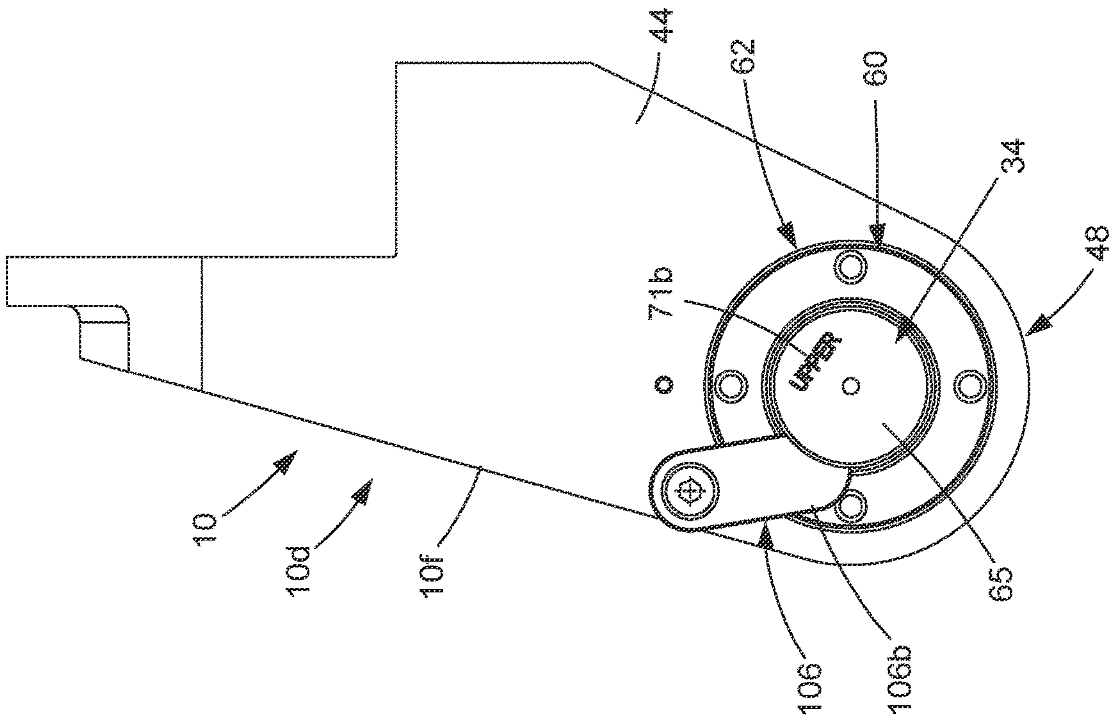
FIG. 5C is an illustration of a right side view of the support pin assembly of FIG. 5A.
Figure 5E:
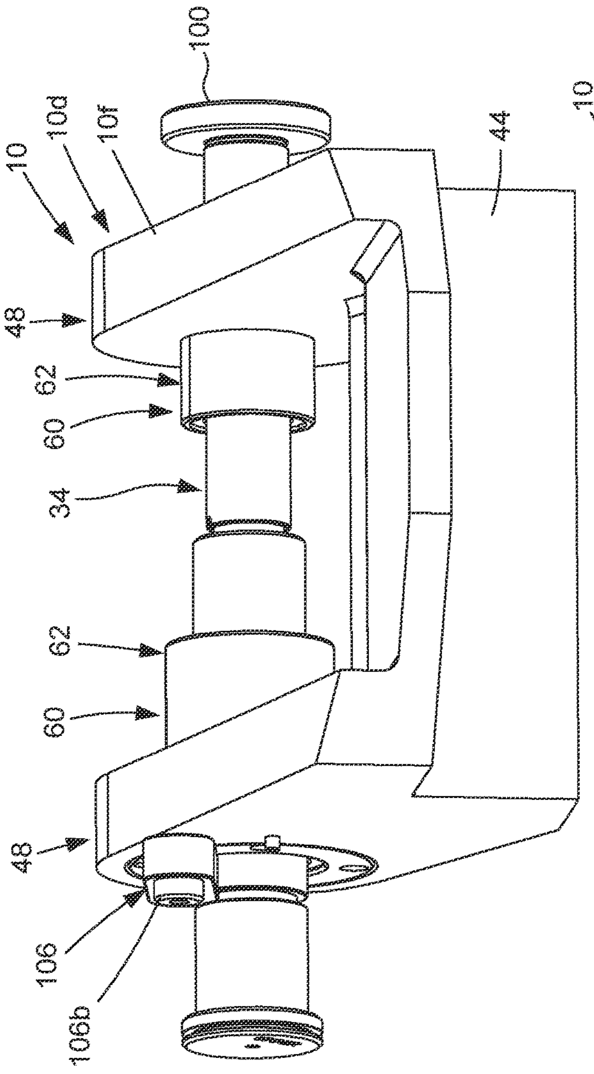
FIG. 5E is an illustration of a top view of the support pin assembly of FIG. 5A.
Figure 5F:
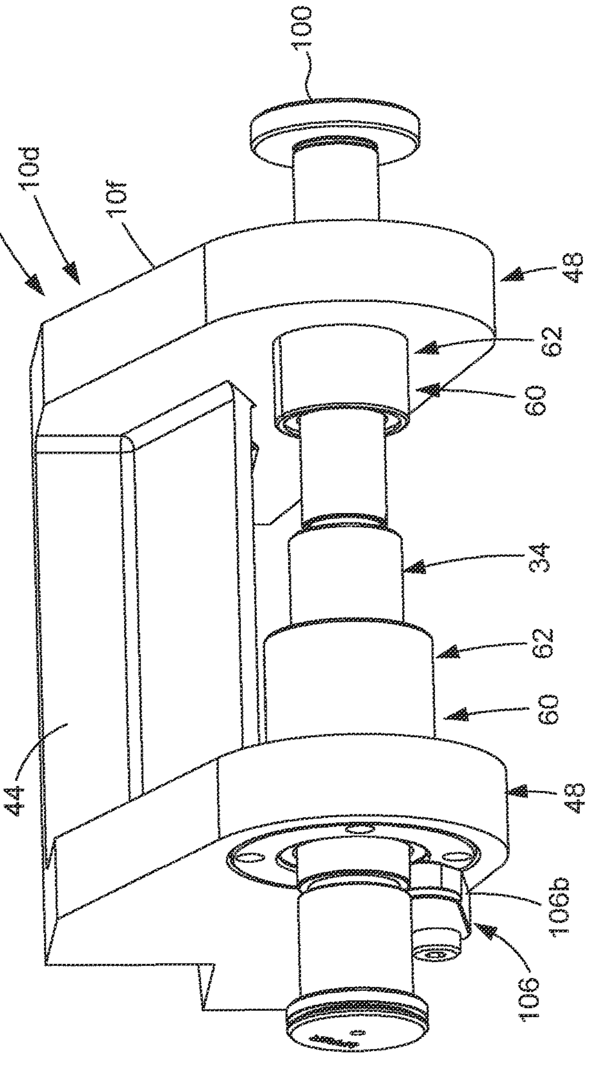
FIG. 5F is an illustration of a bottom view of the support pin assembly of FIG. 5A.

Now referring to FIGS. 5A-5F, FIGS. 5A-5F show various views of an exemplary version of a support pin assembly 10, such as the check support pin assembly 10*d*, in the form of an upper check support pin assembly 10*f*, of the disclosure. FIG. 5A is an illustration of a front perspective view of the exemplary version of the support pin assembly 10, such as the check support pin assembly 10*d*, in the form of the upper check support pin assembly 10*f*, of the disclosure, in an assembled configuration 140. FIG. 5B is an illustration of a back perspective view of the support pin assembly 10, such as the check support pin assembly 10*d*, in the form of the upper check support pin assembly 10*f*, of FIG. 5A. FIG. 5C is an illustration of a right side view of the support pin assembly 10, such as the check support pin assembly 10*d*, in the form of the upper check support pin assembly 10*f*, of FIG. 5A. FIG. 5D is an illustration of a left side view of the support pin assembly 10, such as the check support pin assembly 10*d*, in the form of the upper check support pin assembly 10*f*, of FIG. 5A. FIG. 5E is an illustration of a top view of the support pin assembly 10, such as the check support pin assembly 10*d*, in the form of the upper check support pin assembly 10*f*, of FIG. 5A. FIG. 5F is an illustration of a bottom view of the support pin assembly 10, such as the check support pin assembly 10*d*, in the form of the upper check support pin assembly 10*f*, of FIG. 5A.

The support pin assembly 10, such as the upper check support pin assembly 10*f*, is configured to be coupled or mounted to the assembly jig 30 (see FIGS. 1, 12A), and the pin 34 (see FIGS. 5A-5F) is configured to be located at a hole 28 (see FIG. 12A) in a frame section 26 of a part 24 (see FIG. 12A) at a check location 38 (see FIGS. 1, 12A), such as an upper check location 38*b* (see FIGS. 1, 12A). As shown in FIGS. 5A-5F, the support pin assembly 10, such as the upper check support pin assembly 10*f*, comprises the pin 34 inserted through the bushings 60, such as the linear bushings 62, which are press fit within the clevis lugs 48 of the clevis 44. In this version, the support pin assembly 10, such as the upper check support pin assembly 10*f*, does not include the engineering support assembly 58 (see FIGS. 2A, 4A).

FIG. 5A shows the clevis 44 with the clevis lugs 48, such as the first clevis lug 48*a* with the opening 50, such as the first clevis lug opening 50*a*, and such as the second clevis lug 48*b* with the opening 50, such as the second clevis lug opening 50*b*. As shown in FIG. 5A, the clevis 44 has the first side 52, which is on the other side of the second side 54 (see FIG. 5B). In this version, the clevis 44 does not include the attachment brackets 56 (see FIG. 4A). As shown in FIG. 5A, the clevis 44 has the first side 52 with the mounting surfaces 144 forming the right angle 146 and has the recessed portion 148. FIG. 5A further shows the bushings 60, such as the linear bushings 62, including the first bushing 60*a*, such as the first linear bushing 62*a*, disposed within the first clevis lug 48*a*, and the second bushing 60*b*, such as the second linear bushing 62*b*, disposed within the second clevis lug 48*b*. The clevis 44 and the bushings 60 shown in FIGS. 5A-5F have the same structure as the clevis 44 and the bushings 60 described above for FIGS. 2A-2G.

As shown in FIG. 5A, the pin 34, such as the sliding pin 34*a*, is slideably disposed within the through openings 64 of the bushings 60, such as the linear bushings 62. FIG. 5A shows the head end 65, the tail end 66, the shoulder portion 76 at least partially disposed within the first bushing 60*a*, the pin groove 82 formed circumferentially on the shoulder portion 76, and the part support portion 88 extending from the second end 80 of the shoulder portion 76, and being at least partially disposed within the second bushing 60*b*. The pin 34 shown in FIGS. 5A-5F has the same structure as the pin 34 described above for FIGS. 2A-2G.

FIG. 5A further shows the sleeve bushing 94 slideably disposed over the part support portion 88 of the pin 34. FIG. 5A shows the gap 155 between the sleeve bushing first end 96 and the second end 80 of the shoulder portion 76, where the portion 24*d* (see FIG. 12A) of the frame section 26 (see FIG. 12A) of the part 24 (see FIG. 12A) is clamped by the upper check support pin assembly 10*f*. FIGS. 5A-5B, 5D-F further shows the retainer element 100, such as the pin nut 102 (see FIG. 5A). The sleeve bushing 94 and the retainer element 100 shown in FIG. 5A have the same structure as the sleeve bushing 94 and the retainer element 100 described above for FIGS. 2A-2B, 2D-2G.

As shown in FIGS. 5A-5C, 5E-5F, the support pin assembly 10, such as the lower check support pin assembly 10*c*, further comprises the gauge assembly 106 comprising the swing away gauge bar assembly 106*b*. FIG. 5B shows the pin groove engagement portion 108 coupled to the pin groove 82 formed on the shoulder portion 76 of the pin 34. FIG. 5B shows the pin groove engagement portion 108 in the form of the finger element 114 having the edge 116 coupled to the pin groove 82 of the pin 34 to provide the check location 38 (see FIGS. 1, 12A), such as the upper check location 38*b* (see FIGS. 1, 12A), of the nominal location 36 (see FIG. 1). FIGS. 5A-5B further show the rotation stop element 198 coupled to the clevis 44, to provide the stop 200 for the finger element 114, when the finger element 114 rotates about the shoulder portion 76 of the pin 34.

Now referring to FIG. 6A, FIG. 6A is an illustration of a perspective view of an exemplary version of the pin 34, such as the sliding pin 34*a*, or a floating pin, used in an exemplary version of the support pin assembly 10 (see FIGS. 1, 2A, 3A, 4A, 5A) of the disclosure. FIG. 6A shows the head end 65, the tail end 66, such as the threaded tail end 66*a*, for the retainer element 100 (see FIG. 2A), and the body 68, such as the cylindrical body, of the pin 34 formed between the head end 65 and the tail end 66. FIG. 6A further shows the slip fit hole 70, such as the first slip fit hole 70*a*, formed in the head end 65, the exterior 72, and the length 75 of the pin 34. As shown in FIG. 2G, the tail end 66 also has the slip fit hole 70, such as the second slip fit hole 70*b*. The slip fit holes 70 are for insertion of the construction ball 128 (see FIG. 1) for the assembly jig 30 or tool set up on both ends of the pin 34.

FIG. 6A further shows the shoulder portion 76 with the first end 78, the second end 80, and the pin groove 82 formed circumferentially on the exterior portion 72*a* of the shoulder portion 76 of the pin 34. The pin groove 82 is preferably a machined pin groove 82*a* (see FIG. 6A) for nominal set up location. The second end 80 preferably has a machined surface 202*a* to clamp the part 24 (see FIGS. 1, 12E), such as the production part 24*c* (see FIG. 1). The part 24, such as the production part 24*c*, is clamped between the pin 34 and the sleeve bushing 94 (see FIG. 6B).

The shoulder portion 76 has the cylindrical shape 84*a* (see FIG. 6A) and has the outer diameter 86*a* (see FIG. 6A). FIG. 6A further shows a distance 204 or length between the pin groove 82 and the second end 80 of the shoulder portion 76. The location of the pin 34 is a predetermined distance, or a known distance, from the part 24 (see FIGS. 1, 12E), such as the fuselage part 24*a* (see FIG. 1), the wing part 24*b* (see FIG. 1), or another suitable production part 24*c* (see FIG. 1), so that when the pin 34 is locked in place with the gauge assembly 106 (see FIGS. 1, 2A), such as the gauge bar assembly 106*a* (see FIGS. 1, 2A), it is confirmed that the part 24 is in the correct nominal location 36 (see FIGS. 1, 12E). The gauge assembly 106 (see FIGS. 1, 4B), such as the swing away gauge bar assembly 106*b* (see FIGS. 1, 4B), coupled to the pin groove 82 (see FIGS. 1, 4B), verifies that the pin 34 and the support pin assembly 10 are in the nominal location 36 (see FIGS. 1, 12A) through the full size determinant assembly build process 16 (see FIG. 1). The predetermined distance, or the known distance, of the pin 34 from the part 24 is determined by where the gauge assembly 106 and the pin groove 82 are attached or coupled together.

FIG. 6A further shows the part support portion 88 extending from the second end 80 of the shoulder portion 76, and shows the first end 90 and the second end 92 of the part support portion 88 of the pin 34. The part support portion 88 has the cylindrical shape 84*b* (see FIG. 6A) and has the outer diameter 86*b* (see FIG. 6A). As shown in FIG. 6A, the outer diameter 86*a* of the shoulder portion 76 is greater in length than a length of the outer diameter 86*b* of the part support portion 88, and the outer diameter 86*b* of the part support portion 88 is smaller in length than the length of the outer diameter 86*a* of the shoulder portion 76. As further shown in FIG. 6A, the part support portion 88 preferably has a machined surface 202*b* designed to be inserted through the hole 28 (see FIG. 12E) of the part 24 (see FIG. 12E), such as the production part 24*c*.

Figure 6C:
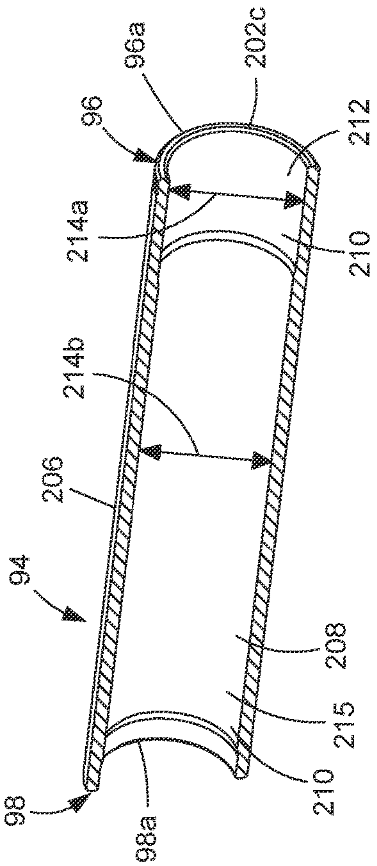
FIG. 6C is an illustration of a perspective sectional view of the sleeve bushing of FIG. 6B.
Figure 6B:
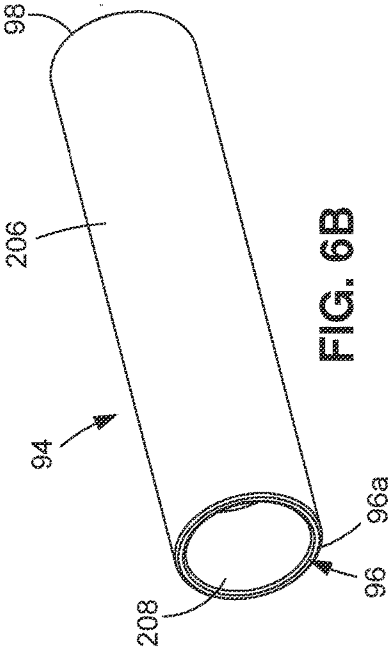
FIG. 6B is an illustration of a perspective view of an exemplary version of a sleeve bushing of the pin of FIG. 6A.

Now referring to FIGS. 6B-6C, FIG. 6B is an illustration of a perspective view of an exemplary version of the sleeve bushing 94 configured to be slideably disposed over, or coupled over, the part support portion 88 of the pin 34 of FIG. 6A, and FIG. 6C is an illustration of a perspective sectional view of the sleeve bushing 94 of FIG. 6B.

FIGS. 6B-6C show the sleeve bushing first end 96 and the sleeve bushing second end 98. The sleeve bushing first end 96 is configured to engage and clamp a portion 24*d* (see FIGS. 1, 12E) of the part 24 (see FIG. 12E) against the second end 80 (see FIG. 6A) of the shoulder portion 76 (see FIG. 6A). The sleeve bushing first end 96 is preferably a machined first end 96*a* (see FIGS. 6B-6C) having a machined surface 202*c* (see FIG. 6C) to clamp the part 24 (see FIGS. 1, 12E), such as the production part 24*c* (see FIG. 1). The part 24, such as the production part 24*c*, is clamped between the pin 34 (see FIG. 6A) and the sleeve bushing 94 (see FIG. 6B).

As shown in FIG. 6C, the sleeve bushing second end 98 may optionally be chamfered and may be in the form of a chamfered second end 98*a*. The chamfered second end 98*a* is chamfered for the retainer element 100 (see FIGS. 2B, 9), such as the pin nut 102 (see FIGS. 2B, 9).

As further shown in FIGS. 6B-6C, the sleeve bushing 94 has an exterior 206 and an interior 208. As shown in FIG. 6C, the interior 208 of the sleeve bushing 94 has an interior surface 210 with an interior surface relief portion 212 for ease of assembly to the pin 34. The interior surface relief portion 212 of the interior surface 210 has an inner diameter 214*a* (see FIG. 6C). As further shown in FIG. 6C, the interior 208 of the sleeve bushing 94 has the interior surface 210 with an interior surface machined portion 215 adjacent the interior surface relief portion 212. The interior surface machined portion 215 has an inner diameter 214*b* (see FIG. 6C). The interior surface machined portion 215 has a tight tolerance to, and substantially corresponds to, the outer diameter 86*b* (see FIG. 6A) of the part support portion 88 (see FIG. 6A) of the pin 34 (see FIG. 6A). The inner diameter 214*a* of the interior surface relief portion 212 is greater than the inner diameter 214*b* of the interior surface machined portion 215.

Now referring to FIG. 7, FIG. 7 is an illustration of a perspective view of an exemplary version of the bushing 60, in the form of the linear bushing 62, used in an exemplary version of the support pin assembly 10 (see FIGS. 1, 2A, 3A, 4A, 5A) of the disclosure. As shown in FIG. 7, the bushing 60, such as the linear bushing 62, has a first end 216*a* and a second end 216*b*. As further shown in FIG. 7, the bushing 60, such as the linear bushing 62, comprises the flange portion 150 integral with the cylindrical stem portion 152, and the through opening 64 is formed through the center of the flange portion 150 and the cylindrical stem portion 152. As shown in FIG. 7, the flange portion 150 has openings 218 spaced around an outer face 220 of the flange portion 150. The openings 218 are for fastening the bushing 60 to the clevis 44.

As further shown in FIG. 7, the bushing 60, such as the linear bushing 62, may include ball bearings 222 disposed within channel portions 224 in an interior wall 225 of the bushing 60, such as the linear bushing 62. The ball bearings 222 allow for easy, smooth actuation, such as lateral movement 40 (see FIG. 1), in a forward/aft direction.

Now referring to FIGS. 8A-8B, FIG. 8A is an illustration of a front perspective view of an exemplary version of the clevis 44 used in an exemplary version of the support pin assembly 10 (see FIGS. 1, 2A, 3A, 4A, 5A) of the disclosure. FIG. 8B is an illustration of a back perspective view of the clevis 44 of FIG. 8A.

FIGS. 8A-8B show the clevis 44 with the clevis body 46 having the clevis lugs 48, such as the first clevis lug 48*a* with the first clevis lug opening 50*a* and the second clevis lug 48*b* with the second clevis lug opening 50*b*. As shown in FIG. 8A, the clevis lugs 48 are positioned on opposing ends 142 of the clevis 44, such as the first end 142*a* and the second end 142*b*. FIG. 8A shows the first side 52 of the clevis 44 with the attachment brackets 56, including the upper attachment brackets 56*a* and the lower attachment brackets 56*b*, for attachment of the engineering support assembly 58 (see FIG. 2A). FIG. 8B shows the second side 54 of the clevis 44 with the recessed portion 148. FIG. 8B further shows the mounting surfaces 144 forming the right angle 146. The clevis 44 is mounted to the assembly jig 30 (see FIGS. 12A-12E), and the clevis 44 acts as a hard stop on the forward/aft direction for maximum movement.

Now referring to FIG. 9, FIG. 9 is an illustration of a perspective view of an exemplary version of the retainer element 100, such as the pin nut 102, used in an exemplary version of the support pin assembly 10 (see FIGS. 1, 2A, 3A, 4A, 5A) of the disclosure. As shown in FIG. 9, in one version, the retainer element 100, such as in the form of the pin nut 102, may have the opening 104, such as the threaded opening 104*a*, formed through a disk-shaped body 226. As shown in FIG. 9, in one version, the retainer element 100, such as in the form of the pin nut 102, has a protruding portion 228 formed around the opening 104. In another version, the retainer element 100 does not have the protruding portion 228 and is flat around the opening 104. The retainer element 100 is configured to cause the sleeve bushing 94 (see FIG. 6B) to clamp the portion 24*d* (see FIG. 12E) of the part 24 (see FIG. 12E) against the second end 80 (see FIG. 6A) of the shoulder portion 76 (see FIG. 6A) of the pin 34 (see FIG. 6A).

Now referring to FIG. 10, FIG. 10 is an illustration of a perspective view of an exemplary version of the gauge assembly 106, in the form of the gauge bar assembly 106*a*, used in an exemplary version of the support pin assembly 10 (see FIGS. 1, 2A, 3A) of the disclosure. As shown in FIG. 10, the gauge assembly 106, such as in the form of the gauge bar assembly 106*a*, functions as a lateral movement pin locating gauge assembly 118. As shown in FIG. 10, the gauge assembly 106, such as the gauge bar assembly 106*a*, comprises the pin groove engagement portion 108 in the form of the gauge pin 110 to locate into the pin groove 82 (see FIG. 6A) of the pin 34 (see FIG. 6A). As shown in FIG. 10, the gauge assembly 106, such as the gauge bar assembly 106*a*, further comprises the dowel pin handle 156 configured for removing the gauge pin 110 from, and out of, the pin groove 82 (see FIGS. 2G, 6A). As shown in FIG. 10, the dowel pin handle 156 has the first free end 158*a* and the second insertion end 158*b*.

As shown in FIG. 10, the gauge assembly 106, such as the gauge bar assembly 106*a*, further comprises the riser block 160 coupled to the gauge pin 110 and coupled to the dowel pin handle 156, to facilitate locating the gauge pin 110 to the pin groove 82. As shown in FIG. 10, the riser block 160 has the body 162 comprising the first body portion 162*a* attached to, or integral with, the second body portion 162*b*. The body 162 has the cut-out portion 164 (see FIG. 10) formed in the bottom-most end 165 (see FIG. 10) of the body 162 through both the first body portion 162*a* and the second body portion 162*b*. The gauge pin 110 (see FIG. 10) is attached within the cut-out portion 164 of the first body portion 162*a* of the body 162 of the riser block 160.

As shown in FIG. 10, the first body portion 162*a* of the body 162 further comprises the tab 166 extending from the top-most end 168 of the first body portion 162*a* of the body 162. The tab 166 has the tab opening 170 (see FIG. 10) designed to receive the second insertion end 158*b* (see FIG. 10) of the dowel pin handle 156 (see FIG. 10).

As shown in FIG. 10, the gauge assembly 106, such as the gauge bar assembly 106*a*, further comprises the L-pin 172 to facilitate locating the gauge pin 110 and to confirm or verify that the gauge pin 110 is located or fitted in the pin groove 82 (see FIG. 6A). As shown in FIG. 10, the L-pin 172 comprises the first cylindrical pin portion 174*a* coupled to the second cylindrical pin portion 174*b* to form the L-shaped configuration 176. As shown in FIG. 10, the first cylindrical pin portion 174*a* has the first end 178*a* coupled to, and inserted in, the riser block opening 180 on the first body portion 162*a* of the riser block 160. As shown in FIG. 10, the first cylindrical pin portion 174*a* has the second end 178*b* coupled to, and inserted in, the first hole 182*a* (see FIG. 2B) of the second cylindrical pin portion 174*b*. As shown in FIG. 10, the second cylindrical pin portion 174*b* has the first end 184*a* and the second end 184*b*. As shown in FIG. 10, the second cylindrical pin portion 174*b* has the second hole 182*b* near the second end 184*b*.

The gauge pin 110 of the gauge assembly 106, such as the gauge bar assembly 106*a*, is slip fit for removal, if needed, during the full size determinant assembly build process 16 (see FIG. 1) to achieve defeatable nominal for full size determinant assembly 14.

Now referring to FIG. 11, FIG. 11 is an illustration of a perspective view of an exemplary version of the gauge assembly 106, in the form of the swing away gauge bar assembly 106*b*, used in an exemplary version of the support pin assembly 10 (see FIGS. 1, 4A, 5A) of the disclosure. As shown in FIG. 11, the gauge assembly 106, such as in the form of the swing away gauge bar assembly 106*b*, functions as a lateral movement pin locating gauge assembly 118. FIG. 11 further shows the bushings 60, such as the linear bushings 62, disposed within the clevis lugs 48, such as the first clevis lug 48*a* and the second clevis lug 48*b*, respectively, of the clevis 44.

As shown in FIG. 11, the gauge assembly 106, such as the swing away gauge bar assembly 106*b*, comprises the pin groove engagement portion 108 in the form of the finger element 114 having the edge 116 to slide into, or couple to, the pin groove 82 (see FIGS. 5A, 6A) of the pin 34 (see FIGS. 5A, 6A) to provide the check location 38 (see FIGS. 1, 12A) of the nominal location 36 (see FIGS. 1, 12A) and/or to provide the nominal location 36 (see FIGS. 1, 12A). The finger element 114 is for nominal location 36 of the support pin assembly 10. The edge 116 of the finger element 114 is configured to slide into the pin groove 82 of the pin 34 to check for nominal build location.

The finger element 114 is configured to rotate about the shoulder portion 76 (see FIGS. 2G, 6A) of the pin 34. As shown in FIG. 11, the gauge assembly 106, such as the gauge bar assembly 106*a*, further comprises the rotation stop element 198 coupled to the clevis 44, to provide the stop 200 for the finger element 114, when the finger element 114 rotates about the shoulder portion 76 of the pin 34. The swing away gauge bar assembly 106*b* (see FIG. 4B) is attached to the clevis 44 (see FIG. 4B) with the shoulder portion 76 of the pin 34. The swing away gauge bar assembly 106*b* rotates around the shoulder portion 76 of the pin 34 bolt to engage and disengage the pin groove 82 (see FIG. 4B) of the shoulder portion 76 of the pin 34.

Now referring to FIGS. 12A-12E, FIGS. 12A-12E show various views of the support system 12 with a plurality of support pin assemblies 10 in an in-use orientation 230. FIG. 12A is an illustration of a front perspective view of an exemplary version of the support system 12 of the disclosure. FIG. 12B is an illustration of a left side perspective view of the support system 12 of FIG. 12A. FIGS. 12A-12B show exemplary versions of the support pin assemblies 10, in the form of nominal support pin assemblies 10*a*, such as lower nominal support pin assemblies 10*b* and upper nominal support pin assemblies 10*c*, and in the form of check support pin assemblies 10*d*, such as lower check support pin assemblies 10*e* and upper check support pin assemblies 10*f*, coupled to an assembly jig 30 and coupled to parts 24, such as fuselage parts 24*a*, for example, frame sections 26, such as fuselage frame sections 26*a*, of an aircraft structure 20, such as fuselage 21. As shown in FIGS. 12A-12B, the support system 12 has eight (8) support pin assemblies 10, including four (4) nominal support pin assemblies 10*a*, such as two (2) lower nominal support pin assemblies 10*b* and two (2) upper nominal support pin assemblies 10*c*. FIGS. 12A, 12C show the lower nominal support pin assemblies 10*b* each with the pin 34 located through the hole 28 at the nominal location 36, such as the lower nominal location 36*a*. FIG. 12A further shows the upper nominal support pin assemblies 10*c* each with the pin 34 located through the hole 28 at the nominal location 36, such as the upper nominal location 36*b*. As shown in FIGS. 12A-12B, the support system 12 has four (4) check support pin assemblies 10*d*, such as two (2) lower check support pin assemblies 10*e* (see FIG. 12B), and two (2) upper check support pin assemblies 10*f*. FIG. 12A shows the lower check support pin assembly 10*e* with the pin 34 located through the hole 28 at the check location 38, such as the lower check location 38*a*. FIGS. 12A, 12D further shows the upper check support pin assemblies 10*f* each with the pin 34 located through the hole 28 at the check location 38, such as the upper check location 38*b*. As further shown in FIG. 12A, the four (4) nominal support pin assemblies 10*a* have gauge assemblies 106 in the form of gauge bar assemblies 106*a*, and the four (4) (three (3) shown) check support pin assemblies 10*d* have gauge assemblies 106 in the form of swing away gauge bar assemblies 106*b*.

FIG. 12C is an illustration of an enlarged bottom perspective partial view of the support system 12 of FIG. 12A, showing two support pin assemblies 10 in the form of nominal support pin assemblies 10*a*, such as lower nominal support pin assemblies 10*b*, coupled to the assembly jig 30 and coupled to the part 24 of the aircraft structure 20, such as the fuselage part 24*a*, for example, the frame section 26, such as the fuselage frame section 26*a*, of the aircraft structure 20, such as the fuselage 21.

FIG. 12D is an illustration of an enlarged top perspective partial view of the support system 12 of FIG. 12A, showing two support pin assemblies 10 in the form of check support pin assemblies 10*d*, such as upper check support pin assemblies 10*f*, with the pin 34 inserted through the hole 28 and coupled to the assembly jig 30 and coupled to the part 24 of the aircraft structure 20, such as the fuselage part 24*a*, for example, the frame section 26, such as the fuselage frame section 26*a*, of the aircraft structure 20, such as the fuselage 21. FIG. 12D further shows the mounting surfaces 144 forming the right angle 146. FIG. 12E is an illustration of an enlarged front perspective view of the support pin assembly 10, such as the nominal support pin assembly 10*a*, for example, the lower nominal support pin assembly 10*b*, of FIG. 12A.

As shown in FIG. 12A, the assembly jig 30 comprises a fuselage assembly jig 30*a*. As shown in FIGS. 12A-12E, the fixture 32 comprises a fuselage fixture 32*a*, and the frame section 26 of the aircraft structure 20 comprises a fuselage frame section 26*a*. As shown in FIGS. 12A-12E, the assembly jig 30 comprises multiple fixtures 32 comprising rectangular structures 232. As shown in FIG. 12C, the mounting surfaces 144 of each clevis 44 are mounted to the assembly jig 30, and in particular, to the rectangular structures 232 of the fixtures 32 making up the assembly jig 30, and the pins 34 of each support pin assembly 10 are attached to holes 28 in the parts 24, such as the fuselage parts 24*a*, of the aircraft structure 20, such as the fuselage 21. As shown in FIG. 12C, the mounting surfaces 144 form a right angle 146.

FIG. 12E shows an enlarged view of the support pin assembly 10, such as the lower nominal support pin assembly 10*b*, of FIG. 12A. The lower nominal support pin assembly 10*b* shown in FIG. 12E has the same structure as the lower nominal support pin assembly 10*b* shown in FIGS. 2A-2G, as discussed in detail above.

FIG. 12E shows the support pin assembly 10, such as the lower nominal support pin assembly 10*a*, mounted to the assembly jig 30, and the pin 34 is inserted and located at the hole 28 in the part 24, such as the fuselage part 24*a*, at the nominal location 36, such as the lower nominal location 36*a*. FIG. 12E shows the clevis 44, the pin 34 inserted through the bushings 60, such as the linear bushings 62, where the pin 34 has the head end 65 and the tail end 66, and shows the sleeve bushing 94, the retainer element 100, the engineering support assembly 58, and the gauge assembly 106, such as the gauge bar assembly 106*a*. As shown in FIG. 12E, the pin 34 comprises the shoulder portion 76 with the pin groove 82, and the part support portion 88 (see FIG. 2G) inserted through the hole 28 in the part 24. The pin groove engagement portion 108 (see FIG. 10) comprising the gauge pin 110 (see FIG. 10) is coupled to the pin groove 82 (see FIG. 12E) formed on the shoulder portion 76 (see FIG. 12E) of the pin 34 (see FIG. 12E).

FIGS. 12A-12E show one version of the support system 12 in the in-use orientation 230 for the full size determinant assembly 14 (see FIG. 1). In another version, the plurality of support pin assemblies 10 in the in-use orientation 230 for the full size determinant assembly 14 may comprise one or more nominal support pin assemblies 10*a* coupled to the assembly jig 30, and coupled to the at least one part 24 of the aircraft structure 20, where the one or more nominal support pin assemblies 10*a* have the pins 34 at one or more nominal locations 36, and each of the one or more nominal support pin assemblies 10*a* have the gauge assembly 106 comprising the gauge bar assembly 106*a*, and one or more check support pin assemblies 10*d* coupled to the assembly jig 30, and coupled to the at least one part 24 or coupled to another of the at least one parts 24 of the aircraft structure 20, where the one or more check support pin assemblies 10*d* have the pins 34 at one or more check locations 38, and each of the one or more check support pin assemblies 10*d* have the gauge assembly 106 comprising the swing away gauge bar assembly 106*b*.

In another version, the plurality of support pin assemblies 10 in the in-use orientation 230 for the full size determinant assembly 14 may comprise one or more lower nominal support pin assemblies 10*b* (see FIGS. 2A, 12A), each having the engineering support assembly 58 (see FIG. 2A) coupled to the clevis 44 (see FIG. 2A), one or more upper nominal support pin assemblies 10*c* (see FIGS. 3A, 12A), one or more lower check support pin assemblies 10*e* (see FIGS. 4A, 12A), each having the engineering support assembly 58 (see FIG. 4A) coupled to the clevis 44 (see FIG. 4A), and one or more upper check support pin assemblies 10*f* (see FIGS. 5A, 12A).

In another version, the plurality of support pin assemblies 10 in the in-use orientation 230 for the full size determinant assembly 14 may comprise at least one support pin assembly 10 when the at least one support pin assembly 10 is positioned at a center nominal location 36*c* (see FIG. 1) on the at least one part 24 of the aircraft structure 20, or at least two support pin assemblies 10 when the at least two support pin assemblies 10 are positioned along at least two side nominal locations 36*d* (see FIG. 1) on the at least one part 24 of the aircraft structure 20.

Figure 13:
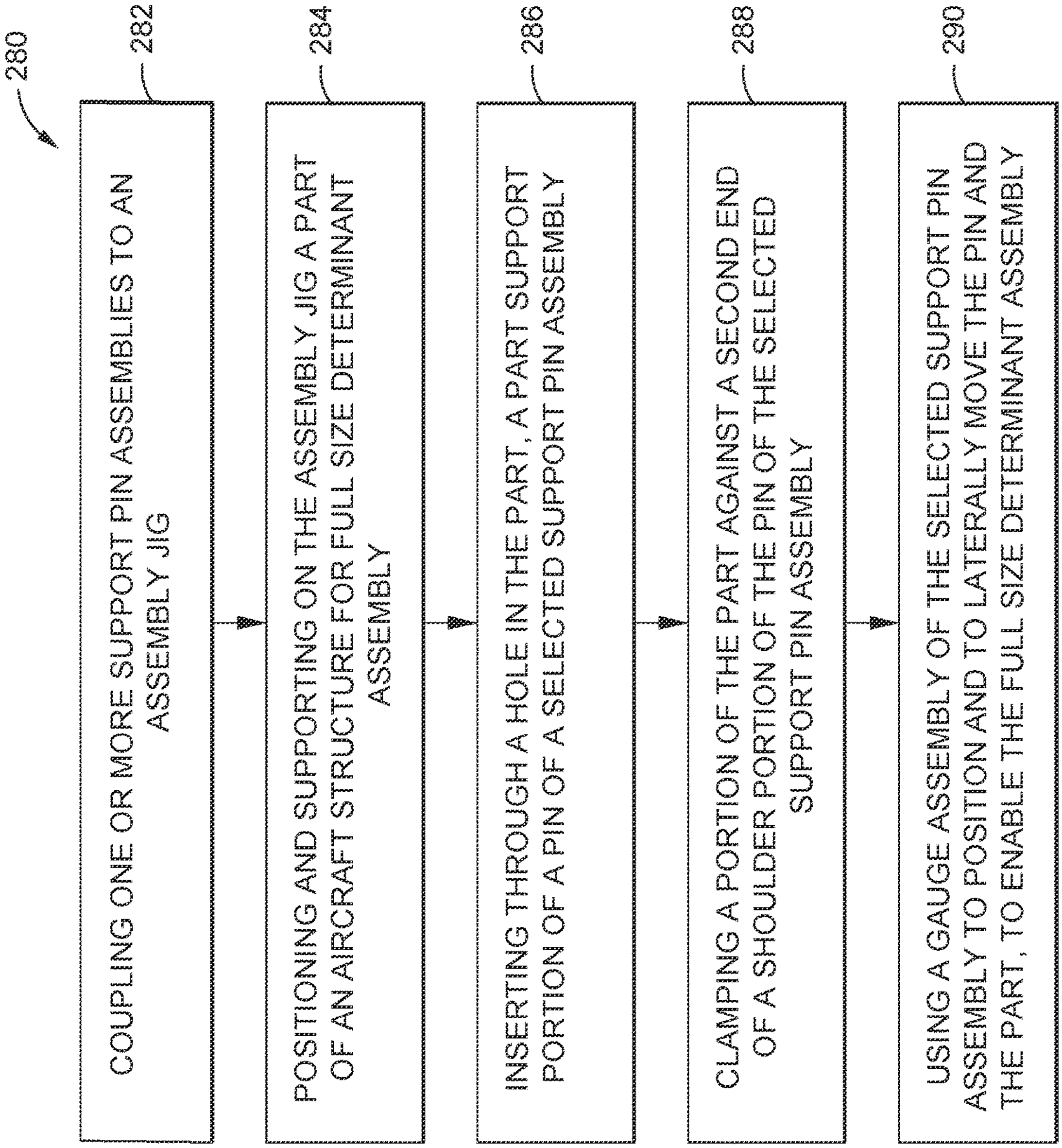
FIG. 13 is an illustration of a flow diagram of an exemplary method of the disclosure.

Now referring to FIG. 13, FIG. 13 is an illustration of a flow diagram of an exemplary version of a method 280 of the disclosure. In another version of the disclosure, there is provided the method 280 of supporting an aircraft structure 20 (see FIG. 1) for full size determinant assembly 14 (see FIG. 1). The blocks in FIG. 13 represent operations and/or portions thereof, or elements, and lines connecting the various blocks do not imply any particular order or dependency of the operations or portions thereof, or elements. FIG. 13 and the disclosure of the steps of the method 280 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 13, the method 280 comprises coupling 282 one or more support pin assemblies 10 (see FIGS. 1, 2A, 3A, 4A, 5A), such as one or more support sliding pin assemblies, to an assembly jig 30 (see FIGS. 1, 12A). Each support pin assembly 10 comprises the clevis 44 (see FIGS. 1, 2A, 2G, 8A-8B) coupled to the assembly jig 30. As shown in FIGS. 1, 8A-8B, the clevis 44 has the clevis body 46 with the first clevis lug 48*a* having the first clevis lug opening 50*a*, and the second clevis lug 48*b* having the second clevis lug opening 50*b*. As shown in FIGS. 1, 2G, 7, each support pin assembly 10 further comprises bushings 60, such as linear bushings 62, comprising the first bushing 60*a* (see FIG. 2G), such as the first linear bushing 62*a* (see FIG. 2G), and the second bushing 60*b* (see FIG. 2G), such as the second linear bushing 62*b* (see FIG. 2G). As shown in FIG. 2G, the first bushing 60*a*, such as the first linear bushing 62*a*, is disposed within the first clevis lug 48*a*, and the second bushing 60*b*, such as the second linear bushing 62*b*, is disposed within the second clevis lug 48*b*.

As shown in FIGS. 1, 2G, 3A, 4A, 5A, 6A, each support pin assembly 10 further comprises the pin 34, such as the sliding pin 34*a*, or the floating pin, slideably disposed within the first bushing 60*a*, such as the first linear bushing 62*a*, and slideably disposed within the second bushing 60*b*, such as the second linear bushing 62*b*. As shown in FIGS. 1, 2G, 6A, the pin 34 comprises the head end 65 and the tail end 66. As shown in FIGS. 1, 2G, 6A, the pin 34 further comprises the shoulder portion 76 at least partially disposed within the first bushing 60*a* and within the first clevis lug 48*a*. As shown in FIGS. 2G, 6A, the shoulder portion 76 has the first end 78, the second end 80 or shoulder end, and the pin groove 82 formed circumferentially on the exterior portion 72*a* of the shoulder portion 76 of the pin 34.

As shown in FIGS. 1, 2G, 6A, the pin 34 further comprises the part support portion 88 extending from the shoulder portion 76. As shown in FIGS. 2G, 6A, the part support portion 88 has the first end 90 and the second end 92 and is at least partially disposed within the second bushing 60*b* and within the second clevis lug 48*b*.

As shown in FIGS. 1, 2G, 6B-6C, each support pin assembly 10 further comprises the sleeve bushing 94 slideably disposed over the part support portion 88 (see FIG. 2G). As shown in FIGS. 1, 2G, 9, each support pin assembly 10 further comprises the retainer element 100, such as the pin nut 102, having the opening 104 (see FIG. 9), such as the threaded opening 104*a* (see FIG. 9), coupled to the part support portion 88. The retainer element 100 retains the sleeve bushing 94 to the part support portion 88.

As shown in FIGS. 1, 2G, 10, 11, each support pin assembly 10 further comprises the gauge assembly 106 having the pin groove engagement portion 108 coupled to the pin groove 82 (see FIG. 2G) on the shoulder portion 76 (see FIG. 2G) of the pin 34 (see FIG. 2G). In one version, the gauge assembly 106 comprises the gauge bar assembly 106*a* (see FIG. 10). In another version, the gauge assembly 106 comprises the swing away gauge bar assembly 106*b* (see FIG. 11). The gauge assembly 106 functions as a lateral movement pin locating gauge assembly 118 (see FIGS. 10, 11).

Coupling 282 the one or more support pin assemblies 10 to the assembly jig 30 may further comprise coupling the one or more support pin assemblies 10 to the assembly jig 30, wherein the pin 34 further comprises, as shown in FIG. 2G, the first slip fit hole 70*a* of the head end 65 and the second slip fit hole 70*b* of the tail end 66. The one or more of, the first slip fit hole 70*a*, and/or the second slip fit hole 70*b*, are each configured to receive a construction ball 128 (see FIG. 1) that creates a visual reference point 130 (see FIG. 1) for a laser metrology system 120 (see FIG. 1) to perform a laser metrology process 122 (see FIG. 1), to locate the hole 28 (see FIG. 1) and to confirm an accurate positioning 124 (see FIG. 1) and an accurate alignment 126 (see FIG. 1) of the pin 34 with respect to the hole 28 in the part 24 of the aircraft structure 20.

Coupling 282 the one or more support pin assemblies 10 to the assembly jig 30 may further comprise coupling a plurality of support pin assemblies 10 to the assembly jig 30, wherein the plurality of support pin assemblies 10 comprise one or more nominal support pin assemblies 10*a* (see FIGS. 1, 12A) coupled to the assembly jig 30, and coupled to the at least one part 24 of the aircraft structure 20. The one or more nominal support pin assemblies 10*a*, such as the lower nominal support pin assembly 10*b* (see FIG. 12A) and/or the upper nominal support pin assembly 10*c* (see FIG. 12A), have the pins 34 located at one or more nominal locations 36, such as the lower nominal location 36*a* (see FIG. 12A) and/or the upper nominal location 36*b* (see FIG. 12A), respectively, and each of the one or more nominal support pin assemblies 10*a* have the gauge assembly 106 comprising the gauge bar assembly 106*a* (see FIGS. 1, 10, 12A).

Coupling 282 the one or more support pin assemblies 10 to the assembly jig 30 may further comprise coupling a plurality of support pin assemblies 10 to the assembly jig 30, wherein the plurality of support pin assemblies 10 comprise, one or more check support pin assemblies 10*d* (see FIG. 1) coupled to the assembly jig 30, and coupled to the at least one part 24, or coupled to another of the at least one parts 24 of the aircraft structure 20. The one or more check support pin assemblies 10*d*, such as the lower check support pin assembly 10*e* (see FIG. 12A) and/or the upper check support pin assembly 10*f* (see FIG. 12A), have the pins 34 at one or more check locations 38, such as the lower check location 38*a* (see FIG. 12A) and/or the upper check location 38*b* (see FIG. 12A), and each of the one or more check support pin assemblies 10*d* have the gauge assembly 106 comprising the swing away gauge bar assembly 106*b* (see FIGS. 1, 11, 12A).

As shown in FIG. 13, the method 280 further comprises positioning and supporting 284 on the assembly jig 30 (see FIGS. 1, 12A) at least one part 24 (see FIGS. 1, 12A), such as a production part 24*c* (see FIG. 1) of the aircraft structure 20 (see FIGS. 1, 12A) for the full size determinant assembly 14 (see FIG. 1).

Positioning and supporting 284 on the assembly jig 30 the at least one part 24 of the aircraft structure 20 for the full size determinant assembly 14 may further comprise positioning and supporting the at least one part 24 comprising one of, a fuselage part 24*a* (see FIGS. 1, 12A), of the aircraft structure 20 comprising the fuselage 21 (see FIGS. 1, 12A), on the assembly jig 30 (see FIGS. 1, 12A) comprising the fuselage assembly jig 30*a* (see FIGS. 1, 12A), or comprising the wing part 24*b* (see FIG. 1), of the aircraft structure 20 comprising a wing 22 (see FIG. 1), on the assembly jig 30 comprising a wing assembly jig 30*b* (see FIG. 1).

As shown in FIG. 13, the method 280 further comprises inserting 286 through a hole 28 in the at least one part 24, the part support portion 88 of the pin 34 of a selected support pin assembly 10*g* of the one or more support pin assemblies 10.

As shown in FIG. 13, the method 280 further comprises clamping 288 a portion 24*d* (see FIGS. 12A, 12E) of the at least one part 24 against the second end 80 (see FIG. 12E) of the shoulder portion 76 (see FIG. 12E) of the pin 34 (see FIG. 12E) of the selected support pin assembly 10*g* (see FIG. 1), by using the retainer element 100 (see FIGS. 1, 2G, 9) to urge the sleeve bushing 94 (see FIGS. 1, 2G, 6B) to clamp the portion 24*d* (see FIGS. 12A, 12E) of the at least one part 24 (see FIGS. 12A, 12E) between the second end 80 and the sleeve bushing 94.

As shown in FIG. 13, the method 280 further comprises using 290 the gauge assembly 106 of the selected support pin assembly 10*g* to position and to laterally move the pin 34 and the at least one part 24 of the aircraft structure 20, to enable the full size determinant assembly 14. This may also avoid a binding condition 42 (see FIG. 1) of the pin 34. Using 290 the gauge assembly 106 to position and to laterally move the pin 34 and the at least one part 24, further comprises, using the gauge assembly 106 having the pin groove engagement portion 108 (see FIGS. 2G, 10) to releasably engage the pin groove 82 (see FIG. 2G), to position the pin 34 at a nominal location 36 (see FIG. 12E), and to release from the pin groove 82, to allow the pin 34 to laterally move.

Figure 14:
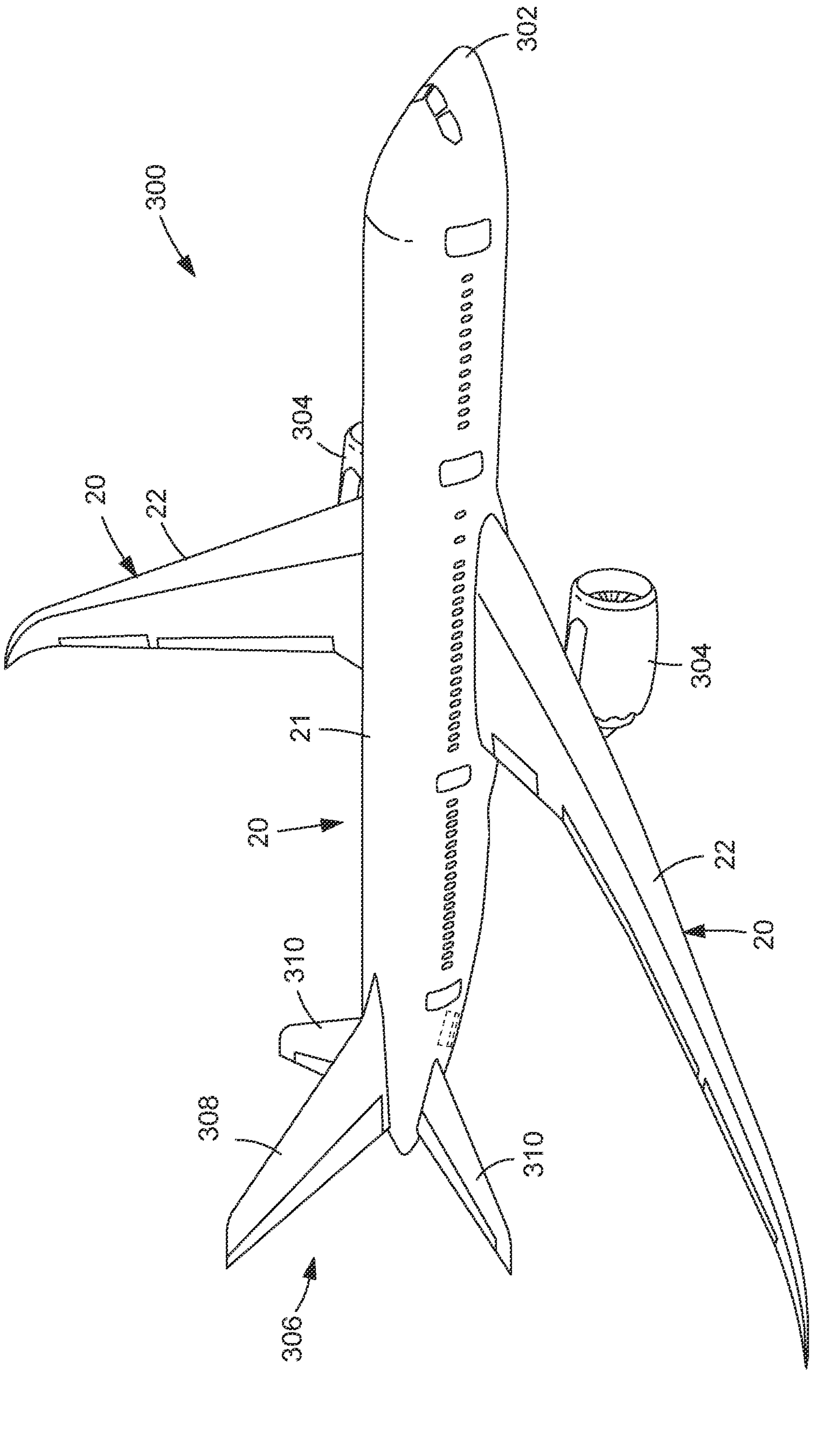
FIG. 14 is an illustration of a perspective view of an exemplary aircraft having a fuselage and wings that may be manufactured using an exemplary version of a support system with one or more support pin assemblies of the disclosure for full size determinant assembly.

Now referring to FIG. 14, FIG. 14 is an illustration of a perspective view of an exemplary aircraft 300 having aircraft structures 20, such as a fuselage 21 and wings 22, that may be manufactured using an exemplary version of the support system 12 (see FIG. 1) with one or more support pin assemblies 10 (see FIGS. 1, 2A, 3A, 4A, 5A) of the disclosure for full size determinant assembly 14 (see FIG. 1), as discussed above. As shown in FIG. 14, the aircraft 300 includes the fuselage 21, the wings 22, a nose 302, engines 304, and an empennage 306. As shown in FIG. 14, the empennage 306 comprises a vertical stabilizer 308 and horizontal stabilizers 310.

Figure 16:
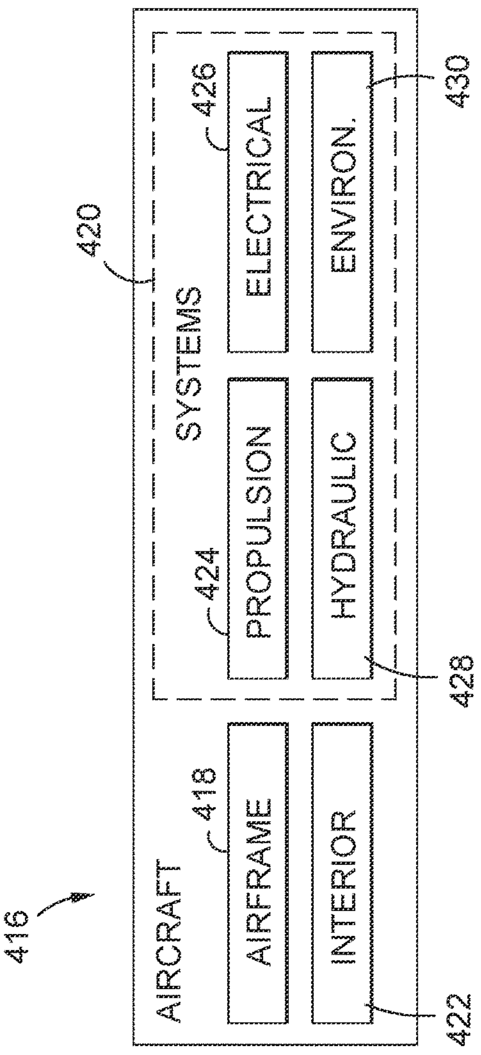
FIG. 16 is an illustration of an exemplary block diagram of an aircraft.
Figure 15:
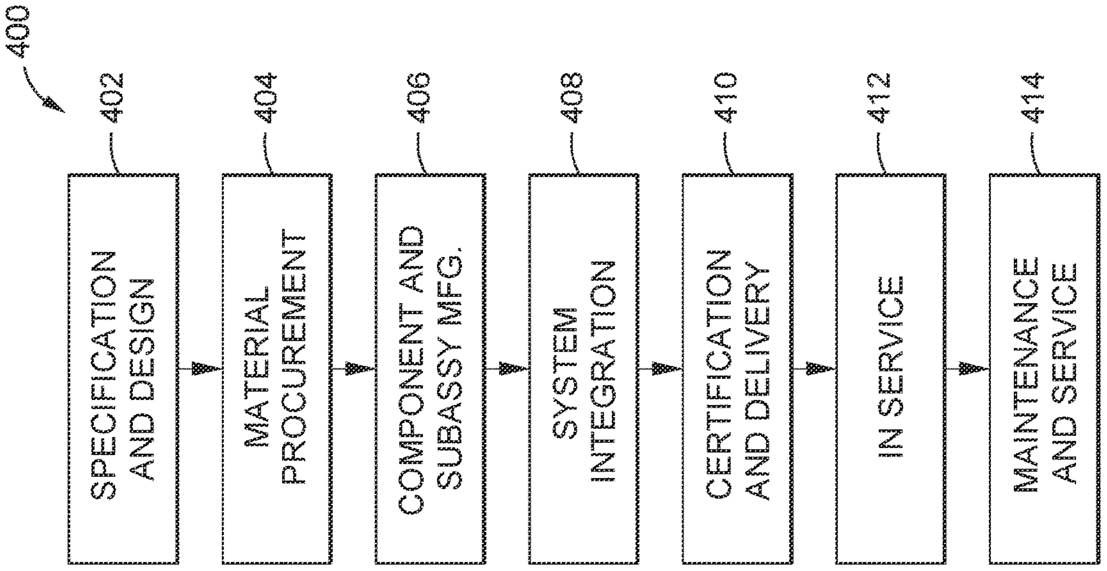
FIG. 15 is an illustration of a flow diagram of an exemplary aircraft manufacturing and service method.

Now referring to FIGS. 15 and 16, FIG. 15 is an illustration of a flow diagram of an exemplary aircraft manufacturing and service method 400, and FIG. 16 is an illustration of an exemplary block diagram of an aircraft 416. Referring to FIGS. 14 and 15, versions of the disclosure may be described in the context of the aircraft manufacturing and service method 400 as shown in FIG. 15, and the aircraft 416 as shown in FIG. 16.

During pre-production, exemplary aircraft manufacturing and service method 400 may include specification and design 402 of the aircraft 416 and material procurement 404. During manufacturing, component and subassembly manufacturing 406 and system integration 408 of the aircraft 416 takes place. Thereafter, the aircraft 416 may go through certification and delivery 410 in order to be placed in service 412. While in service 412 by a customer, the aircraft 416 may be scheduled for routine maintenance and service 414 (which may also include modification, reconfiguration, refurbishment, and other suitable services).

Each of the processes of the aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 16, the aircraft 416 produced by the exemplary aircraft manufacturing and service method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosure may be applied to other industries, such as the automotive industry, the construction industry, or another suitable industry.

Methods and systems embodied herein may be employed during any one or more of the stages of the aircraft manufacturing and service method 400. For example, components or subassemblies corresponding to component and subassembly manufacturing 406 may be fabricated or manufactured in a manner similar to components or subassemblies produced while the aircraft 416 is in service 412. Also, one or more apparatus embodiments, method embodiments, or a combination thereof, may be utilized during component and subassembly manufacturing 406 and system integration 408, for example, by substantially expediting assembly of or reducing the cost of the aircraft 416. Similarly, one or more of apparatus embodiments, method embodiments, or a combination thereof, may be utilized while the aircraft 416 is in service 412, for example and without limitation, to maintenance and service 414.

Disclosed versions of the support pin assemblies 10 (see FIGS. 1, 2A-5F), the support system 12 (see FIGS. 1, 12A-12E) implementing the support pin assemblies 10, and the method 280 (see FIG. 13) provide a custom pin design for the support pin assembly 10 that can be used in a variety of full size determinant assembly build ups 18 (see FIG. 1) and that accurately positions and supports parts 24, such as production parts 24*c* (see FIG. 1), of aircraft structures 20 (see FIGS. 1, 12A), such as fuselage 21 (see FIGS. 1, 12A), wings 22 (see FIG. 1), or other suitable aircraft structures 20, for full size determinant assembly 14 (see FIG. 1). The novel support system 12 with the one or more support pin assemblies 10 allows for building the aircraft structure 20, such as the fuselage 21, for example, a full aircraft fuselage, or the wing 22, in a single assembly jig 30 (see FIGS. 1, 12A) with full size determinate assembly 14, rather than building in modules and splicing the modules together as in known systems and methods.

Further, the support system 12 with the one or more support pin assemblies 10 does not over constrain the full size determinate assembly build up 18 (see FIG. 1), and allows the full size determinate assembly build up 18 to move or to float by providing a means for nominal adjustment 136 (see FIG. 1) of the pin 34 (see FIGS. 1, 2G) or pin float 138 (see FIG. 1) with the lateral movement 40 (see FIG. 1) of the pin 34. The support system 12 with the one or more support pin assemblies 10 allows for the full size determinate assembly build up 18 to float in forward and aft directions for the full size determinate assembly build process 16 (see FIG. 1). The support system 12 with the one or more support pin assemblies 10 not only allows the pin 34 and the part 24 to float forward and aft but also allows for locating the pin 34 at the nominal location 36 (see FIGS. 1, 12E) for assembly checks.

In addition, disclosed versions of the support pin assemblies 10 (see FIGS. 1, 2A-5F), the support system 12 (see FIGS. 1, 12A-12E) implementing the support pin assemblies 10, and the method 280 (see FIG. 13) provide a gauge assembly 106 (see FIGS. 10, 11) with a pin groove engagement portion 108 (see FIG. 10, 11) configured to releasably engage, and engaging, the pin groove 82 (see FIGS. 2G, 6A) of the pin 34 (see FIGS. 2G, 6A), to position the pin 34 at the nominal location 36 (see FIGS. 1, 12E), and to release from the pin groove 82, to allow the pin 34 to laterally move. By quickly releasing the pin groove engagement portion 108 of the gauge assembly 106 from the pin groove 82 on a number of the pins 34 for the part 24 being supported, the pin 34 is permitted to have lateral movement 40 (see FIG. 1) and the part 24 being separated moves slightly to permit insertion of fasteners and to avoid pin binding. The support pin assembly 10 and the support system 12 allow for the nominal adjustment 136 (see FIG. 1) of the pin 34 and the pin float 138 (see FIG. 1) of the pin 34 and allow for the pin release 132 (see FIG. 1) in the event of the binding condition 42 (see FIG. 1) of the pin 34, or pin binding. The nominal adjustment 136 and the pin float 138 allow the pin 34 to slide laterally, forward and aft, to allow adjustment movement of the part 24, such as the fuselage part 24*a* (see FIG. 1), the wing part 24*b* (see FIG. 1), or another type of production part 24*c* (see FIG. 1), that is being supported during full size determinant assembly 14 (see FIG. 1). Further, the support system 12 with the one or more support pin assemblies 10 allows for the ability to move the part 24 or parts 24 of the aircraft structure 20, such as the fuselage 21 or the wing 22, in frame sections 26 (see FIGS. 1, 12A), such as large frame sections, such as the fuselage frame section 26*a* (see FIGS. 1, 12A) or the wing frame section 26*b* (see FIG. 1), with minimal force being applied.

Moreover, disclosed versions of the support pin assemblies 10 (see FIGS. 1, 2A-5F), the support system 12 (see FIGS. 1, 12A-12E) implementing the support pin assemblies 10, and the method 280 (see FIG. 13) provide a means to avoid or prevent possible misalignments of the holes 28 (see FIGS. 1, 12A, 12E) within the part 24 coupled to the assembly jig 30. The support system 12 and the one or more support pin assemblies 10 of the support system 12 allow for hole misalignment prevention 134 (see FIG. 1). Further, the one or more support pin assemblies 10 and the support system 12 with the one or more support pin assemblies 10, allow for the build up of the fuselage assembly jig 30*a* without jig lock or pin binding issues. Thus, the support pin assembly 10, such as the support sliding pin assembly, provides for nominal adjustment 136 (see FIG. 1) and for pin float 138 (see FIG. 1). In addition, the support pin assembly 10, such as the support sliding pin assembly, is a custom pin design that can be used in a variety of full size determinant assembly build ups 18 (see FIG. 1) and that accurately positions and supports the part 24, such as the fuselage part 24*a*, for full size determinant assembly 14 (see FIG. 1). The novel support pin assembly 10 allows for the build up of the aircraft structure 20 without hole misalignment issues.

In addition, disclosed versions of the support pin assemblies 10 (see FIGS. 1, 2A-5F), the support system 12 (see FIGS. 1, 12A-12E) implementing the support pin assemblies 10, and the method 280 (see FIG. 13) provide for a clevis 44 (see FIGS. 2A, 8A-8B) feature that has defeatable nominal locations for assembly checks. Defeatable nominal for full size determinant assembly 14 means that it holds the nominal location 36 (see FIGS. 1, 12E) and defeatable means the pin 34 may be released or moved if needed during the full size determinant assembly build process 16 (see FIG. 1). By moving the gauge assembly 106 away from the pin groove 82 so that the pin 34 has lateral movement 40 (see FIG. 1) during the full size determinant assembly build process 16, the nominal location 36 or position is defeated to allow the part 24 to move slightly to insert fasteners or other suitable components. The novel support pin assembly 10 allows for the build up of the aircraft structure 20 (see FIGS. 1, 12A), such as the fuselage 21 (see FIGS. 1, 12A), the wing 22 (see FIG. 1), or another production part 24*c* (see FIG. 1), to move or to float forward and aft for the full size determinate assembly build process 16 (see FIG. 1).

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A support pin assembly for full size determinant assembly of an aircraft structure, the support pin assembly comprising:

a clevis having a clevis body with a first clevis lug and a second clevis lug, the clevis configured for mounting to an assembly jig;

a first bushing disposed within the first clevis lug, and a second bushing disposed within the second clevis lug;

a pin slideably disposed within the first bushing and within the second bushing, the pin comprising:

a head end and a tail end;

a shoulder portion at least partially disposed within the first bushing, the shoulder portion having a first end, a second end, and a pin groove formed circumferentially on an exterior portion of the shoulder portion; and a part support portion extending from the shoulder portion, and being at least partially disposed within the second bushing and configured to fit through a hole in a part of the aircraft structure;

a sleeve bushing slideably disposed over the part support portion and having a sleeve bushing first end configured to engage and clamp a portion of the part against the second end of the shoulder portion;

a retainer element coupled to the part support portion and retaining the sleeve bushing to the part support portion, the retainer element configured to cause the sleeve bushing to clamp the portion of the part against the second end of the shoulder portion; and a gauge assembly having a pin groove engagement portion configured for coupling to the pin groove on the shoulder portion, wherein the support pin assembly allows for a lateral movement of the pin and the part of the aircraft structure, to enable the full size determinant assembly.

2. The support pin assembly of claim 1, wherein the gauge assembly having the pin groove engagement portion is configured to:

releasably engage the pin groove, to position the pin at a nominal location; and release from the pin groove, to allow the pin to laterally move.

3. The support pin assembly of claim 2, wherein the gauge assembly comprises a gauge bar assembly comprising:

the pin groove engagement portion comprising a gauge pin to locate into the pin groove of the pin, the gauge pin configured for slip fit removal;

a dowel pin handle configured for removing the gauge pin out of the pin groove;

a riser block coupled to the gauge pin and coupled to the dowel pin handle, to facilitate locating the gauge pin to the pin groove; and an L-pin to confirm that the gauge pin is located in the pin groove.

4. The support pin assembly of claim 2, wherein the gauge assembly comprises a swing away gauge bar assembly comprising:

the pin groove engagement portion comprising a finger element having an edge to slide into the pin groove of the pin, to provide a check location of the nominal location, the finger element configured to rotate about the shoulder portion of the pin; and a rotation stop element coupled to the clevis, to provide a stop for the finger element when it rotates about the shoulder portion.

5. The support pin assembly of claim 2, wherein the gauge assembly allows the pin to laterally move a distance in a range of 0.5 inch to 2.0 inches.

6. The support pin assembly of claim 1, further comprising an engineering support assembly coupled to the clevis, the engineering support assembly comprising:

an attachment apparatus coupled to the clevis;

a pair of rollers coupled to the attachment apparatus; and a turnbuckle having a first end coupled to the attachment apparatus and positioned between the pair of rollers, and having a second end coupled to the clevis.

7. The support pin assembly of claim 1, wherein the first bushing comprises a first linear bushing, and the second bushing comprises a second linear bushing.

8. The support pin assembly of claim 1, wherein the sleeve bushing further comprises:

an interior surface having an interior surface relief portion and an interior surface machined portion, where the interior surface machined portion has an inner diameter substantially corresponding to an outer diameter of the part support portion of the pin.

9. The support pin assembly of claim 1, wherein the tail end of the pin is a threaded tail end, and the retainer element comprises a pin nut having a threaded opening, such that the threaded opening of the pin nut is threadably coupled to the threaded tail end of the pin.

10. A support system for full size determinant assembly of an aircraft structure, the support system comprising:

an assembly jig;

at least one part of the aircraft structure for the full size determinant assembly, the at least one part positioned on, and supported by, the assembly jig; and one or more support pin assemblies coupled to the assembly jig and to the at least one part, each support pin assembly comprising:

a clevis mounted to the assembly jig, the clevis having a clevis body with a first clevis lug and a second clevis lug;

a first bushing disposed within the first clevis lug, and a second bushing disposed within the second clevis lug;

a pin slideably disposed within the first bushing and within the second bushing, the pin comprising:

a head end and a tail end;

a shoulder portion at least partially disposed within the first bushing, the shoulder portion having a first end, a second end, and a pin groove formed circumferentially on an exterior portion of the shoulder portion; and a part support portion extending from the shoulder portion, and being at least partially disposed within the second bushing and inserted through a hole in the at least one part of the aircraft structure;

a sleeve bushing slideably disposed over the part support portion and having a sleeve bushing first end engaging and clamping a portion of the at least one part against the second end of the shoulder portion;

a retainer element coupled to the part support portion and retaining the sleeve bushing to the part support portion, the retainer element causing the sleeve bushing to clamp the portion of the at least one part against the second end of the shoulder portion; and a gauge assembly having a pin groove engagement portion coupled to the pin groove on the shoulder portion, wherein each of the one or more support pin assemblies allows for a lateral movement of the pin and the at least one part of the aircraft structure, to enable the full size determinant assembly.

11. The support system of claim 10, wherein the gauge assembly having the pin groove engagement portion is configured to:

releasably engage the pin groove, to position the pin at a nominal location; and release from the pin groove, to allow the pin to laterally move.

12. The support system of claim 10, wherein in an in-use orientation for the full size determinant assembly, the one or more support pin assemblies comprise a plurality of support pin assemblies comprising:

one or more nominal support pin assemblies coupled to the assembly jig, and coupled to the at least one part of the aircraft structure, the one or more nominal support pin assemblies having the pins at one or more nominal locations, and each of the one or more nominal support pin assemblies having the gauge assembly comprising a gauge bar assembly; and one or more check support pin assemblies coupled to the assembly jig, and coupled to the at least one part of the aircraft structure, the one or more check support pin assemblies having the pins at one or more check locations, and each of the one or more check support pin assemblies having the gauge bar assembly comprising a swing away gauge bar assembly.

13. The support system of claim 12, wherein in the in-use orientation for the full size determinant assembly, the plurality of support pin assemblies comprise:

one or more lower nominal support pin assemblies, each having an engineering support assembly coupled to the clevis;

one or more upper nominal support pin assemblies;

one or more lower check support pin assemblies, each having the engineering support assembly coupled to the clevis; and one or more upper check support pin assemblies.

14. The support system of claim 10, wherein in an in-use orientation for the full size determinant assembly, the one or more support pin assemblies comprise one of:

at least one support pin assembly when the at least one support pin assembly is positioned at a center nominal location on the at least one part of the aircraft structure; or at least two support pin assemblies when the at least two support pin assemblies are positioned at least two side nominal locations on the at least one part of the aircraft structure.

15. The support pin assembly of claim 10, wherein the aircraft structure comprises a fuselage, or a wing;

the at least one part comprises a fuselage part, or a wing part; and the assembly jig comprises a fuselage assembly jig, or a wing assembly jig.

16. A method of supporting an aircraft structure for full size determinant assembly, the method comprising:

coupling one or more support pin assemblies to an assembly jig, each support pin assembly comprising:

a clevis mounted to the assembly jig, the clevis having a clevis body with a first clevis lug and a second clevis lug;

a first bushing disposed within the first clevis lug, and a second bushing disposed within the second clevis lug;

a pin slideably disposed within the first bushing and within the second bushing, the pin comprising:

a head end and a tail end;

a shoulder portion at least partially disposed within the first bushing, the shoulder portion having a first end, a second end, and a pin groove formed circumferentially on an exterior portion of the shoulder portion; and a part support portion extending from the shoulder portion, and being at least partially disposed within the second bushing and configured to fit through a hole in a part of the aircraft structure;

a sleeve bushing slideably disposed over the part support portion and having a sleeve bushing first end configured to engage and clamp a portion of the part against the second end of the shoulder portion;

a retainer element coupled to the part support portion, the retainer element retaining the sleeve bushing to the part support portion, and the retainer element configured to cause the sleeve bushing to clamp the portion of the part against the second end of the shoulder portion; and a gauge assembly having a pin groove engagement portion coupled to the pin groove on the shoulder portion;

positioning and supporting on the assembly jig the part of the aircraft structure for the full size determinant assembly;

inserting through the hole in the part, the part support portion of the pin of a selected support pin assembly of the one or more support pin assemblies;

clamping a portion of the part against the second end of the shoulder portion of the pin of the selected support pin assembly, by using the retainer element to urge the sleeve bushing to clamp the portion of the part between the second end and the sleeve bushing; and using the gauge assembly of the selected support pin assembly to position and to laterally move the pin and the part of the aircraft structure, to enable the full size determinant assembly.

17. The method of claim 16, wherein using the gauge assembly to position and laterally move the pin and the part, further comprises:

using the gauge assembly having the pin groove engagement portion to:

releasably engage the pin groove, to position the pin at a nominal location; and release from the pin groove, to allow the pin to laterally move.

18. The method of claim 16, wherein coupling the one or more support pin assemblies to the assembly jig, further comprises:

coupling the one or more support pin assemblies to the assembly jig, wherein the pin further comprises:

a first slip fit hole in the head end, and a second slip fit hole in the tail end, wherein one or more of, the first slip fit hole, and the second slip fit hole, are each configured to receive a construction ball that creates a visual reference point for a laser metrology system to perform a laser metrology process, to locate the hole, and to confirm an accurate positioning and an accurate alignment of the pin with respect to the hole in the part of the aircraft structure.

19. The method of claim 16, wherein coupling the one or more support pin assemblies to the assembly jig, further comprises:

coupling a plurality of support pin assemblies to the assembly jig, wherein the plurality of support pin assemblies comprise:

one or more nominal support pin assemblies coupled to the assembly jig, and coupled to the part of the aircraft structure, the one or more nominal support pin assemblies having the pins at one or more nominal locations, and each of the one or more nominal support pin assemblies having the gauge assembly comprising a gauge bar assembly; and one or more check support pin assemblies coupled to the assembly jig, and coupled to the part of the aircraft structure, the one or more check support pin assemblies having the pins at one or more check locations, and each of the one or more check support pin assemblies having the gauge bar assembly comprising a swing away gauge bar assembly.

20. The method of claim 16, wherein positioning and supporting on the assembly jig the part of the aircraft structure for the full size determinant assembly, further comprises:

positioning and supporting the part comprising one of:

a fuselage part, of the aircraft structure comprising a fuselage, on the assembly jig comprising a fuselage assembly jig; or a wing part, of the aircraft structure comprising a wing, on the assembly jig comprising a wing assembly jig.

* * * * *